United States Patent [19]

Lowdermilk

[11] 4,341,325
[45] Jul. 27, 1982

[54] APPARATUS FOR DISPENSING SUBSTANTIALLY RIMLESS ARTICLES

[75] Inventor: Loren L. Lowdermilk, Middletown, N.J.

[73] Assignee: International Paper Company, New York, N.Y.

[21] Appl. No.: 192,346

[22] Filed: Sep. 29, 1980

Related U.S. Application Data

[60] Continuation of Ser. No. 936,838, Aug. 25, 1978, abandoned, which is a division of Ser. No. 732,706, Oct. 15, 1976, Pat. No. 4,135,347.

[51] Int. Cl.³ .......................... B65G 59/06; B65H 3/08
[52] U.S. Cl. .................................... 221/211; 221/251; 221/297
[58] Field of Search ............... 221/211, 221, 222, 297, 221/1, 11, 33, 36, 42, 251

[56] References Cited

U.S. PATENT DOCUMENTS

| | | | |
|---|---|---|---|
| 1,907,713 | 5/1933 | Benson | 221/36 |
| 2,640,606 | 6/1953 | Cox | 221/222 |
| 2,721,002 | 10/1955 | Smith | 221/222 |
| 2,840,963 | 7/1958 | Osmond | 53/73 |
| 2,946,481 | 7/1960 | Carew | 221/222 |
| 3,120,324 | 2/1964 | Amberg et al. | 221/4 |
| 3,133,784 | 5/1964 | Herter et al. | 221/211 X |
| 3,311,260 | 3/1967 | Kinney | 221/11 |
| 3,542,241 | 11/1970 | Middleditch | 221/211 |
| 3,741,410 | 6/1973 | Henschke et al. | 221/222 X |
| 3,807,600 | 5/1974 | Moss et al. | 221/104 |
| 4,044,896 | 8/1977 | Reinecke | 214/297 |
| 4,175,676 | 11/1979 | Renaud et al. | 221/211 |
| 4,180,180 | 12/1979 | Fries | 221/222 X |

*Primary Examiner*—F. J. Bartuska
*Attorney, Agent, or Firm*—Robert M. Shaw

[57] ABSTRACT

Apparatus and method for separating and discharging articles used in the fabrication of disposable fluid dispensing tubes fabricated by apparatus including a rotatively mounted tube receiving turret which indexes tubes through a series of stations positioned around the turret periphery at which various operations are performed. The separating and discharging apparatus includes elements for deforming a stack of nested articles, such as nozzles, to separate and release an article from the stack, in combination with a vacuum receiving cup for withdrawing the articles from the stack and retaining them for delivery to the turret where they are discharged. The method includes the steps of separating articles from the stack by deforming the stack to interrupt coupling between contiguous articles, and withdrawing the articles separated by application of vacuum for transport to a displaced location where they may be discharged.

11 Claims, 50 Drawing Figures

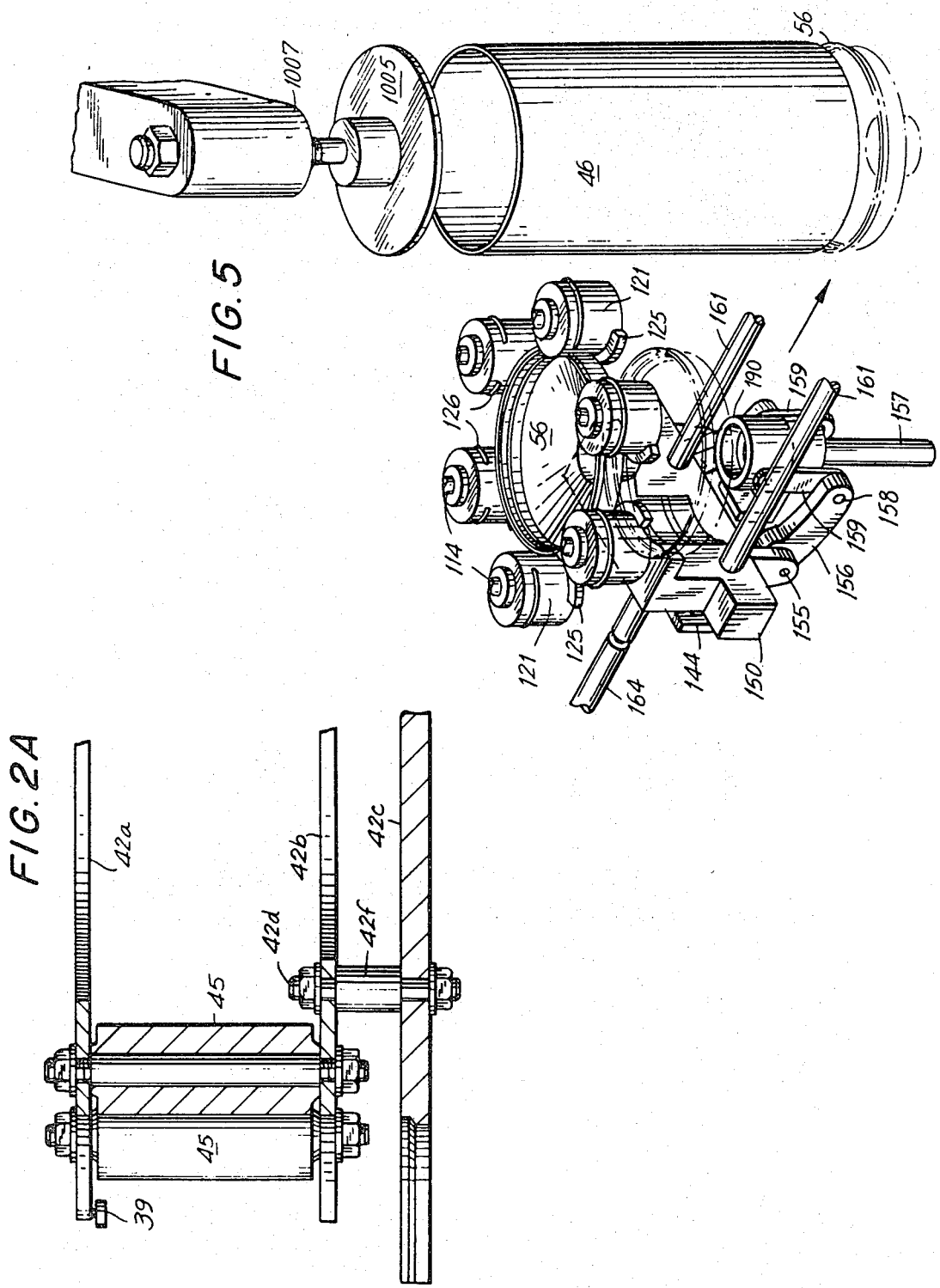

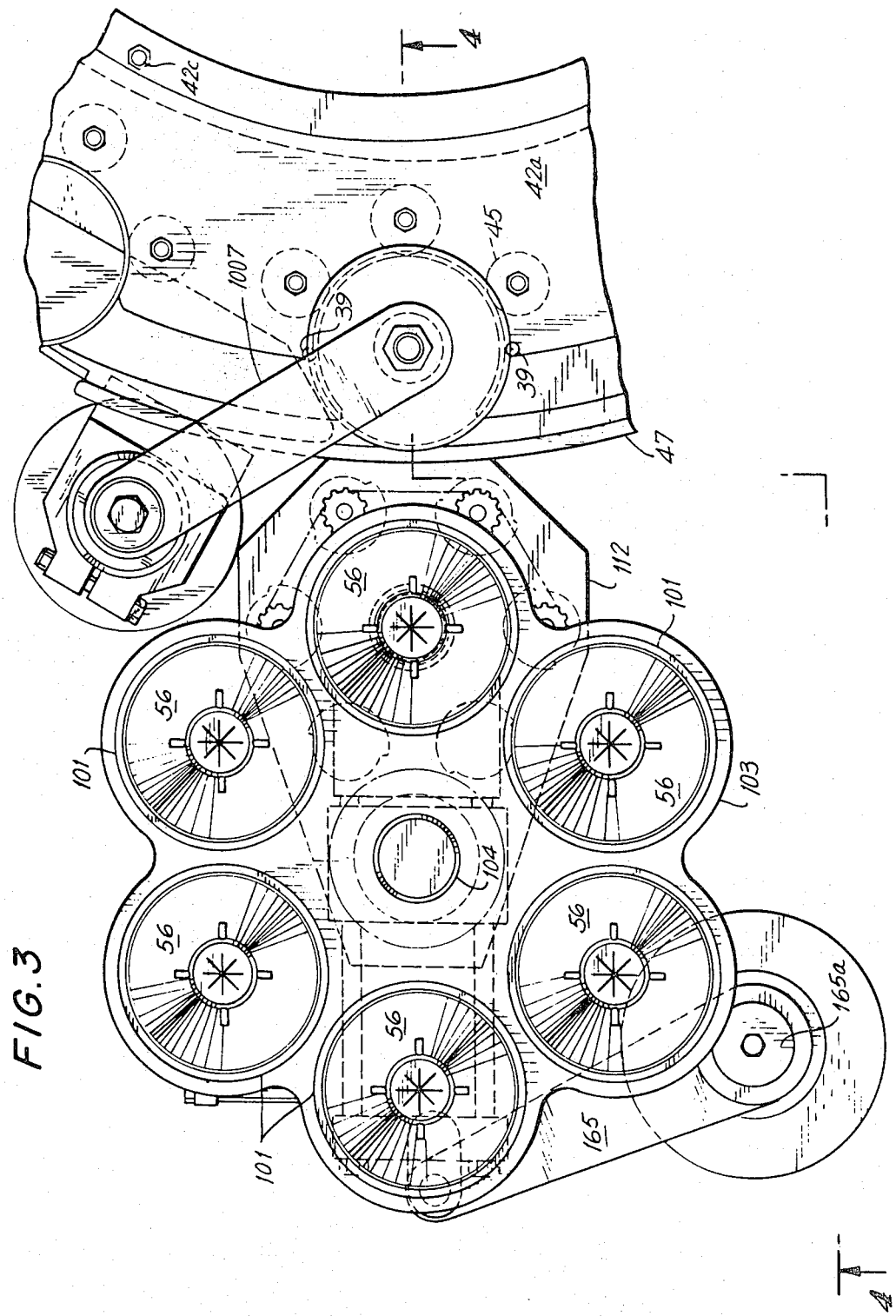

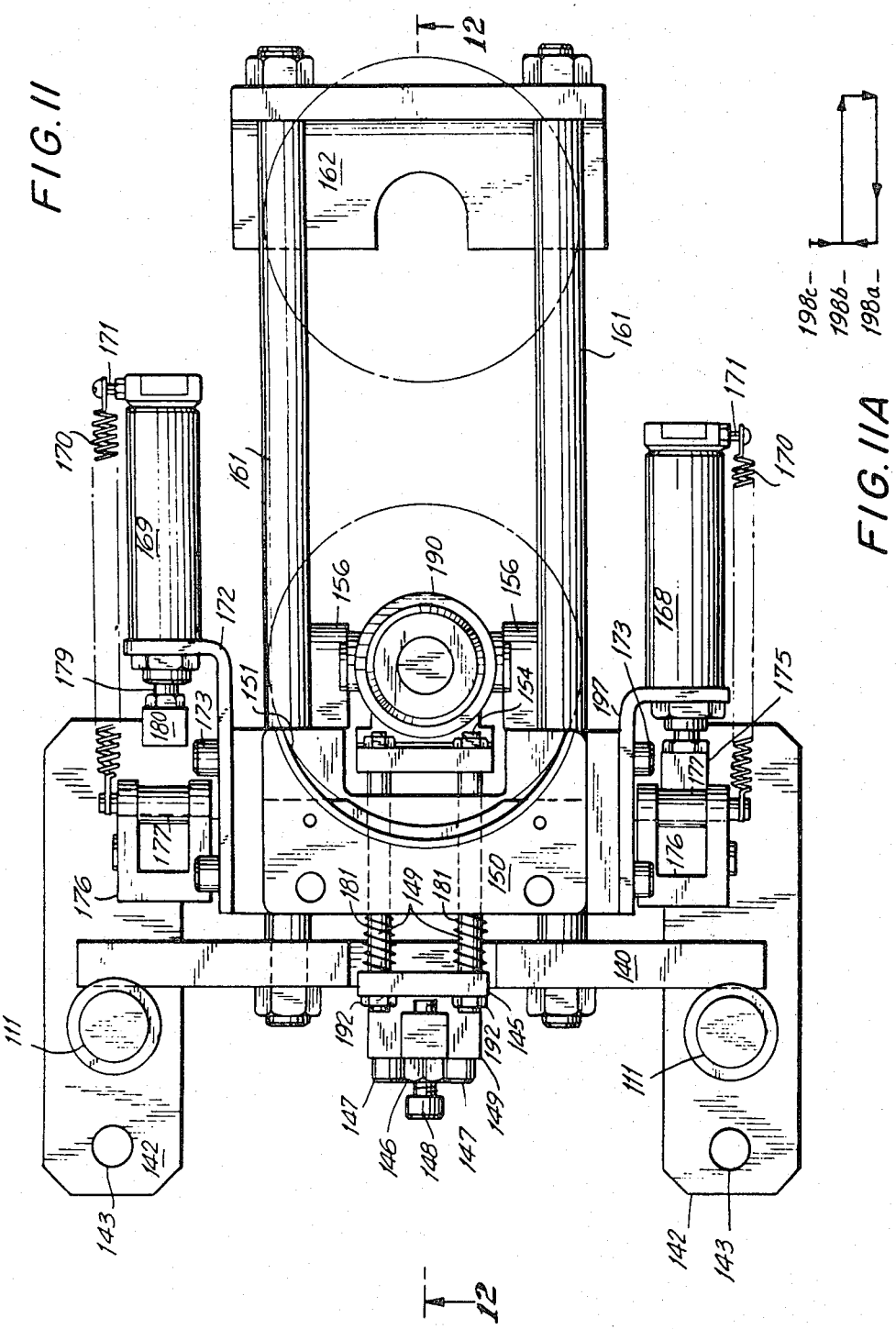

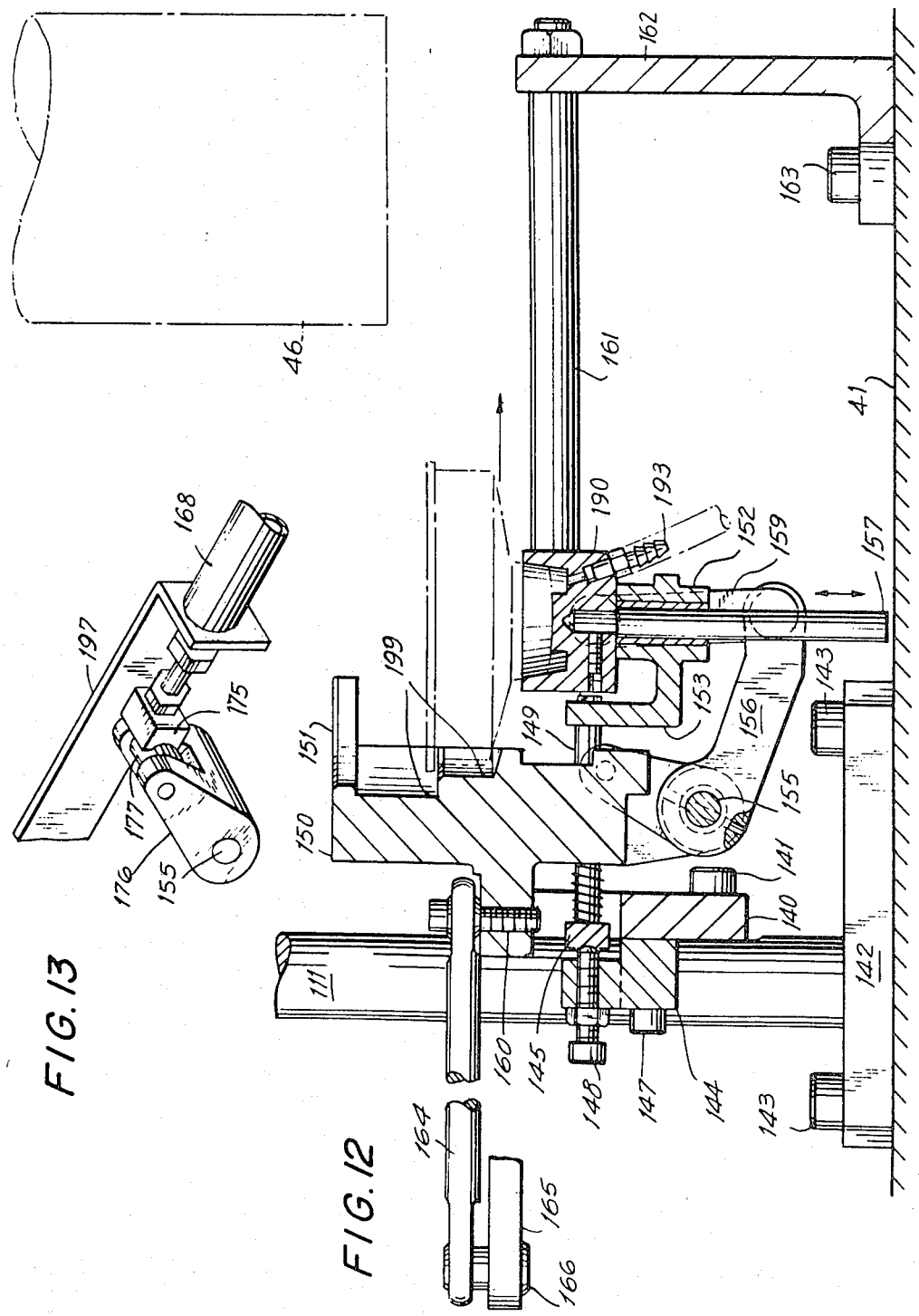

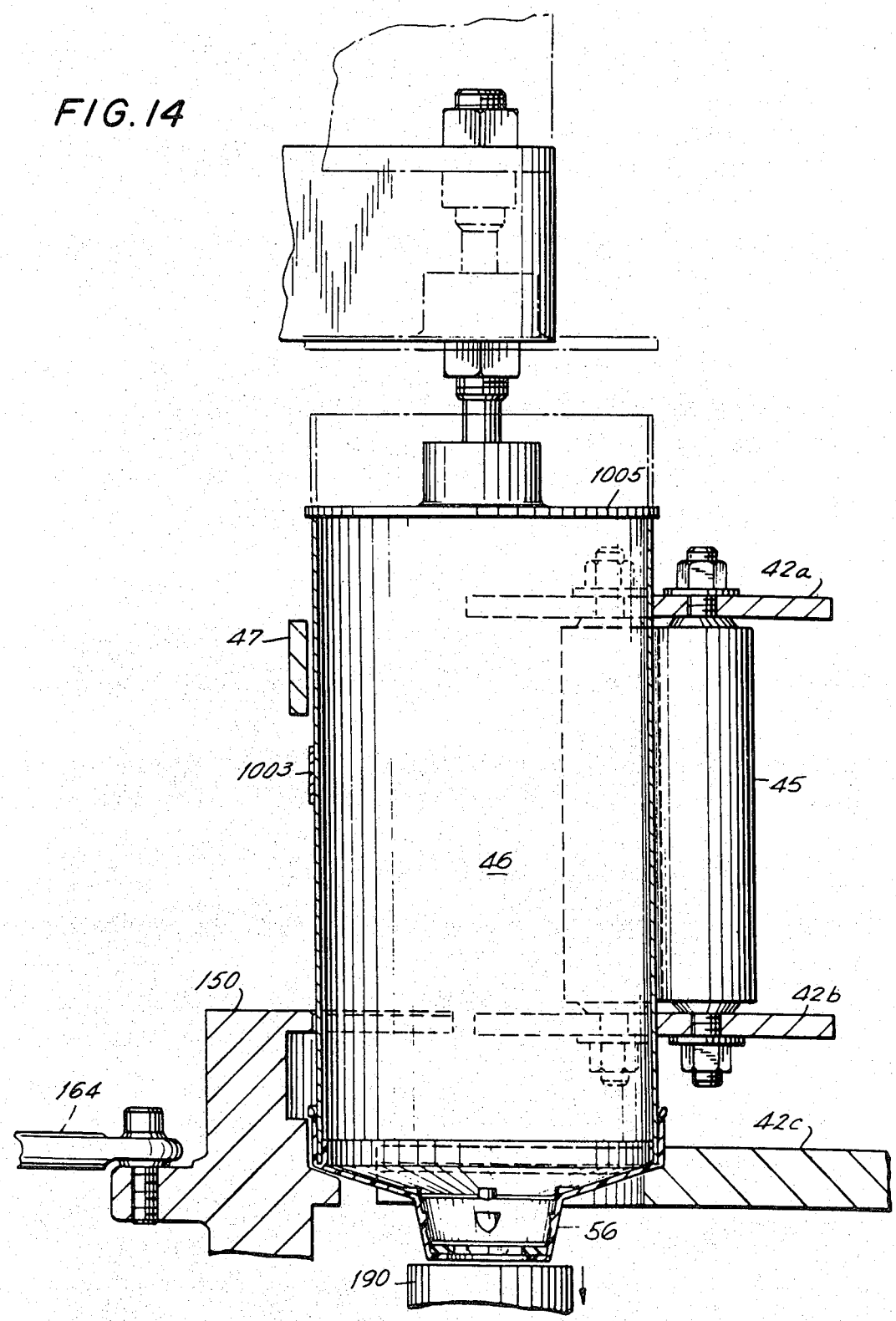

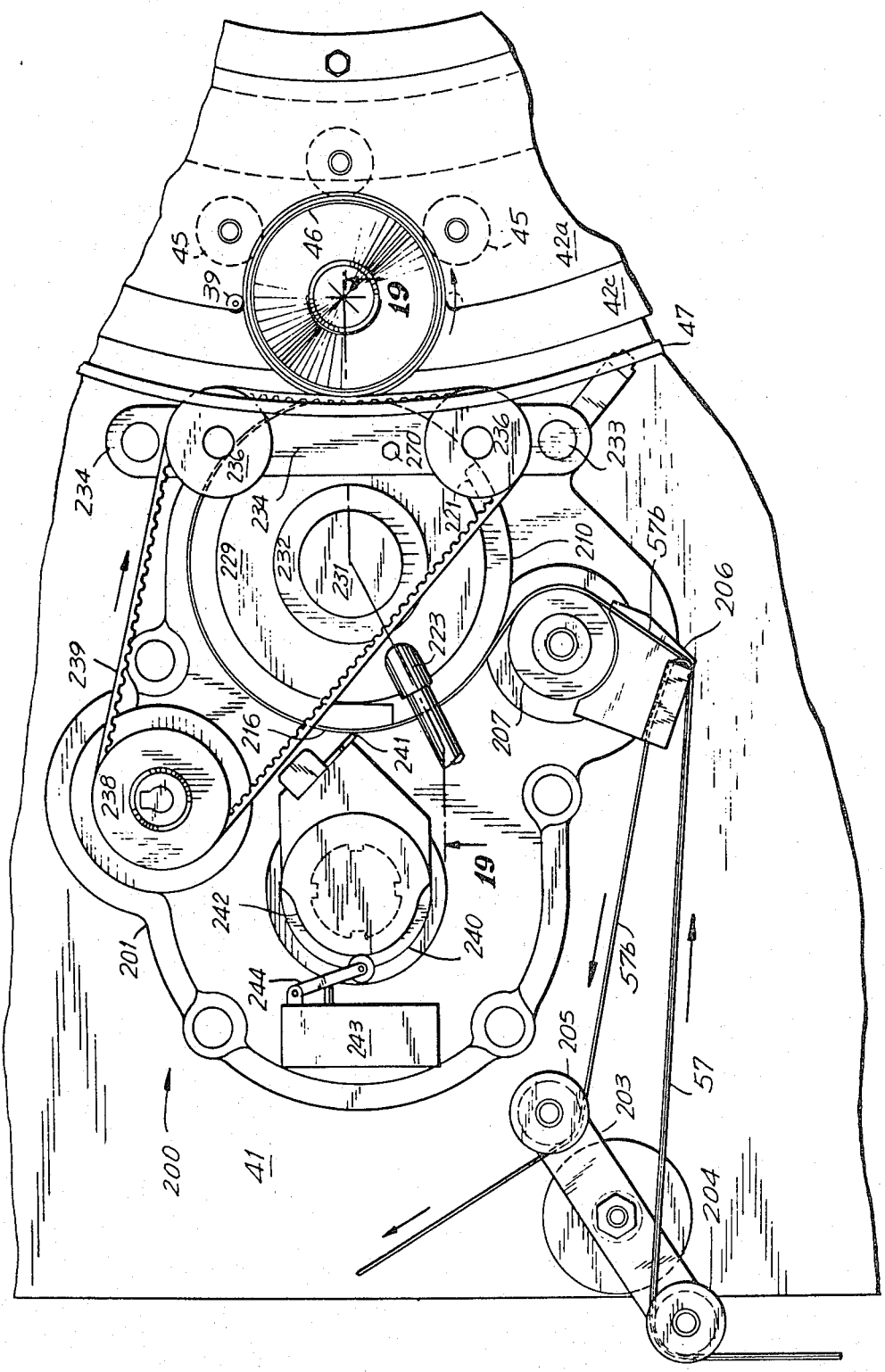

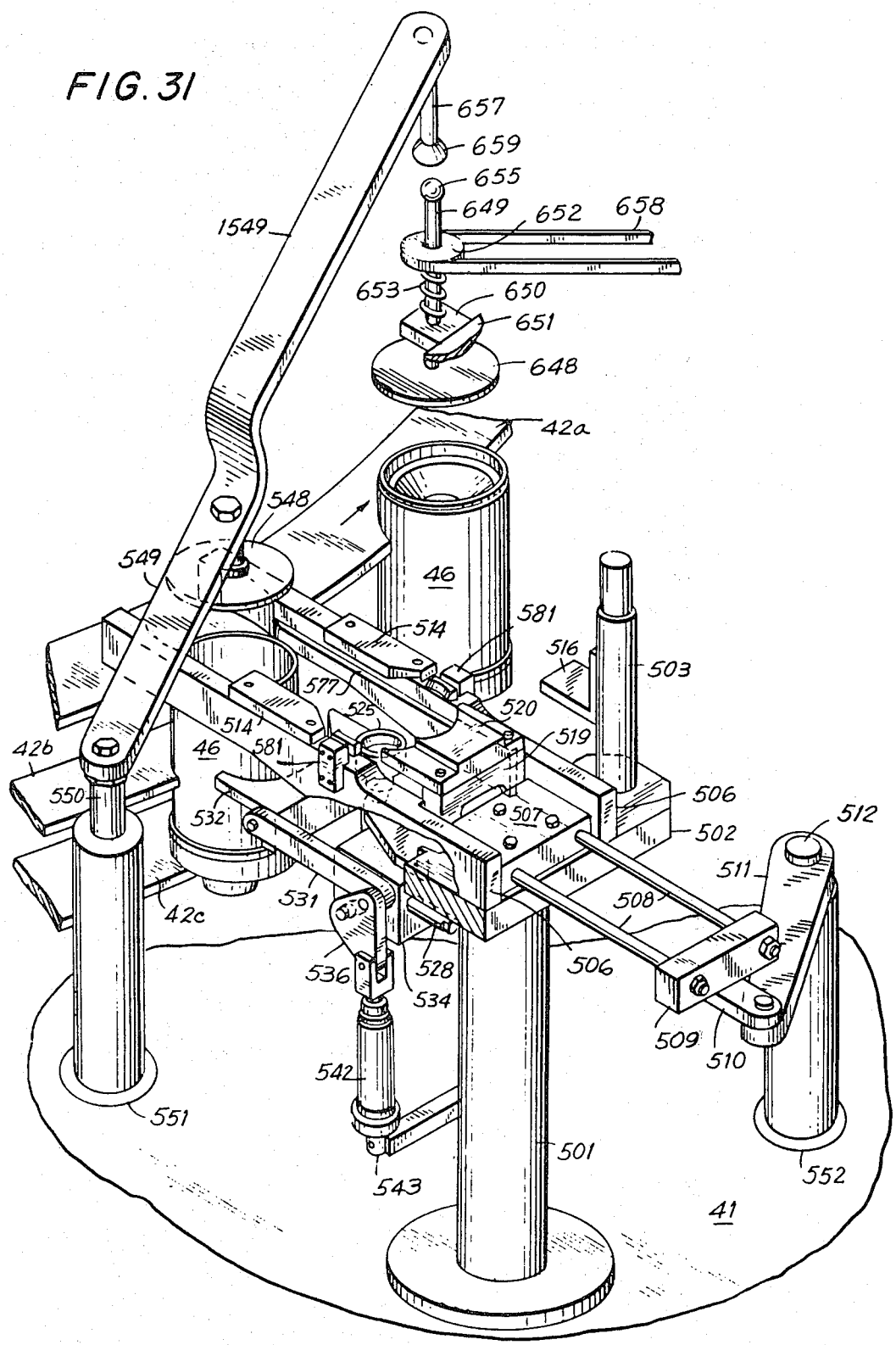

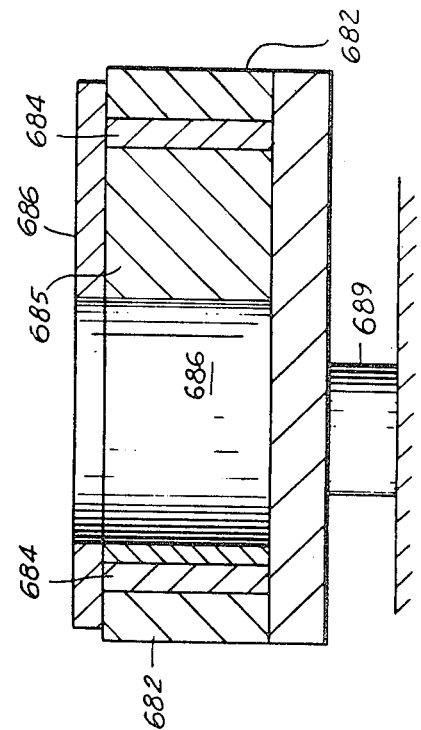
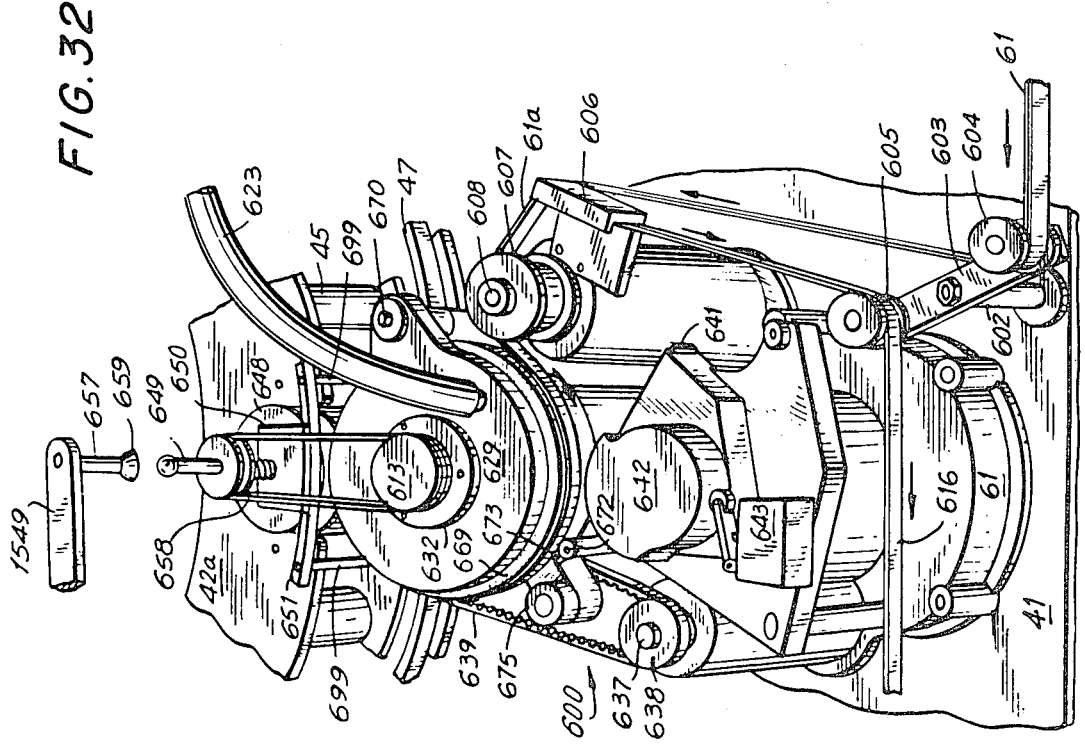

APPARATUS FOR DISPENSING SUBSTANTIALLY RIMLESS ARTICLES

This is a continuation of application Ser. No. 936,838 filed Aug. 25, 1978, now abandoned, as a divisional to application Ser. No. 732,706 filed Oct. 15, 1976 and now issued as U.S. Pat. No. 4,135,347.

BACKGROUND OF THE INVENTION

With increasing frequency, flowable materials are being supplied in disposable dispenser tubes. Examples thereon include the supply, in disposable dispenser tubes, of such materials as cake frostings and other food mixes. In the area of commercial and institutional food preparation, there has been an even greater tendency to supply flowable food materials in disposable dispenser tubes. In part, this packaging trend has been reinforced by the growth of so-called fast food franchises. In the operation of such businesses, it is particularly important to supply flowable food materials in tubes which not only are disposable and perform a dispensing function but which, in addition, will insure that a reasonably constant amount of material is metered or applied each time the material is dispensed. A dispenser tube which meets these requirements is disclosed in U.S. Pat. No. 3,884,396.

Although it is desirable to provide certain flowable food materials in disposable tubes, a number of problems are encountered when it is attempted to construct an apparatus for producing such tubes. For example, because vast quantities of such tubes must be supplied, a machine for producing such tubes must operate at a high production rate. Additionally, in order to minimize the manufacturing cost per tube, the machine must be particularly reliable and desirably should occupy a minimum amount of floor space. The apparatus and method which comprises my invention meets these criteria and thereby allows the low cost, high volume production of a filled dispenser tube of the type disclosed in U.S. Pat. No. 3,884,396.

SUMMARY OF THE INVENTION

An apparatus which incorporates the preferred embodiment of my invention will include a rotatably mounted turret which has tube receiving openings formed in its periphery. Disposed around the periphery of the turret are a plurality of stations through which tubes are moved by indexing the turret.

In the preferred apparatus embodiment of my invention, a tube, open at both ends, is positioned within one of the openings formed in the periphery of the turret. Thereafter, the turret is indexed to a first station where an open ended nozzle is mounted on one end of the tube. Thereafter, the turret is indexed thereby positioning the tube in the second station wherein the nozzle is secured to the tube by, for example, taping the nozzle to the tube. Thereafter, the tube is indexed to a third station wherein the open end of the nozzle is closed by a piece of tape releasably secured to the nozzle. Thereafter, the tube is indexed to a fourth station wherein it is filled with the material to be dispensed. Then, the filled tube is indexed to a fifth station wherein a plunger is positioned partially in the open end of the tube. Thereafter, the tube is indexed to other stations which fully insert the plunger in the tube and which releasably secure the plunger to the tube. Finally, the tube is indexed to a discharge station wherein it is discharged from the machine. To insure the efficient operation of each station, each of the stations includes unique subcombinations which are comprehended by my invention and which, in combination with the other stations and the overall arrangement of the apparatus, provide the reliable, high speed operation which is required.

DESCRIPTION OF THE DRAWINGS

FIG. 2A is a side partially sectional view taken along the section lines 2A—2A of FIG. 2.

FIG. 3 is an enlarged top view of the first operating station of the machine shown in FIG. 2.

FIG. 5 is a fragmentary perspective view of selected parts of the first operating station shown in plan view in FIG. 3.

FIG. 11 is a top view of another subassembly of the first operating station shown in FIG. 3.

FIG. 11A is a line drawing indicating the path of travel of one part of the subassembly shown in FIGS. 11 and 12.

FIG. 12 is a side sectional view, taken along the section lines 12—12 of FIG. 11.

FIG. 13 is a fragmentary perspective view of a component of the subassembly shown in FIGS. 11 and 12.

FIG. 14 is a fragmentary, side view of a dispenser tube which is being operated upon in the first operating station shown in FIG. 3.

FIG. 15 is a top view of the second operating station shown in FIG. 2.

FIG. 31 is a perspective view of the fifth operating station shown in FIG. 2.

FIG. 32 is a perspective of the sixth operating station shown in FIG. 2.

FIG. 35 is a section view taken along the section lines 35—35 of FIG. 33.

DETAILED DESCRIPTION OF A PREFERRED EMBODIMENT OF THE INVENTION

Figure 2:
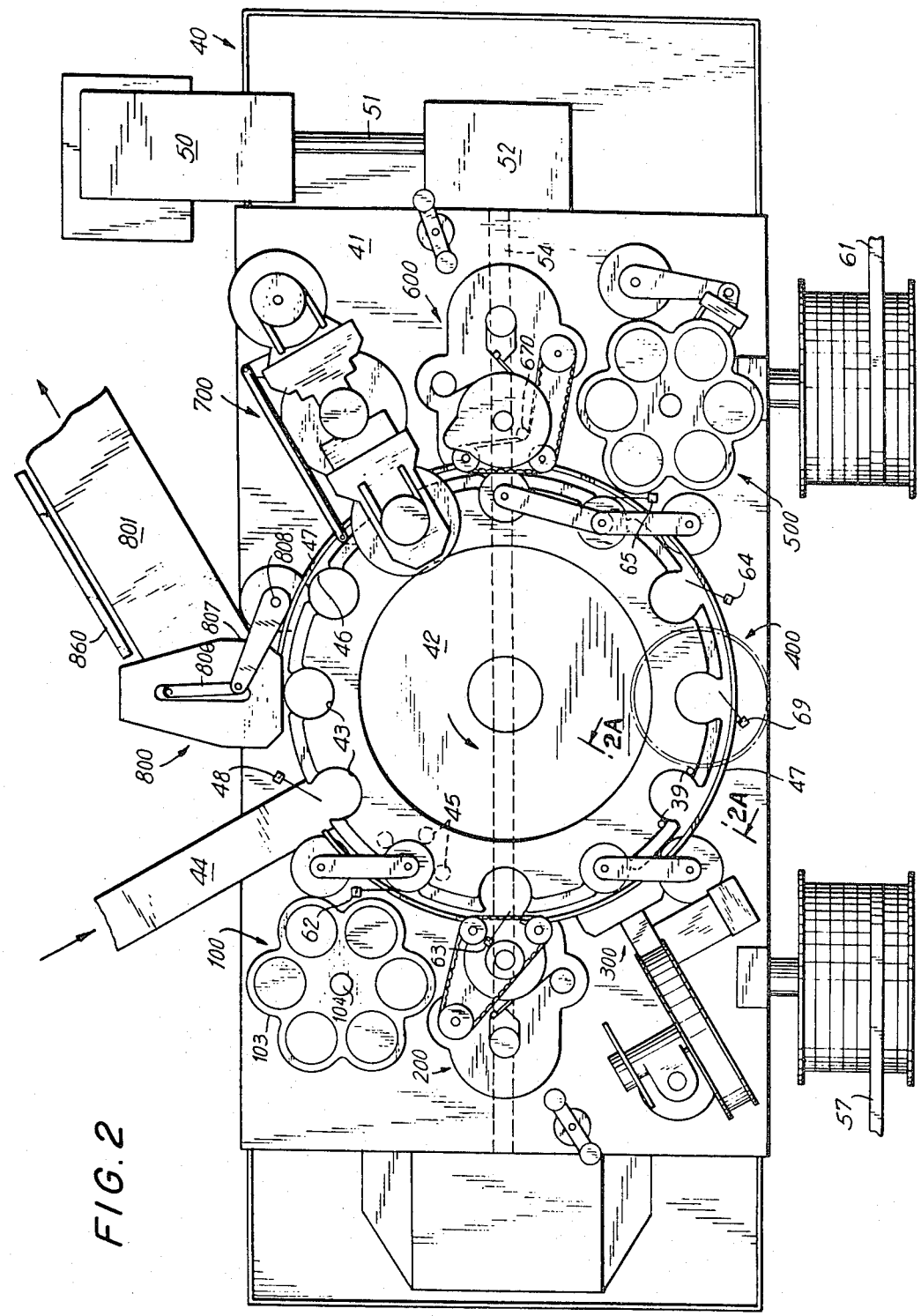
FIG. 2 is a top view of a machine incorporating the preferred embodiment of my invention.

FIG. 2 shows a plan view of an apparatus 40 which represents the preferred embodiment of my invention. The apparatus 40 includes a table 41 on which a turret 42 is rotatably mounted. Spaced apart tube receiving openings 43 are formed in the periphery of the turret 42. Seven successive operating stations, referred to generally by reference numbers 100-700, are disposed at spaced intervals adjacent to the periphery of the turret 42. In order to introduce empty tubes 46 into the turret 42, a conveyor 44 is provided as shown in FIG. 2 at a location which may be called a preliminary operating station. In operation, the turret 42 is indexed in a counterclockwise direction as shown by the arrow in FIG. 2. In this manner, dispenser tubes are moved through the preliminary and each of the seven successive operating stations otherwise hereinafter variously designated as further and still further successive operating stations and finally are positioned in the discharge station 800.

As shown in FIGS. 2 and 2A, the turret 42 is comprised of two rings 42a and 42b and a plate 42c. Spaced around each of the receiving openings 43 are three rollers 45, and two smaller rollers 39, selective ones of which are shown in FIG. 2. The rollers are rotatably mounted and positioned such that their peripheries abut against a tube disposed in the tube receiving openings 43. In this manner, a tube 46 may rotate when the turret turns and the tube 46 is also free to rotate when it is positioned within an operating station and the turret is stationary. The shafts associated with the rollers 45 act as spacers to maintain the rings 42a and 42b in spaced, parallel relation and the shafts which extend through each of the rollers are threaded at each end whereby the ring 42a and 42b are maintained in position by nuts received on the threaded ends of the shaft as shown in FIG. 2A. The roller ring 42b is secured to the turret plate 42c by a plurality of bolts 42d, one of which is shown in FIG. 2A. The lower ring 42b is maintained in spaced, parallel relation with the turret plate 42c by spacers 42f mounted on the bolts 42d as shown in FIG. 2A. The turret plate 42c is secured to a downwardly depending shaft not shown. Thus, when the shaft is rotated the turret plate 42c and the turret rings 42a and 42b will also rotate.

As seen in FIGS. 2 and 2A, the turret rings 42a and 42b include the tube receiving openings 43 mentioned above, and which are aligned with each other. The diameter of the turret plate 42c is somewhat greater than the outer diameter of the turret rings 42a and 42b. The outer periphery of the turret plate 42c includes a plurality of openings 43c which are generally aligned with the tube receiving openings 43 in the rings 42a and 42b. However, the openings 43c in the turret plate 42c are shaped to receive a nozzle and are thus hereinafter designated as nozzle receiving openings.

Referring again to FIG. 2, the machine 40 includes an electric drive motor 50 having a drive shaft 51 extending therefrom. The drive shaft 51 is received in a speed reducer 52 which has an output shaft 54. Preferably, the output shaft 54 extends for the entire length of the machine and the end of the drive shaft 54 which is most distant from the speed reducer 52 may extend beyond the machine and may be utilized to actuate cam-operated microswitches for timing and control purposes. Preferably, the turret and the various operating stations are mechanically linked and directly driven from the shaft 54. In this manner, it is insured that rotation of the turret and operation of the various operating stations occur in timed sequence, which timed sequence may be secured through the use of direct mechanical linkage between the operating stations and cam-operated microswitches which operate directly from the shaft 54. The particular mechanical drive system which is used does not form a part of the present invention. Additionally, those skilled in the art to which this invention pertains will perceive that there are a number of well known alterative mechanisms which may be employed for appropriately connecting each of the operating stations and the turret to the drive shaft 54. Similarly, pneumatically actuated components in the various operating stations may, according to conventional practice, be actuated by pneumatic cylinders which receive signals from cam-operated microswitches driven from the shaft 54. Since such drive and control mechanisms are conventional and known to those skilled in this art, a detailed description thereof is not hereinafter presented in order that the description of the invention not be obscured.

Returning to a consideration of FIG. 2, the various operating stations will now be identified and a number of the gross features of the machine 40 will be described. To facilitate an understanding of the function performed by each of the operating stations, reference is also made to FIG. 1 which is a diagrammatic representation of the operations performed at each operating station.

Machine Organization and Operation

Figure 1:
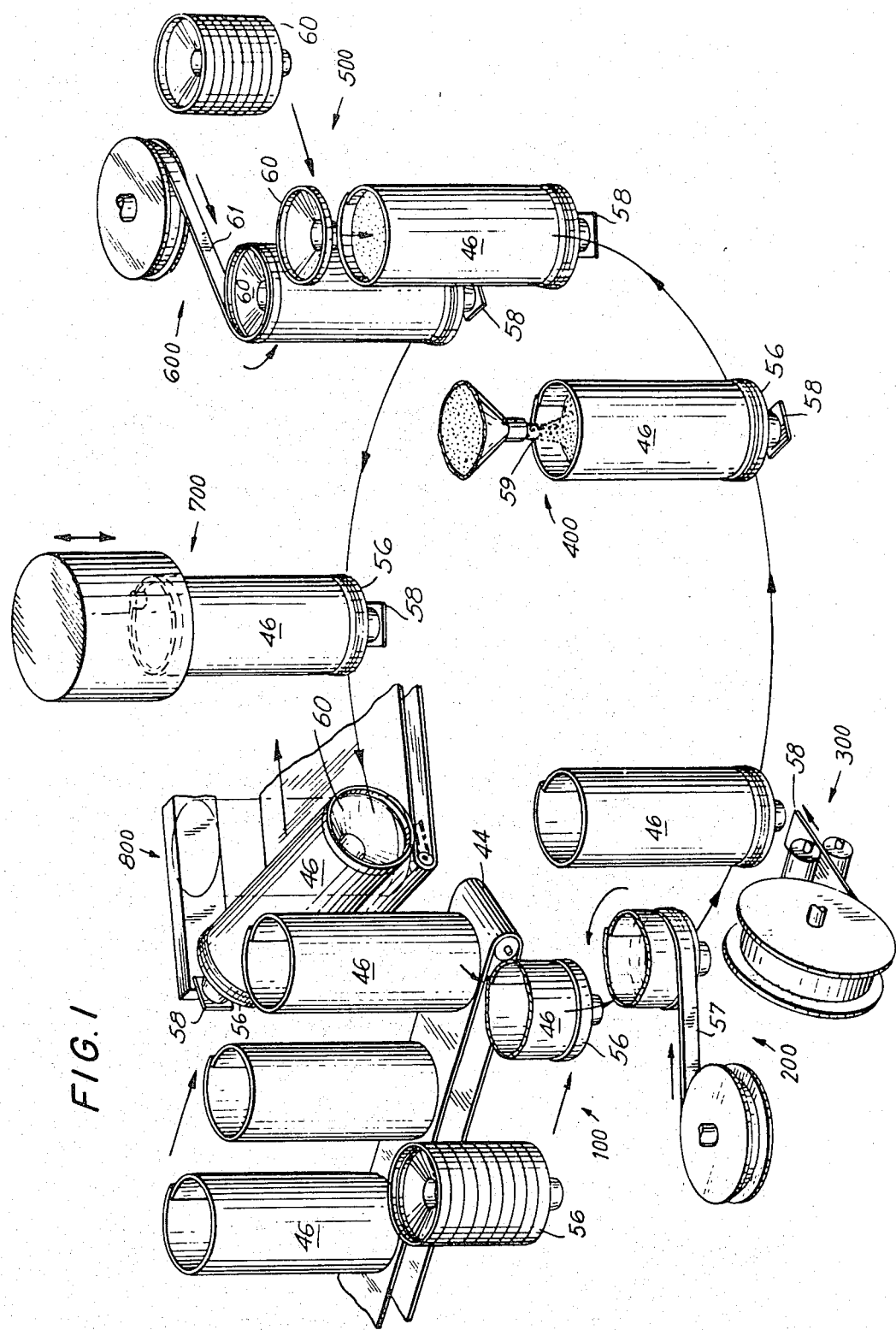
FIG. 1 is a perspective, schematic representation of the operations which are performed at various stations of a machine which incorporate the preferred embodiment of my invention.

Initially, open-ended tubes 46, preferably made of thermoplastic coated paperboard, are supplied to the machine by conveyor 44. In this manner, an open-ended tube is positioned in the available tube receiving opening 43 of the turret 42 and, once the tube is positioned therein, other tubes will simply slide on the conveyor and may back up to form a supply of tubes. After a tube is positioned in the turret, the turret is indexed so as to move the tube 46 to the station 100. As shown in FIG. 1, at station 100 there are a supply of nozzles 56 and a particular nozzle is selected from this supply and positioned on the nozzle receiving opening 43c of the turret plate 42c. Thereafter, the tube 46 is pushed downwardly so as to insert it within the nozzle 56. Thus, station 100 is a nozzle mounting station. After the nozzle has been mounted on the tube, the turret 42 is indexed so as to place the tube and nozzle in the station 200.

As shown in FIG. 1, at the station 200 the nozzle 56 is secured to the tube 46. In the preferred embodiment of my invention as shown in the drawings, the nozzle is taped to the tube. This taping action occurs by securing the end of the tape 57 to the nozzle and then rotating the tube while it is in the station 200.

After the tape is secured to the nozzle at station 200, the turret is indexed and the combination of the nozzle and the tube are positioned in the station 300. As shown in FIG. 1, in station 300 the end of the nozzle, which is open, is sealed by applying a patch of tape 58 to the end of the nozzle 56.

After the tape 58 has been applied, the tube 46 is indexed out of the tape applying station 300 and is positioned in the filling station 400 wherein, as shown in FIG. 1, the tube is filled with a flowable material 59. Any conventional filling device may be employed at the station 400, the filling equipment being actuated when a tube is appropriately positioned within the filling station 400. After the tube is filled, it is indexed out of the filling station 400 and into the station 500.

Referring to FIG. 2, it may be noted that there is an idle position between the stations 300 and 400 and an idle position between the stations 400 and 500, i.e. each time the turret is indexed it is moved 1/12 of a revolution and, therefore, no operation is performed on a tube which is located intermediate the stations 300 and 400 and the stations 400 and 500.

When a filled tube has been positioned within the station 500, a plunger 60 is fed from a supply of plungers as shown in FIG. 1. The plunger 60 is pushed downwardly and is slidably received within the tube 46, with a portion of the skirt 60s of the plunger extending upwardly beyond the top of the tube. After the plunger has been positioned partially within the tube, the tube is indexed out of the plunger mounting station 500 and positioned in the plunger taping station 600.

In the preferred embodiment of my invention as shown in the drawings, the plunger 60 is secured to the tube 46 by tape 61. In station 600, the tape 61, which will secure the plunger to the tube, is applied to the tube. The tape 61 in the station 600 is preferably applied to the tube in a manner similar to that employed in the nozzle taping station 200, i.e. the end of the tape 61 is applied to the tube 46 and the tube is rotated while it is in place within the station 600. Just prior to the initial application of the tape or simultaneously therewith, the plunger 60 is positioned fully within the tube 46 so that its upper edge is substantially coincident with the upper edge of the tube 46. The tape 61 is applied so that the upper edge thereof extends beyond the upper edge of the tube. Also, the trailing end of the tape is preferably reverse folded to form a pull tab, which is useful when removing the tape at the time the tab is used. After the tape has been applied around the tube as suggested in FIG. 1, the tube is indexed out of the plunger tape applying station 600 and into the station 700.

The station 700 is generally employed only when tape is used as the means for securing the plunger to the tube 46. Functionally, station 700 bends over the upper edge of the tape and pushes it downwardly and inwardly so as to secure the tape to the inner surface of the plunger. In this manner, the plunger is further secured to the tube 46. Thereafter, the filled and sealed dispenser tube is indexed to the discharge station 800. Generally, any form of discharge mechanism can be employed at the station 800 which will extract the filled and sealed tube from the turret 42. Preferably, a mechanism is used which extracts the tube while it is vertically oriented and thereafter rotates the tube 90° so that it may roll on a surface or be placed on a conveyor as shown in FIG. 1. However, as stated, other forms of discharge mechanisms may be employed.

Considering again the overall plan view of the apparatus shown in FIG. 2, it will be appreciated that the preferred embodiment of my invention, as shown in FIG. 2, provides a singularly compact apparatus which performs a plurality of functions. Additionally, because of the use of a rotatably mounted turret and the positioning of the operating stations adjacent to the periphery thereof, high production rates can be secured, for example, production rate of 60 units per minute. Because high production rates are obtainable by the use of an apparatus of the type shown in FIG. 2, it is preferable to include as a part thereof various interlock systems which insure that the operating stations are disabled if a tube is not present at the operating station. Thus, referring to FIG. 2, a microswitch 48, having a feeler arm extending therefrom, is provided on the machine to detect the presence of a tube when the turret is indexed so as to position a tube in station 100. The output of the switch 48 is connected to the nozzle feed station 100. In this manner, operation of the nozzle feed station 100 is disabled if the presence of a tube is not detected by the switch when the turret 42 is indexed.

Similarly, at the nozzle mounting station 100, a switch 62 is provided having a feeler arm extending therefrom. The output of the switch 62 is connected to the nozzle taping station 200. An output from the switch 62 is provided when the turret is indexed so as to move a tube from the turret at the station 100 to the taping station 200. If an output signal is not provided from the switch 62 when the turet is indexed, operation of the nozzle taping station is disabled.

At the nozzle taping station 200, a switch 63 is provided which functions in a manner similar to the switches 48 and 62. That is to say, the output of the switch 63 is connected to the nozzle sealing station 300 and disables the station 300 if the presence of a container is not detected in the station 200 when the turret 42 is indexed.

At the filling station 400, a switch 69 is provided to detect the presence of a container in that station and the operation of the filling mechanism is disabled if the presence of a container is not detected.

At the idle station in between the stations 400 and 500, a switch 64 is provided, the output of which is connected to the plunger feed station 500 and which disables the station 500 if the presence of a container is not detected when the turret 42 is indexed.

Similarly, at the station 500, a switch 65 is provided which detects the presence of a tube leaving the station 600 and the output of which is connected to the plunger taping station 600. Thus, when the turret 42 is indexed, the plunger taping station 600 will be disabled if a signal is not received from switch 65 indicating the presence of a container leaving station 500.

Interlock switches are generally not required for station 700 since, at this station, material is not added to a tube.

Nozzle Mounting Station 100

The nozzle mounting station 100 is shown, in different views, in FIGS. 3–14 and is comprised of a nozzle supply and feeding assembly and a nozzle positioning and mounting assembly.

A. Nozzle Supply And Feeding Assembly

Figure 4:
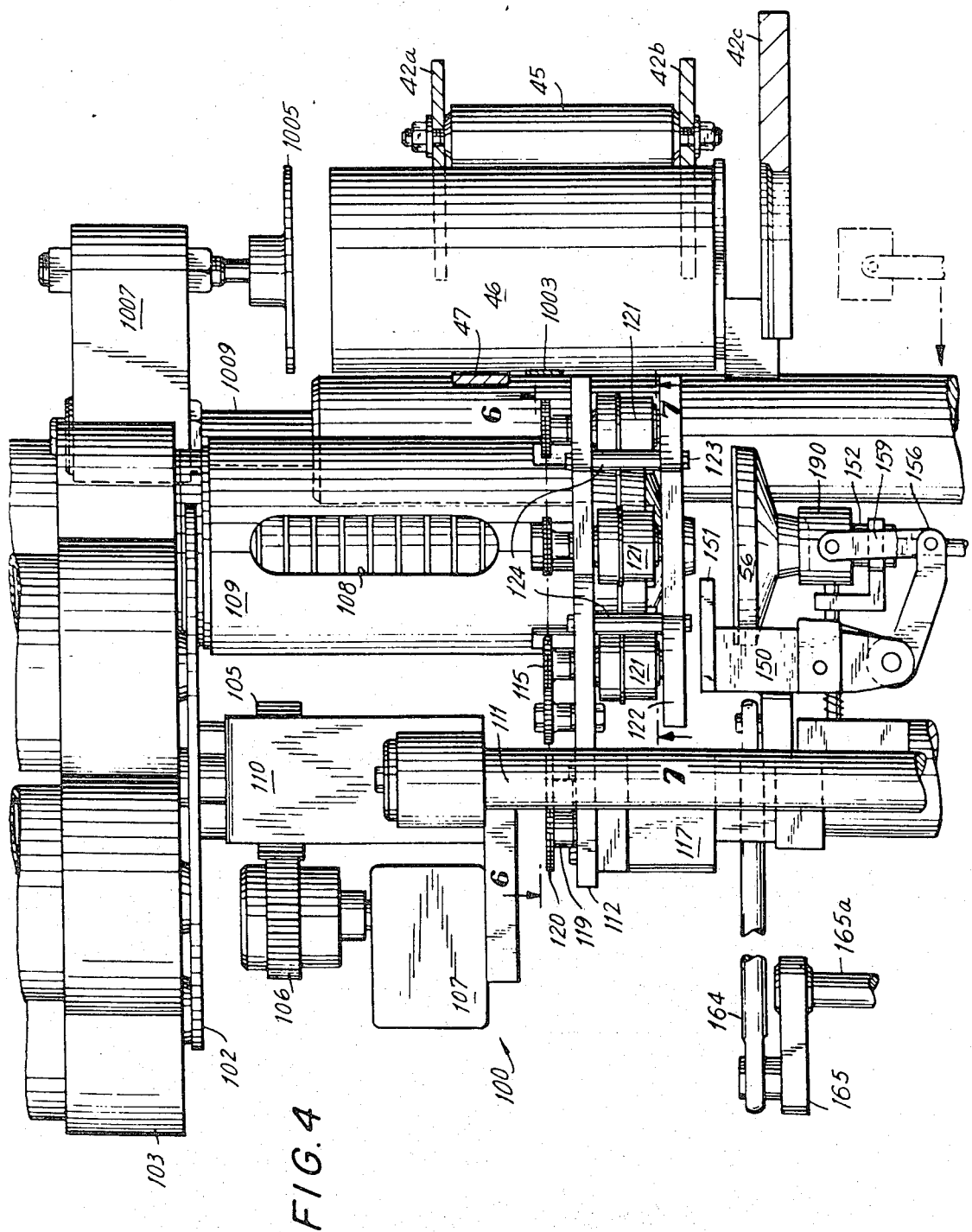
FIG. 4 is a side view taken along the section lines 4—4 of FIG. 3.

As shown in FIGS. 3 and 4, the nozzle supply and feeding assembly includes a housing 103 which is two or three inches high and in which are formed six apertures 103a. Sleeves 101 are inserted into respective apertures 103a and extend upwardly and are filled with quantities of nozzles 56 in stacked relation. The housing 103 is fixedly secured to a rotatable shaft 104. Mounted on the shaft 104 is a gear 105 which engages gear 106. Gear 106 is mounted on the output shaft of air motor 107. Thus, when the air motor 107 is actuated, the housing 103 rotates.

Mounted below the housing is a fixed plate 102 which covers all of the apertures 103a provided in the housing 103 except the aperture which is positioned above the nozzle supply sleeve 109. Directly above the nozzle supply sleeve 109, an aperture is provided in the plate 102 whereby nozzles in the particular sleeve 101, which is positioned above the tube supply sleeve 109, may slide downwardly and fill the tube supply sleeve 109. Means, not shown, are provided for detecting the presence of nozzles 56 in the supply sleeve 109. To facilitate the detection of nozzles in tube supply sleeve 109, oppositely disposed slots 108 may be formed therein and detection means positioned on opposite sides of the tube supply sleeve 109 may be provided whereby, when the supply of tubes in the tube supply sleeve 109 falls below a certain level, an output signal is provided which actuates the pneumatic motor 107. The motor 107 may be pulsed so as to rotate the housing 103 through 1/6 of a revolution.

Additionally, a pneumatically actuated locking mechanism may be employed which locks the housing 103 in place and wherein the locking mechanism engages lugs positioned on and downwardly depending from the housing 103. With this approach, the locking mechanism may be pulsed so as to open for a brief period of time and, at the same time, the air motor 107 is actuated. After the housing 103 begins to rotate but before it moves 1/6 of a revolution, the locking mechanism is again engaged so that the next downwardly depending lug encounters the locking mechanism when the housing has rotated 1/6 of a revolution. In this manner, it is insured that the housing 103 is indexed exactly 1/6 of a revolution and, thereby, when the housing 103 stops moving, a sleeve 101 is aligned directly above the nozzle supply sleeve 109. An air cylinder may be used to move a locking bar which engages the lugs on the housing 103.

The plate 102 and the air motor 107 are fixedly secured to the bracket 110 which is mounted on two columns 111, one of which is shown in FIG. 4. The columns 111 extend downwardly and are secured to the table 41 of the machine 40 shown in FIG. 2.

Figure 6:
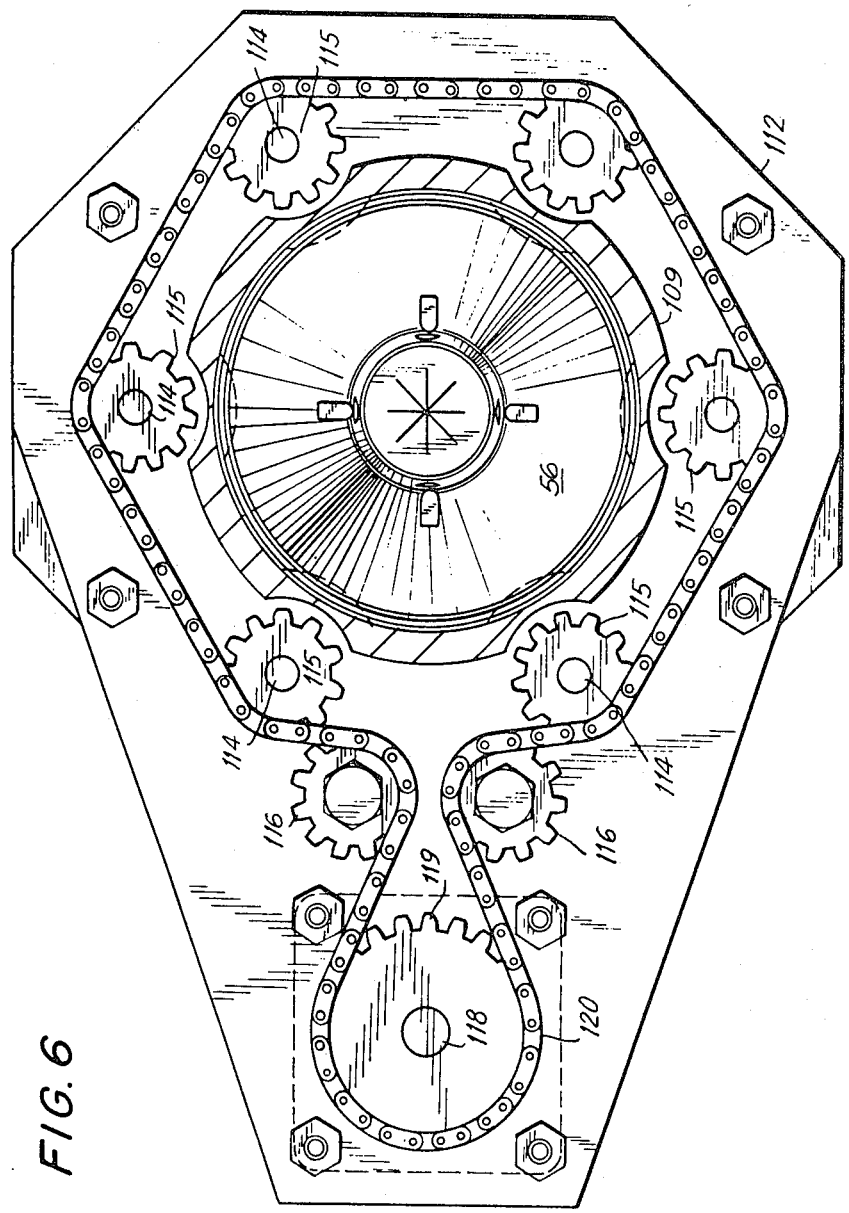
FIG. 6 is a top view of a subassembly of the first operating station shown in FIG. 2.

The tube supply sleeve 109 is fixedly secured to a plate 112. The plate 112 is secured, by conventional means which are not shown in FIG. 4, to the columns 111. Six shafts 114 extend through and are rotatably mounted on the plate 112. As perhaps is best seen in FIG. 6, the shafts 114 are disposed so as to form corners of a hexagon. Mounted on each of the shafts 114 is a sprocket wheel 115. Referring further to FIG. 6, two sprocket wheels 116 are rotatably mounted on the top of the plate 112 and function as idler wheels. Referring to FIGS. 4 and 6, an air motor 117 is mounted below and fixedly secured to the plate 112. Extending upwardly from the motor 117 and through the plate 112 is the output shaft 118 of the motor 117. As seen in FIG. 6, a sprocket drive wheel 119 is mounted on the drive shaft 118. A chain 120 is trained around the sprocket wheel 119, the idler wheels 116 and each of the sprocketed wheels 115. Thus, when the air motor 117 is actuated, each of the sprocket wheels 115 is rotated. The shafts 114 extend downwardly through the plate 112 and are each fixedly secured to a respective cam 121 as shown in FIGS. 4 and 5. Thus, it will be seen that when the air motor 117 is actuated, each of the cams 121 is rotated. The shaft 114 associated with each of the cams 121 extends downwardly and is rotatably received in the plate 122.

The plate 122 is secured to the plate 112 by bolts 123 and the plates 122 and 112 are maintained in spaced, parallel relation by the spacer blocks 124.

When a quantity of nozzles 56 are disposed in the nozzle supply sleeve 109, rotation of the cams 121 will result in a sequential discharge of nozzles from the sleeve 109. To effect this discharge, the cams 121 are each provided with two discontinuous lobes 125 and 126 which are angularly and vertically displaced. Thus, as perhaps best seen in FIGS. 5 and 7, each of the cams 121 includes a bottom lobe 125 and a top lobe 126. The top lobe 126 is discontinuous in the center of the region of the bottom lobe 125 and the bottom lobe 125 extends radially outward for a greater distance than the top lobe 126.

Figure 7:
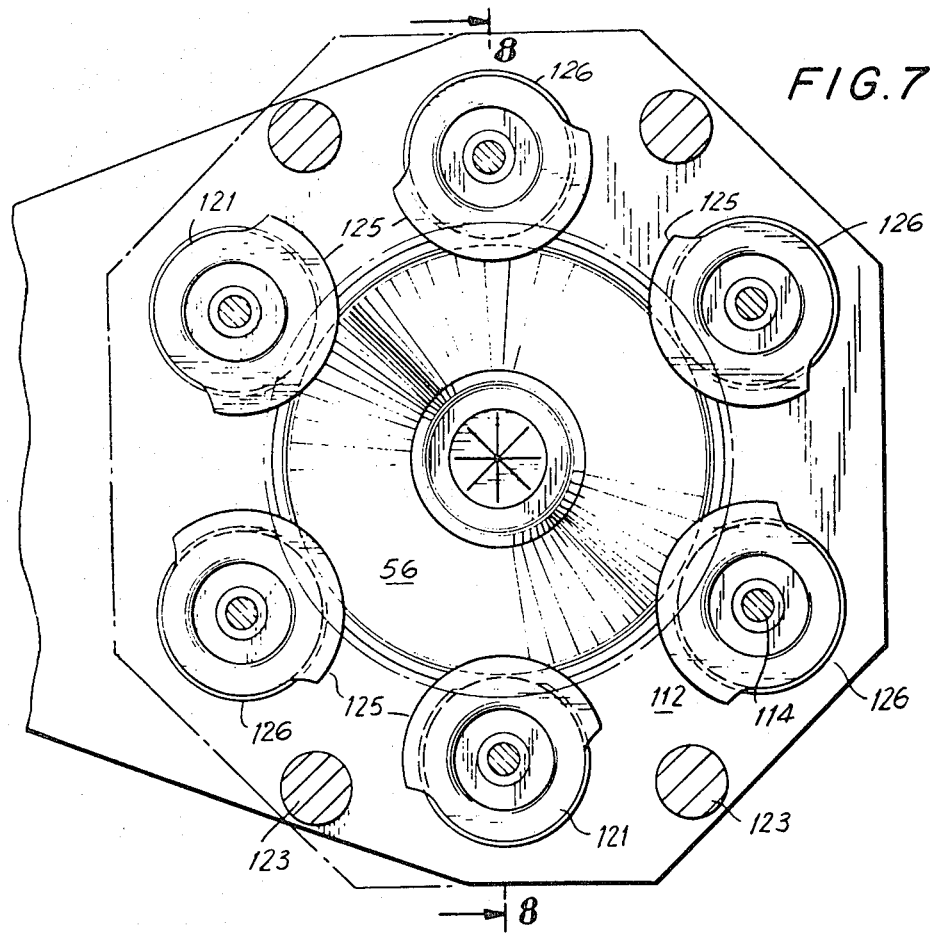
FIG. 7 is a bottom view of the subassembly shown in FIG. 6.
Figure 8:
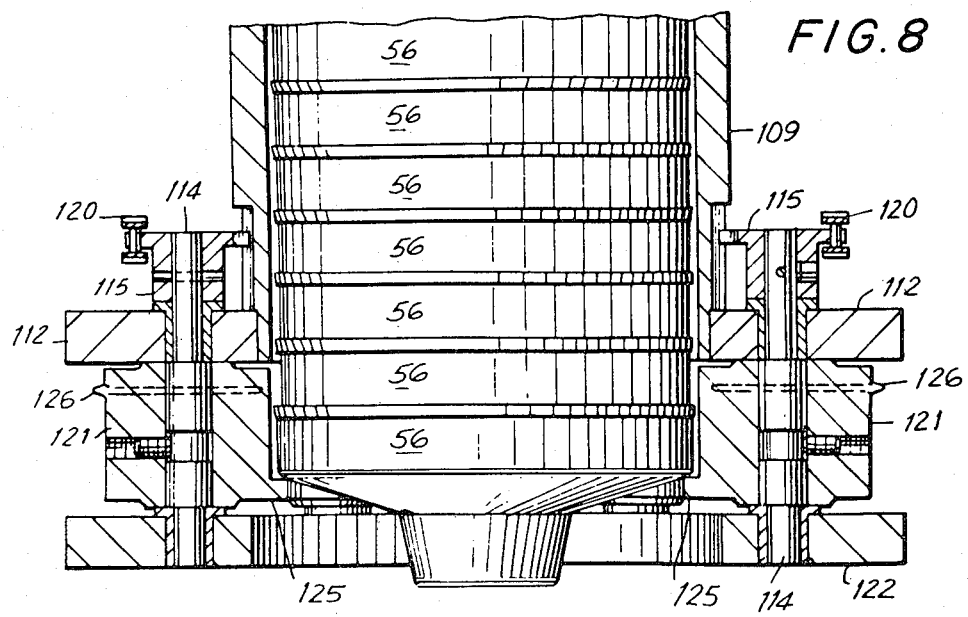
FIG. 8 is a side, sectional view taken along the section lines 8—8 of FIG. 7.
Figure 9:
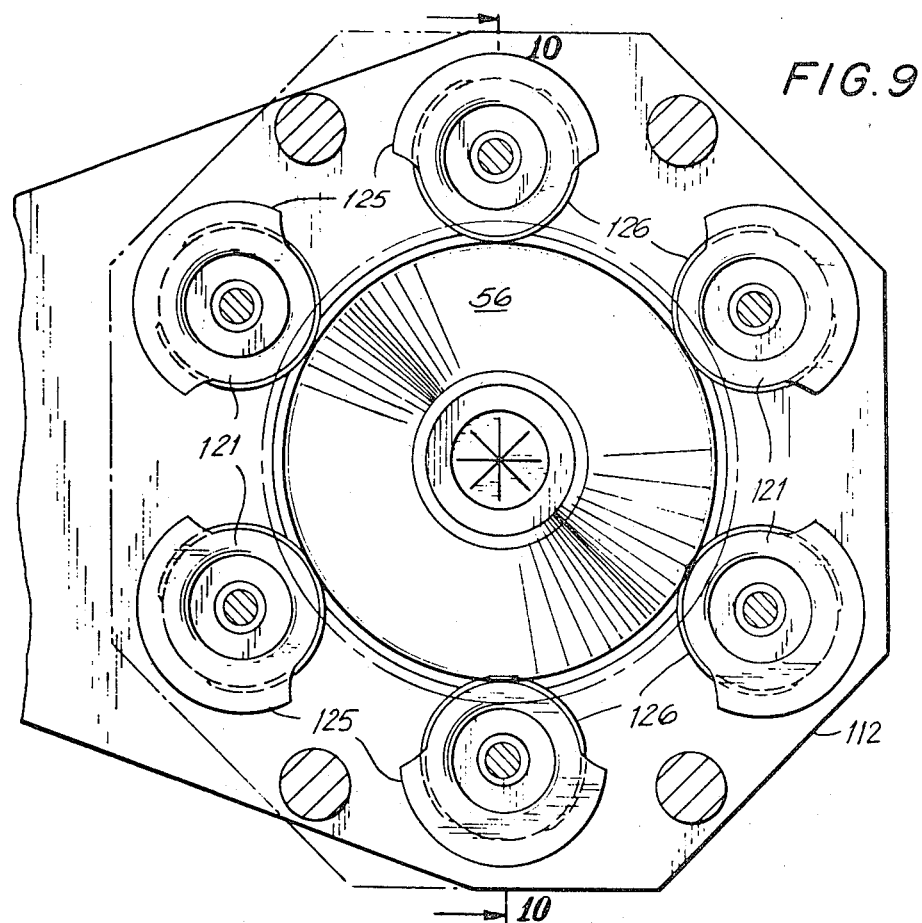
FIG. 9 is a view of the subassembly shown in FIG. 7 with component parts thereof in a different position.
Figure 10:
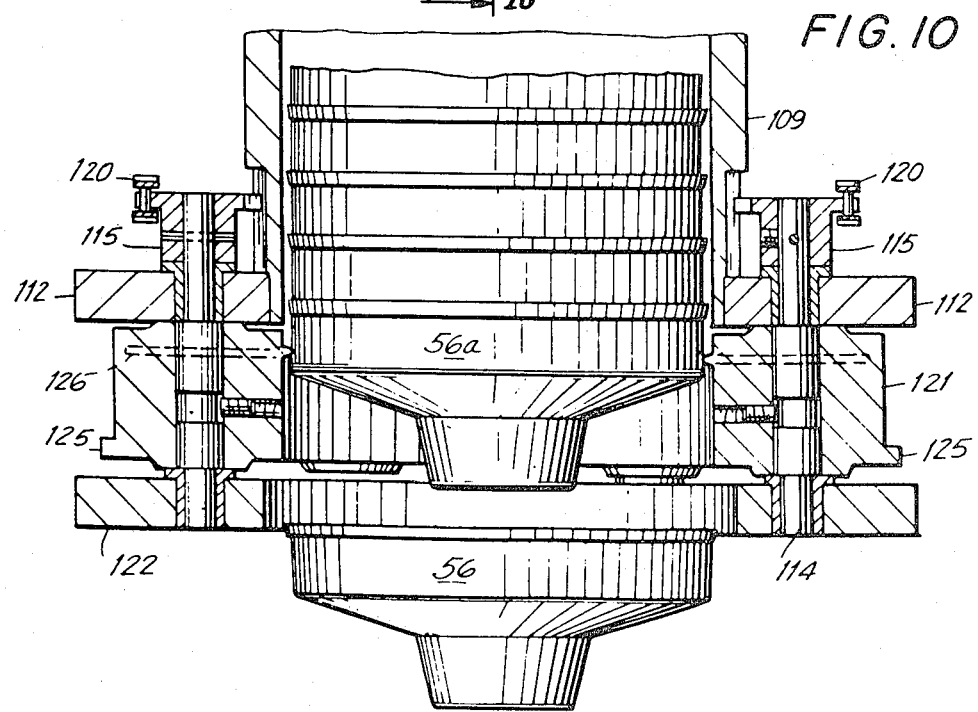
FIG. 10 is a side, sectional view taken along the section lines 10—10 of FIG. 9.

An understanding of the feeding action which occurs by rotation of the cams 121 may be obtained by consideration of FIGS. 7–10. FIG. 7 shows a bottom view of the plate 112 and FIG. 8 shows a corresponding side view of the nozzles and the cams. FIG. 9 shows a bottom view of the plate 112 with the cams rotated 180° with respect to the position of the cams shown in FIG. 7. FIG. 10 shows a side view of the cams as they appear in the rotational position shown in FIG. 9. Referring again to FIGS. 7 and 8, the cams 121 are shown in these figures in the position which they would occupy when retaining nozzles within the sleeve 109. As may best be seen in FIG. 8, when the cams are in the nozzle retaining position shown in FIG. 8, the lower nozzle retaining lobes 125 provide a ledge upon which the lowermost nozzle 56 may rest. When the air motor 117 is activated, and the cams 121 rotate 180° to the position shown in FIG. 10, it will be seen that the lowermost nozzle is thereby released. Additionally, it will be noted that when the cams are in the position shown in FIG. 10, the upper nozzle retaining lobes 126 prevent the remainder of the nozzles from falling out of the sleeve 109, i.e. the upper nozzle retaining lobes 126 press against the skirt of the next nozzle and thereby retain the next nozzle. Additionally, by pressing firmly against the skirt of the next nozzle, that nozzle is slightly deformed, i.e. the skirt is bowed inwardly. As a result, any vacuum which has been formed between the nozzle which is fed and the next nozzle, is broken.

Upon continued rotation of the cams 121, the lower nozzle retaining lobes 125 will again be positioned below the lowermost nozzle and will thereby retain it. Thus, it will be seen because of the construction of the cams 121, sequential feeding of the nozzles, along a linear path, is obtained by purely rotational movement of the cams 121 and this results from the fact that each of the cams includes a pair of angularly and longitudinally displaced lobes, i.e. the lobes 125 and 126.

B. The Nozzle Positioning And Mounting Assembly

The function of the nozzle position and mounting assembly is to receive a nozzle 56 from the nozzle feed assembly, deposit the nozzle in a nozzle receiving opening 43c on the lower plate 42c of the turret and then insert the tube 46 into the nozzle 56.

The nozzle positioning and mounting assembly is shown in FIGS. 4, 5, 11, 12, 13 and 14. Referring to FIGS. 11 and 12, a mounting block 140 is secured to the columns 111 by cap screws 141. As may be best seen in FIG. 12, the base of the columns 111 are secured to the pedestal 142 which is bolted to the upper surface 41 of the machine by cap screws 143. A mounting plate 162 is positioned radially inward, i.e. toward the turret, with respect to the columns 111 and is secured to the upper surface 41 of the machine by the cap screws 163. Guide rods 161 extend between the mounting plate 162 and the mounting block 140 and are secured in place by machine nuts as most clearly seen in FIG. 11. A shuttle 150 is slidably mounted on the guide rods 161 as shown in FIGS. 4, 5, 11 and 12. As seen in FIG. 12, a reciprocating arm 164 is pinned to the shuttle 150 by the bolt 160. The other end of the arm 164 is pinned at 166 to the crank arm 165. The crank arm 165 is fixedly secured to the shaft 165a as seen in FIGS. 3 and 4, and this shaft extends downwardly below the surface of the machine and is connected to main drive shaft 54 described above with reference to FIG. 2 for reciprocating movement through a relatively limited arc. Thus, as the shaft 165 is rotated back and forth through an arc, the shuttle 150 is moved forward and back along the rails 161. In FIGS. 4, 5, 11 and 12, the shuttle 150 is shown in its retracted position, i.e. in its position most distant from the turret 42. In FIG. 14, the shuttle 150 is shown in its extended position.

When the shuttle assembly 150 is in its fully retracted position, it is positioned below and just to the left of the nozzle supply tube 109 as shown in FIG. 4. Additionally, as is seen in FIG. 11, the upper surface of the shuttle 150 includes an arcuate, vertical surface 151 which as a radius equal to the radius of a dispenser tube.

Because a machine embodying the preferred embodiment of my invention operates at a high production rate, for example 60 tubes per minute, it is preferable to provide means for positively engaging nozzles from the nozzle supply assembly. In other words, because of the high speed of the machine, it is preferable not to rely upon gravity for the downward feed of nozzles released from the nozzle feed assembly. Accordingly, as shown in FIGS. 4, 5 and 12, a vacuum pull-down system is employed which includes a vacuum cup 190. The vacuum cup 190 is secured to the guide rod 157 which is slidably received in bearing 152. Bearing 152 includes an upwardly extending portion 153. A pair of guide rods 149 extend through the shuttle 150. The upwardly extending portion 153 of bearing 152 is secured to the guide rods 149 by machine nuts 154 as seen in FIG. 11. The other ends of the guide rods 149 extend through the plate 145 and are threaded to receive machine nuts 192. Biasing springs 181 are provided on each of the guide rods and are interposed between the plate 145 and the shuttle 150, thereby providing a biasing force which tends to move the bearing 152 and the suction cup 190 to the left, toward the shuttle 150, as shown in FIG. 12. When the shuttle 150 is in its retracted position as shown in FIG. 12, it is desired, for reasons hereinafter set forth, to maintain the vacuum cup 190 in spaced relation to the shuttle 150. To accomplish this, a block 144 is secured by cap screws 147 to the plate 140. Through the upward extending portion of the block 144, a machine screw 148 is threadedly received and, after it is turned to the desired position, it is locked in place by machine nut 146. The position of the machine screw 148 determines the spaced apart relation between the shuttle 150 and the vacuum cup 190, when the shuttle is in its fully retracted position.

Thus, considering the apparatus shown in FIGS. 11 and 12, it will be seen that the shuttle 150 is slidably mounted on the guide rods 161 and the vacuum cup 190 and bearing 152 are slidably mounted on the shuttle 150.

As seen in FIGS. 5 and 12, crank arms 156 are secured to the shaft 155 which extends through and outward from the depending portion of the shuttle 150. The other end of each of the crank arms 156 is pinned at 158 to a link 159 which, in turn, is pinned to the upper portion of the vacuum cup 190. Thus, it will be seen that when the shaft 155 is rotated, the vacuum cup 190 will move vertically, up and down, vertical movement of the vacuum cup 190 being assured by the presence of the guide rod 157. To supply a vacuum to the interior of the vacuum cup 190, a vacuum connection 193 is provided as shown in FIG. 12.

As best seen in FIGS. 11 12 and 13, the shaft 155 extends horizontally through the shuttle 150 and each end of the shaft 155 is fixedly secured to a respective clevis member 176 and 176a. At the open end of each of the clevis members 176 and 176a, there are provided pins 177 and 177a. At one side of the shuttle 150, an air cylinder 168 is secured to bracket 197 which, in turn, is secured to the shuttle 150 by machine screws 173. On the other side of the shuttle 150, an air cylinder 169 is secured to bracket 172, which in turn is secured to the shuttle 150 by machine screws 173. Considering the cylinder 168, the piston 174 is supplied with a member 175 having a U-shaped opening which is configured to meet with the pin 177. A spring 170 is secured at 171 to the remote end of the cylinder 168 and the other end of the spring 170 is connected to the pinned end of the clevis 176 at 178 thus providing a bias which tends to move the clevis in the direction of the cylinder 168. Similarly, with respect to the cylinder 169, its piston 179 has a member 180 configured to engage the pin 177a and a spring 170a is provided and is connected at 171a to the remote end of the cylinder 169 and the other end of the spring 170a is connected at 178a to the pinned end of the clevis 176a. It may be noted at this point that the bracket 172 is longer in length than the bracket 197 so that the cylinder 169 and its piston 179 can move the clevis 176a and shaft 155 through an initial angle from an initial position to an intermediate position and the cylinder 168 can move the clevis 176 and shaft 155 to a further position as to be described, it being understood that the cylinders 168 and 169 and their pistons 174 and 179 have strokes of equal length.

The cylinders 168 and 169 are shown in FIG. 11 in their retracted positions. Thus, as seen in FIG. 11, when the cylinder 169 is actuated and its piston 179 moves to its extended position, the facing member 180 on the piston 179 engages the pin 177a and rotates the clevis 176a thereby rotating the shaft 155 to the intermediate position. When this action occurs, the vacuum cup 190, as seen in FIG. 12, is moved into the intermediate position shown in FIG. 12. When the cylinder 168 is actuated, the clevis 176, shaft 155 and vacuum cup 190 are all moved to their final positions, with the vacuum cup 190 in its uppermost position. When the cylinder 168 and 169 remain not actuated, the springs 170 and 170a associated with the cylinders 168 and 169 cause the clevises 176 and 176a associated therewith to move toward the cylinders 168 and 169 whereby the shaft 155 is rotated clockwise as shown in FIGS. 12 and 13 and the vacuum cup 190 is retracted to its lowermost or initial position.

In summary, with respect to the vertical movement of the vacuum cup 190, it will be seen that the vacuum cup 190 may be placed in anyone of three positions, namely positions 198a, 198b and 198c as illustrated in FIG. 11A. To place the vacuum cup 190 in its lowermost position 198a, both the cylinders 168 and 169 are deactivated. To place the vacuum cup 190 in its intermediate position 198b, which is shown in FIG. 12, the cylinder 169 is actuated. To place the vacuum cup in its uppermost position 198c, the cylinder 168 is actuated whereby the vacuum cup is moved up to the region immediately below the lowermost nozzle in the nozzle supply tube.

Considering the overall operation of the nozzle positioning assembly and referring to FIGS. 4, 11, 12 and 13, the operation commences with the shuttle 150 in the position shown in FIG. 12 and with the vacuum cup 190 in its lowermost position 198a. At the time when the air motor 117 is actuated so as to rotate the nozzle dispensing cams (which occurs when the turret is indexed), the cylinders 168 is actuated thereby moving the vacuum cup from its lowermost position 198a to its uppermost position 198c. When the vacuum cup 190 is in its uppermost position it is spaced slightly below the lowermost nozzle in the nozzle supply sleeve and a vacuum is drawn at port 193. Thereby, when a nozzle is dispensed by the cams 121, the nozzle is immediately pulled into the vacuum cup 190 and the vacuum cup 190 is then moved downwardly to its intermediate position 198b as shown in FIGS. 11A and 12. Thereupon, the crank arm 165 (FIGS. 4, 12 and 14) is actuated so as to move it through its arc whereby the shuttle 150 moves forward toward the nozzle receiving opening 43c of the turret plate 42c. As the shuttle 150 moves forward, the biasing springs 181 position the upwardly extending portion 153 of the bearing 152 toward the shuttle 150. Thereby, the nozzle 56, as shown in phantom in FIG. 12, is received in the complimentary vacuum cup portion 190 of the shuttle. Upon continued movement of the shuttle 150, the bearing 152 and the vacuum cup move along with the shuttle during which time the vacuum is maintained so as to hold the nozzle within the vacuum cup. At the forward end of the movement of the shuttle 150, the vacuum is released whereby the nozzle is deposited in the nozzle receiving opening 43c in the plate 42c of the turret 42 as seen in FIG. 14. Additionally, as the shuttle 150 approaches the end of its movement (FIGS. 4, 11 and 14), the arcuate cutout 151 in the top of the shuttle surrounds the container tube 46 positioned in the turret and, in combination with the rollers 45 in the turret insures that the tube 46 is round and slightly compresses the tube. This is particularly important since, typically, containers of the type disclosed herein will be slightly out of round and any lack of concentricity would prevent the container from being quickly and accurately seated within the nozzle. Also, it is preferred that the outer diameter of the tube 46 be slightly greater than the inner diameter of the nozzle flange so that there is a slight interference fit. Extent of forward movement of the shuttle and vacuum cup 190 may be determined by a plate 162 seen in FIG. 11. At the end of the forward movement of the shuttle, there is a dwell in the movement while the container is rounded into shape. Simultaneously, and referring to FIGS. 4 and 14, the plunger 1005 is moved downwardly. The plunger 1005 is fixedly secured to arm 1007 which is fixedly secured to vertically movable rod 1009. The rod 1009 extends downwardly below the upper surface of the machine and is appropriately connected to the main drive shaft to provide vertical movement in proper sequence. Thus, as the arm 1009 is moved downwardly, the plunger 1005 moves downwardly, seats within the upper portion of the tube 46 and pushes the tube 46 downwardly into the nozzle which has been deposited in the nozzle receiving opening 43c of the turret plate 42c. To insure that the tube 46 does not drop prematurely, a leaf spring 1003 is secured to the frame of the machine and bears up against the outer surface of the tube and pushes the container against the rollers 45. At the end of the downward movement of the plunger 1005, the tube 46 has been inserted into a nozzle and the plunger 1005 is retracted. Thereupon, the shuttle 150 is returned to its retracted position as shown in FIGS. 11 and 12. FIG. 11a shows the path described by the vacuum cup 150. In other words, at the start of the sequence the vacuum cup is in its lowermost position 198a and is then moved upward to its uppermost position 198c, whereupon it receives a nozzle and then moves downwardly to its intermediate position 198b. Thereafter, the shuttle assembly moves forward, carrying with it the vacuum cup 190 and, at the end of the forward movement of the shuttle 150, the cylinder 169 is deactivated whereupon the vacuum cup moves downwardly, and the vacuum is broken and the vacuum cup is then positioned at its lowermost level 198a, which is the level which it maintains until it is retracted along with the shuttle 150.

As was previously described, interlocks are provided to insure that operating stations are disabled if a tube is not fed into a station. With respect to station 100, the switch 48 is connected in series with the control switch which activates the air motor 117 which dispenses the nozzles. Thus, if the switch 48 does not close when the turret rotates the air motor will not receive an activation signal and will not operate. Thereby, a nozzle will not be fed.

Nozzle Taping Station 200

Figure 18:
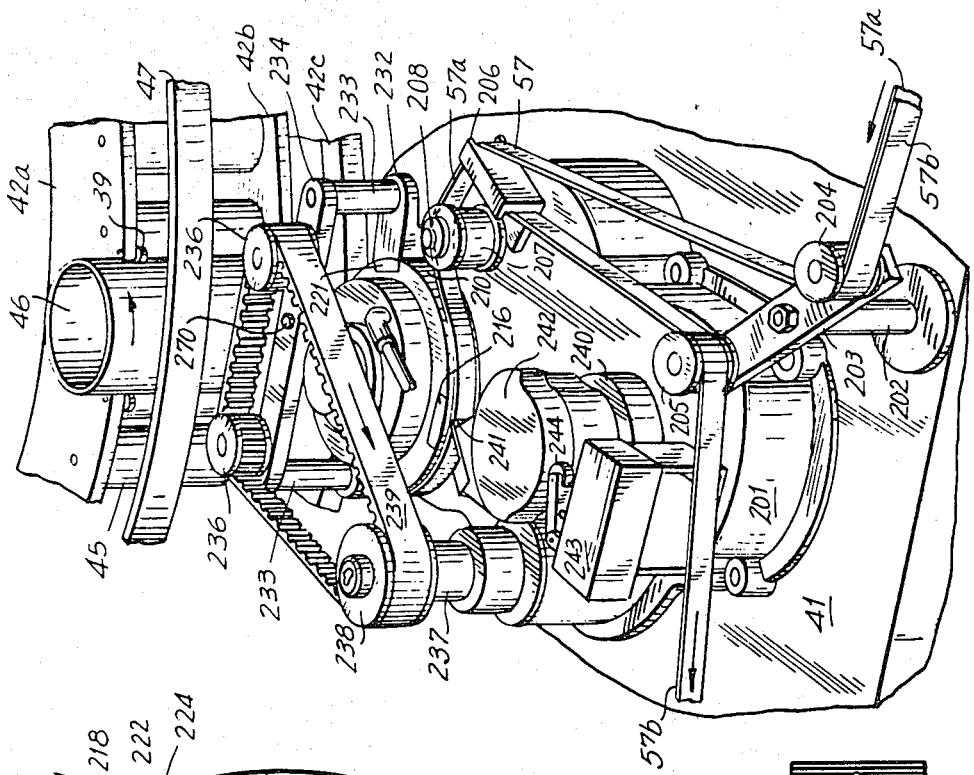
FIG. 18 is a perspective view of the second operating station shown in FIG. 2.

FIG. 15 is a top view of the nozzle taping station 200 which is shown in perspective view in FIG. 18.

Referring to FIGS. 15 and 18, a housing 201 is secured to the top surface 41 of the machine. A stanchion 202 is also secured to and extends upwardly from the top surface 41 of the machine. A horizontal plate 203 is secured to the upper end of stanchion 202. At one end of the plate 203, a roller 204 is provided. Similarly, at the other end of the plate 203, a roller 205 is provided. The rollers 204 and 205 are rotatably mounted on the plate 203. Tape 57 is supplied from the tape supply roll 71 shown in FIG. 1 and is wrapped partially around the roller 204. The tape 57 is comprised of two portions, namely an adhesive tape 57a and a cover or protective tape 57B. The tape 57a is provided with an adhesive material on the surface with is in contact with the tape 57b. The tape 57 is trained around the stripper bar 206. The stripper bar 206 is secured, by appropriate means not shown, to the upper surface of the housing 201. At the stripper bar, the protective covering tape 57b is stripped from the adhesively coated tape 57a. Thus, the protective tape 57b exits from the stripper bar 206 in the direction shown by the arrows in FIGS. 15 and 18, i.e. it is trained around the roller 205 and exits from the machine by take-up means not shown.

The adhesively coated tape 57a is trained around feeder roll 207. The surface of the feeder roll 207 is knurled and the feeder roll 207 is mounted on shaft 208, which extends downwardly through the casting 201 and below the machine surface 41. The shaft 208 is connected to the main drive shaft by a conventional clutch which is not shown. The clutch is preferably pneumatically actuated by the closure of timing contacts hereinafter described. Thus, at this point, suffice it to say that the feed roll 207 is intermittently operated and thereby controls feeding of the adhesively coated tape 57a.

Figure 16:
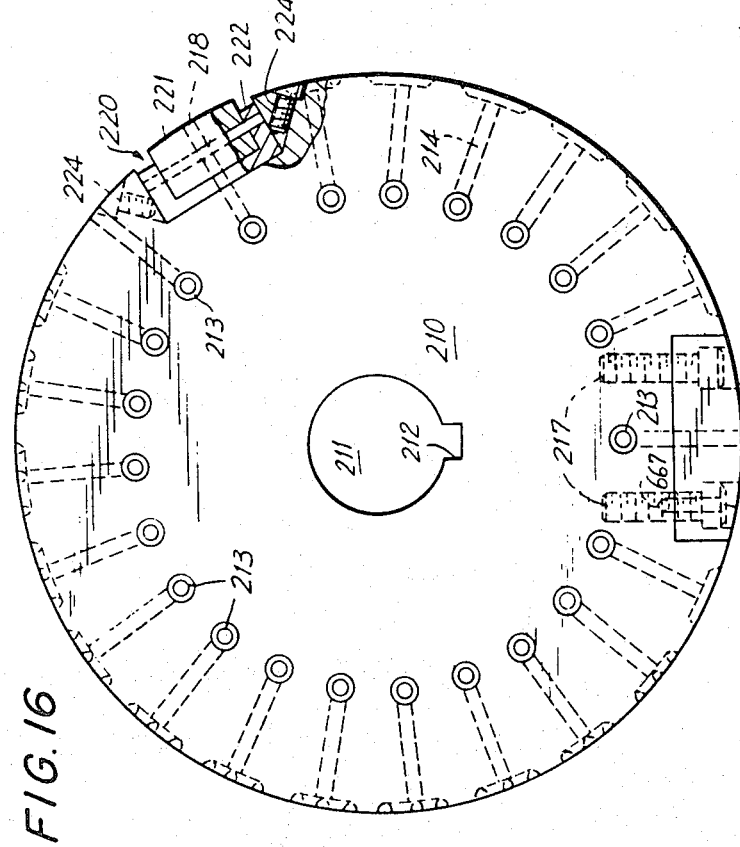
FIG. 16 is a top view of a component of the apparatus shown in FIG. 15.
Figure 17:
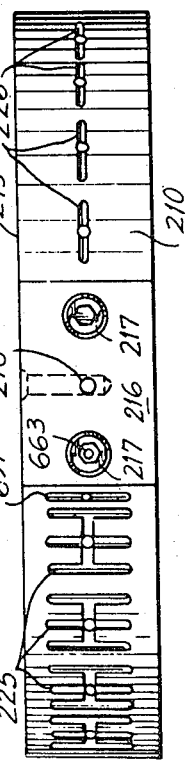
FIG. 17 is a side view of the component shown in FIG. 16.

The tape 57a is trained around the feeder roll 207 and the side of the tape 57a which does not have any adhesive is positioned adjacent to the periphery of the tape applier roll 210. A top view and side view of the tape applier roll 210 is shown in FIGS. 16 and 17, respectively. Referring to FIGS. 16 and 17, it will be seen that the tape applier roll 210 includes a shaft receiving aperture 211 having a key receiving opening 212 formed therein. A plurality of apertures 213 are provided in the top of the tape applier roll 210 and extend downwardly for approximately half the depth of the tape applier roll 210. Connecting with each of the vertical apertures 213 are radial apertures 214 which extend outwardly and communicate with the periphery of the roll 210. Thus, the apertures 214 and 214 form a plurality of conduits connecting the periphery of the tape applier roll 210 to its upper surface 215. The tape applying roll 210 is preferably constructed of an aluminum.

As best seen in FIG. 16, a portion of the periphery of the tape applying roll 210 has been removed and an insert 216 is secured to the tape applying roll 210. The outer surface of the insert 216 conforms to the periphery of the tape applying roll 210. Machine bolts 217 maintain the insert 216 in position and the insert 216 is also provided with a radially extending conduit 218 which connects with one of the vertically extending conduits 213. The insert 216 may be constructed of a metal, for example a mild steel.

Again best seen in FIG. 16, a portion 220 has been removed from the periphery of the tape applying roll 210 and a second insert 221 is positioned as shown. The insert 221 is preferably constructed of a relatively soft material, e.g. a soft rubber, and is positioned in the periphery of the tape applying roll 210 so that the outer surface of the insert 221 extends, in a radial direction, beyond the periphery of the tape applying roll 210. To secure the soft rubber insert 221 in position, the rubber insert 221 may be pinned to another insert 222 which fits snugly in the cutout 220 and is held in position by the tangentially disposed machine bolts 224. The insert 221 also includes a radial aperture 218a which communicates with one of the vertically extending apertues 213.

Hereinafter, the insert 221 will be referred to as the pickup insert and the insert 216 will be referred to as the cutoff insert. The pickup insert 221 and the cutoff insert 216 are disposed on the periphery of the tape applying roll so that the circumferential distance between the center lines of the two inserts, i.e. the circumferential distance moving in a counterclockwise direction from the insert 221 to the insert 216, is slightly greater than the circumference or outer diameter of a dispenser tube.

As shown in FIG. 17, the periphery of the tape applying roll 210 has two different arrays of recesses formed therein. As seen in FIG. 17, on the left-hand side of the cutoff insert 216, recesses 225 are formed in the periphery. The recesses 225 are in the shape of a letter 'H' with a vertically recessed portion between the upright portions of the letter 'H'. The array of recessed portions 225 extends in a clockwise direction from the cutoff insert 216 as shown in FIG. 16 to the pickup insert 221.

Referring again to FIG. 17, the periphery of the tape applying roll 210 on the right-hand side of the cutoff insert 216 is provided with horizontally disposed recesses 226. The horizontally disposed recesses 226 extend in a counter-clockwise direction, as shown in FIG. 16, from the cutoff insert 216 to the pickup insert 221.

Figure 19:
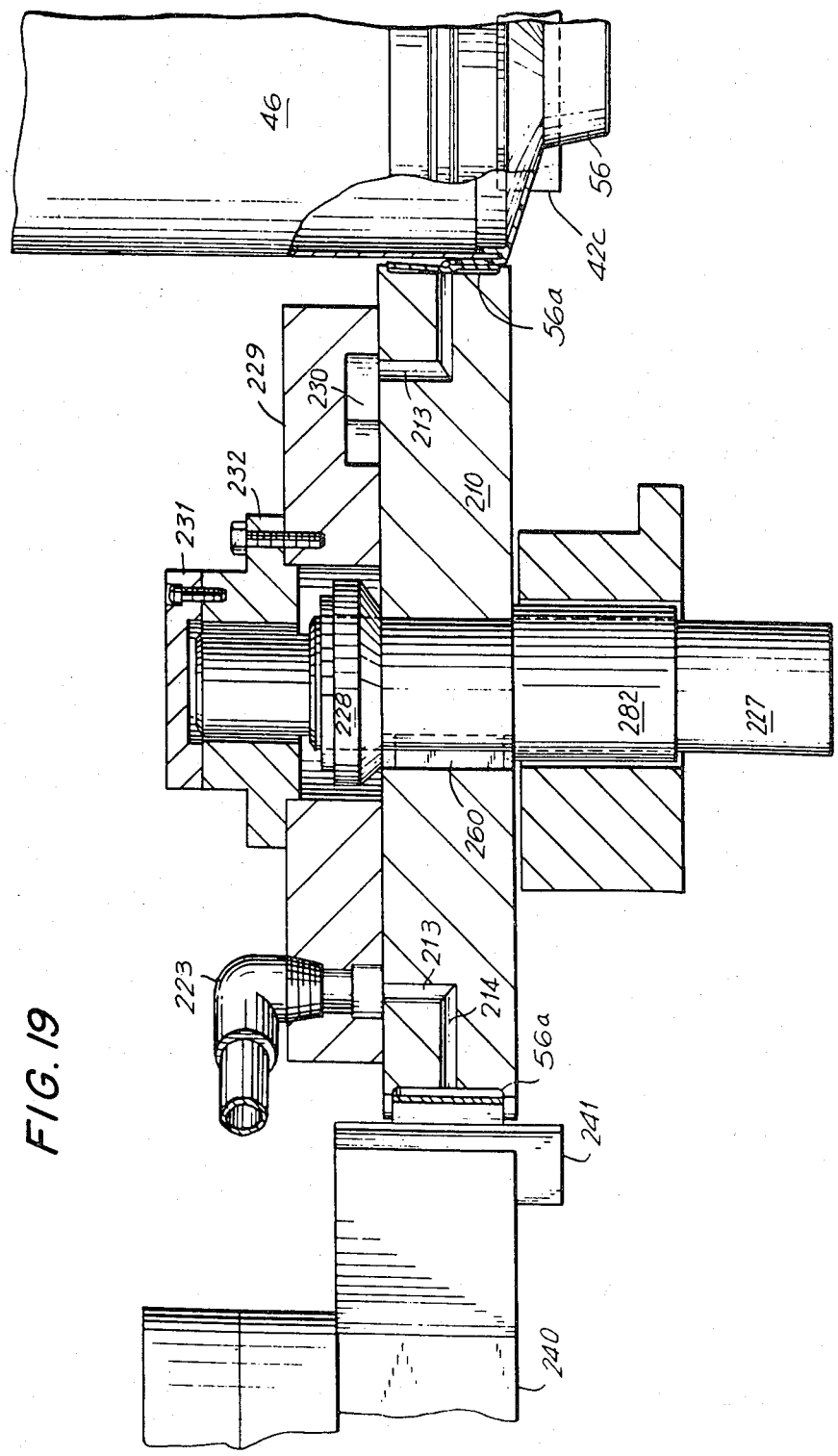
FIG. 19 is a sectional view taken along the section lines 19—19 of FIG. 15.

Referring to FIG. 19, the tape applying roll 210 is mounted on shaft 227 by the shaft retaining member 228 and key 260. The shaft 227 extends downwardly through the bearing 282 and through the surface 41 of the machine and is directly connected to the main drive shaft for timed rotation therewith. Disposed on top of the tape applying roll 210 is a manifold block 229 which has a vacuum annulus 230 formed therein. The vacuum manifold block 229 is secured in place by mounting blocks 231 and 232 and the machine bolts shown in FIG. 19, i.e. the mounting block 232 surrounds the shaft 227. The vacuum in the block 229 holds the block on the roll 210 and the block 229 is secured against rotation by the bolt 270 which extends through a plate 234. A vacuum line 223 is provided and is connected to an appropriate vacuum source, not shown, whereby a vacuum is maintained in the annulus 230. As seen in FIG. 19, the upwardly extending conduits 213 are in fluid communication with the vacuum annulus 230, whereby a vacuum or suction force may be applied to tape which is positioned adjacent to the periphery of the tape applying roll 210.

Referring again to FIGS. 15 and 18, a platform 235 is formed as part of the housing 201. Mounted on the platform 235 are spacer blocks 233. The mounting plate 234 is secured to the top of the spacer blocks 233. Machine bolts, not shown, extend through the mounting plate 234 and each of the spacer blocks 233 so as to maintain the mounting plate 234 in fixed position with respect to the platform 235. A pair of rollers 236 and 236a are rotatably mounted on the mounting plate 234 and the periphery of the rollers 236 and 236a is provided with a toothed configuration. Also extending upwardly from the housing 201 is a shaft 237 which is geared to the shaft 227 which drives the tape applying roll 210. Mounted on the shaft 237 is a roller 238. The periphery of the roller 238 is provided with a toothed configuration similar to the periphery of the rollers 236 and 236a. Trained around the rollers 236 and 236a and the roller 238 is a hard rubber belt 239 having a soft rubber outer covering and an inner, toothed connfiguration which meshes with the toothed configuration formed in the periphery of the rollers 236, 236a and 238. Thus, as the shaft 237 rotates, the rubber belt 239 rotates in the direction shown by the arrow in FIG. 18. As perhaps best seen in FIG. 15, the rollers 236 and 236a are positioned on the mounting plate 234 so that a line tangent to the two rollers, on the side thereof closest to the turret 42, will intersect with the surface of a tube 46 positioned in the station 200. As a result, the belt 239 will wrap very slightly around the surface of a tube 46 in the station 200 and the movement of the belt as shown in FIGS. 15 and 18 will cause the tube 46 shown in FIG. 15 to rotate in a counterclockwise direction. Preferably, the linear speed of the belt 239 is such that the tube 46 will rotate so that the surface speed of the tube is slightly faster than the surface speed of the tape applying roll 210.

Referring to FIGS. 15 and 18, mounted on the surface of the housing 201 is a cutoff wheel 240 which carries a cutoff knife 241. The cutoff wheel 240 is mounted on a shaft, not shown, which extends downwardly through the housing 201 and is geared, on a 1:1 gearing, directly to the shaft 227 which drives the tape applying roll 210. The tape applying roll 210 and the cutoff wheel 240 are initially aligned on the machine so that the cutoff knife 241 impinges against the cutoff insert 216 as shown in FIG. 15. When this alignment has been secured, the cutoff wheel 240 and the tape applying roll 210 continuously rotate and, upon each rotation, the cutoff knife 241 will impinge against the cutoff insert 216 between 663 and 218.

Mounted above and fixedly secured to the cutoff wheel 240 is a cam 242. The cam 242 rotates with the cutoff wheel 240 and thereby actuates microswitch 243 through movement of the cam follower 244. The microswitch is connected through a vacuum relay to the vacuum pickup cup 190 which was previously described with respect to station 100. Thus, since the cam 242 and the cutoff wheel 240 are geared to the main drive shaft through the shaft 227, the cam 242, by actuating the switch 243, provides a signal which is in correct time sequence for the release of the vacuum on the vacuum cup 190.

Considering the overall operation of the nozzle taping station 200, and referring initially to FIGS. 15 and 18, the taping sequence may be viewed as commencing when the tape is cut by the knife 241, which occurs when the knife 241 is in the position shown in FIGS. 15 and 18. Since the cuttinng knife 241 and the tape applying roll 210 rotate in timed relation, the tape is always cut at the same location on the tape applying roll 210 and at the same point in the timed sequence of the machine. Thus, since the cutting action occurs at a fixed point in time in the sequence of the machine, the point in the sequence may be defined in terms of the angular position of the main drive shaft 54. Thereby, a microswitch may be provided on the main drive shaft and operated from an appropriately positioned tape feed cam so as to provide a signal when the tape is cut, i.e. when the knife 241 is in the position shown in FIG. 15. In response to this signal, the clutch which interconnects the feed roll 207 with the main drive shaft is disengaged thereby stopping movement of the feed roll 207. As a result, tape is not fed but the leading edge of the tape is maintained in temporary sliding engagement against the periphery of the tape applying roll 210 by the vacuum formed in the horizontal recess openings 226 shown in FIG. 17 i.e., the leading edge of the tape momentarily does not move while the roll 210 continues to rotate. As, the tape applying roll continues to rotate, in time, the pickup insert 221 shown in FIG. 16 will be positioned at the same position at which the cutoff insert is shown in FIG. 18 and this position will coincide with the leading edge of the tape 57a. Once again, since the tape applying roll 210 is directly connected to the drive shaft, there is a particular angular position of the drive shaft which will correspond to the position of the tape applying roll when the tape pickup insert 221 is adjacent to the leading edge of the tape 57a. The tape feed cam is thus positioned to provide closure of the tape feed microswitch when this point in the sequence occurs and, thereby, the clutch which connects the tape feed roll 207 to the main drive shaft is engaged. Thereby, feed of the tape 57a commences when the tape applying insert 221 is adjacent to the leading edge of the tape. Upon continued rotation of the tape applying wheel 210, the tape feed roll 207 continues to rotate the feed tape at a speed equal to the surface speed of the tape applying wheel 210. The larger recessed areas 225 shown in FIG, 17 insure that the tape stays in contact with the tape applying roll 210 until it reaches the nozzle 56 as the rolls 207 and 210 rotate. Upon continued rotation of the tape applying roll 210, the tape applying insert 221 will come into contact with a tube and nozzle positioned in the station 200. Because the tape pickup insert 221 is made of a soft rubber material and because its outer surface extends beyond the outer periphery of the tape applying roll 210, the tape applying insert 221 conforms the tape to the nozzle, i.e. the insert 221 presses the tape against the nozzle. In this connection, it should be remembered that the tube 46 is being rotated at a surface speed which is slightly faster than the surface speed of the roll 210. Thus, once the tape has been applied to the nozzle, subsequent rotation of the tube 46 will pull the tape so that it adheres to the nozzle and there is no further need to press the tape against the nozzle. Therefore, as seen in FIG. 19, the remainder of the periphery of the tape applying roll 210 does not press the tape directly against the nozzle. Rather, rotation of the tube is utilized to apply the tape to the nozzle. With respect to the rotation of the tube and the nozzle, it should be noted that there is a force fit between the tube and the nozzle. Thus, rotation of the tube causes rotation of the nozzle. The tape is secured to the tube as the tube is indexed through the machine, i.e. attached to posts associated with stations 300 and 500 are fixed arcuate members 399 and 599, shown in FIGS. 20 and 26, respectively, which press the tape against the tube as the tube passes.

As previously stated, the circumferential distance between the tape pickup insert 221 and the tape cutoff insert 216 is slightly greater than the circumference of the tube 46, so that the entire circumference of the nozzle is taped and there is some degree of overlap.

Upon continued rotation of the tape applying roll 210, the cutoff insert 216 will again be positioned in the angular relation shown in FIG. 18, at which point it will be once again cut and the sequence described above will then be repeated.

As indicated earlier, a tube sensing means is provided in the station 200 to detect the presence of a tube. Such a tube detection means may be a microswitch having a lever arm extending therefrom which is moved by the presence of the tube positioned within the station. The output of such a microswitch is connected in series with the output of the switch which actuates the tape feed roll 207. Thus, it will be seen that activation of the tape feed roll 207 will occur only when two conditions are satisfied, i.e. a tube is present in station 200 and the tape applying roll is in the correct angular position, i.e. the angular position wherein the tape pickup insert is positioned at the leading edge of the previously cut tape. When these two conditions occur, the clutch is engaged and the tape applying roll 207 is actuated. Thus, by this means, it is insured that tape will not be applied if a tube is not present in the station.

Nozzle Sealing Section 300

The nozzle 56, which is mounted on the tube in station 200, has an open bottom. Thus, before the tube can be filled, the open end of the nozzle must be sealed. The nozzle sealing station 300 performs this function. FIGS. 20-25 show different views of the nozzle sealing section and component parts thereof.

Figure 20:
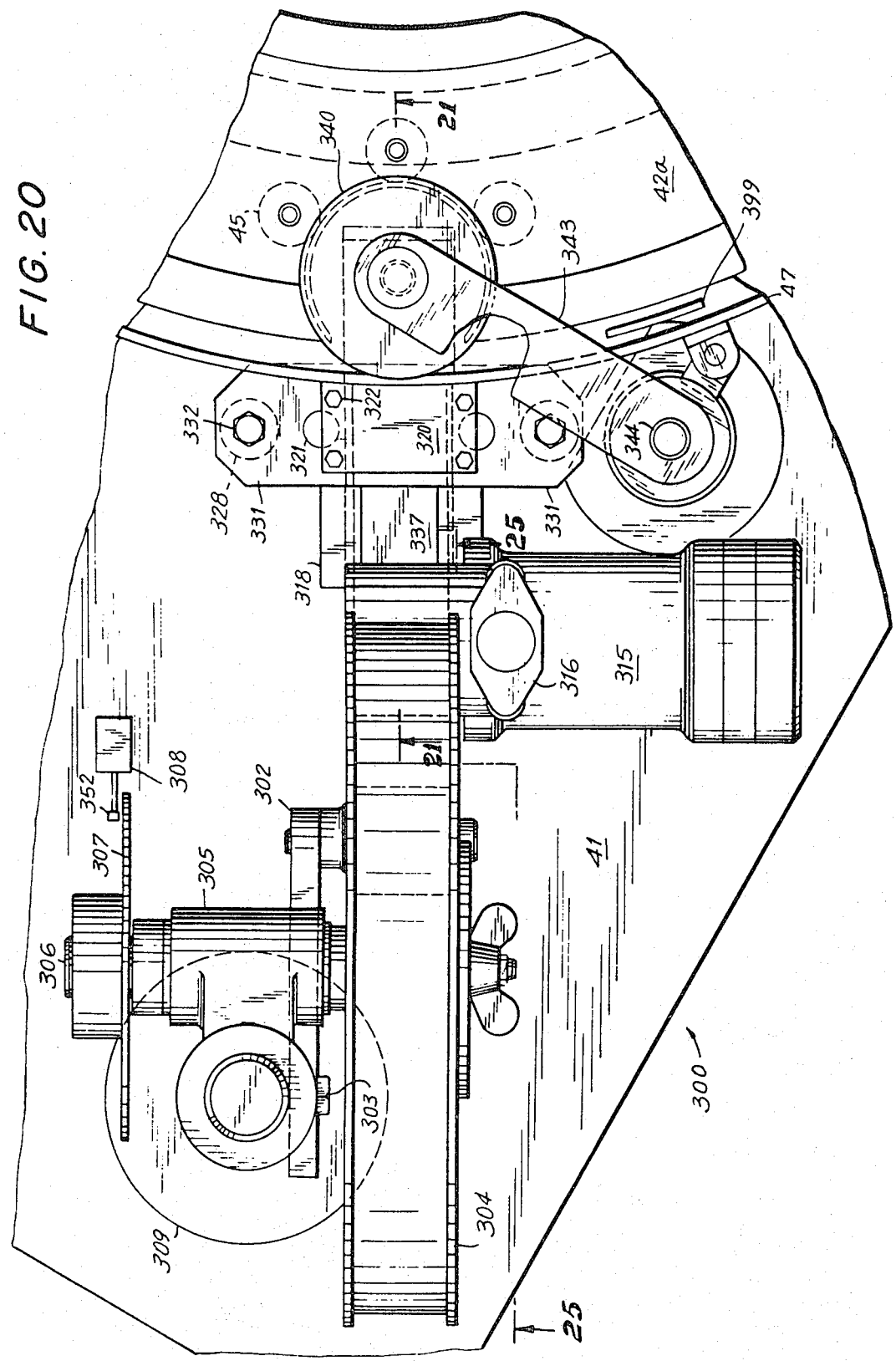
FIG. 20 is a top view of the third operating station shown in FIG. 2.
Figure 25:
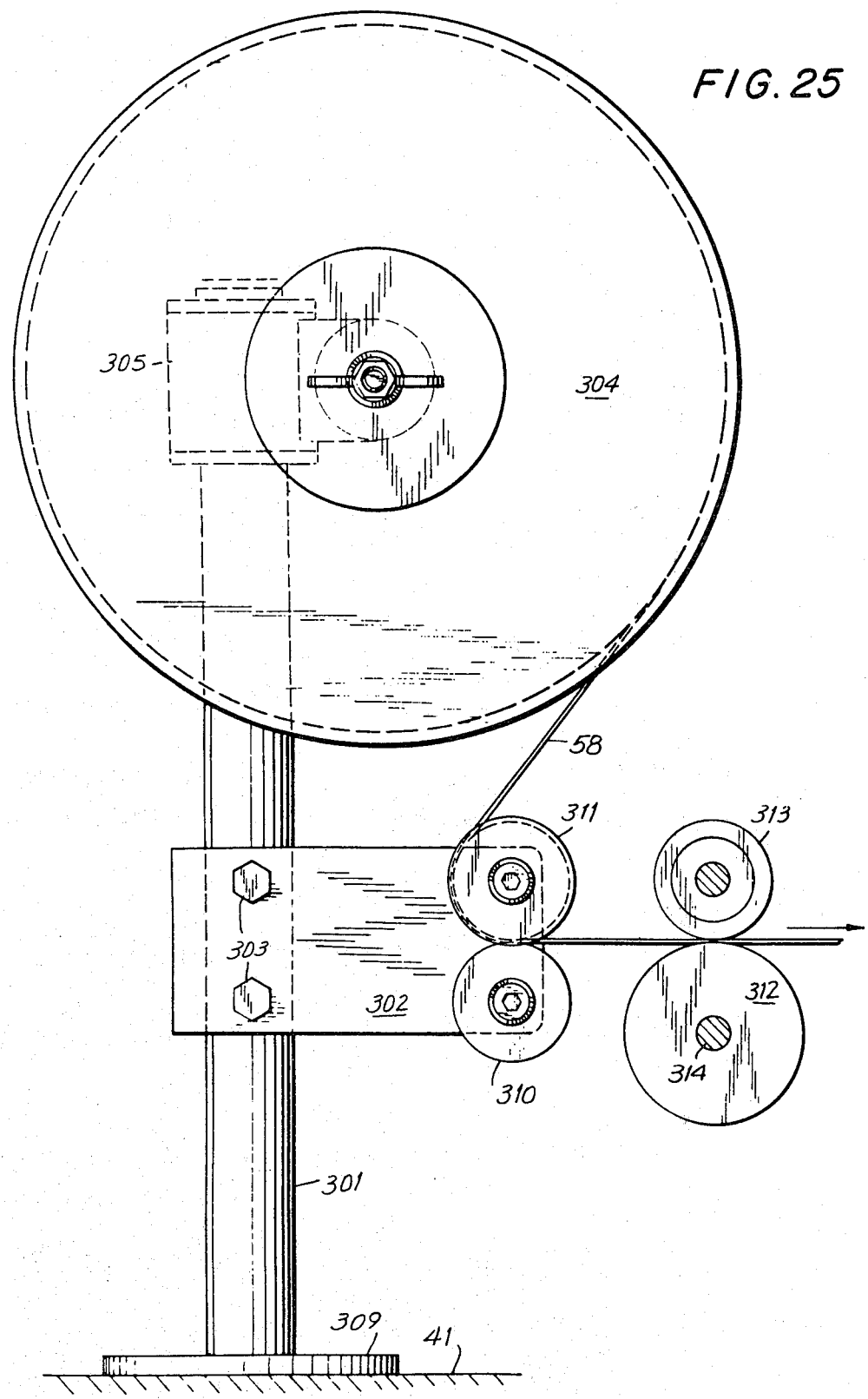
FIG. 25 is a side view taken along the lines 25—25 of FIG. 20.

Referring to FIGS. 20 and 25, base 309 is secured to the upper surface 41 of the machine and stanchion 301 extends upwardly from base 309. At the upper end of stanchion 301 is fixture 305. The fixture 305 surrounds the stanchion 301 and includes an outwardly extending part through which extends shaft 306, shown in FIG. 20. On one end of shaft 306 there is mounted a foil supply roll 304 which is held in place by a wing nut 317. The foil supply roll 304 is rotatably mounted on shaft 306. As shown in FIG. 20, at the other end of the shaft 306 there is provided a friction wheel 307 which is fixedly secured to the shaft 306. The outer periphery of the friction wheel 307 is connected to a brake assembly 308 by the shaft and roller 352. The purpose of the brake assembly 308 is to insure that the foil supply roll 304 does not free wheel when foil is being withdrawn therefrom.

Referring to FIGS. 20 and 25, a mounting plate 302 is secured to the stanchion 301 by bolts 303. Rotatably mounted on the mounting plate 302 are idler rollers 310 and 311. As shown in FIG. 25, the foil 58 comes off the roll 304, around and between the idler rollers 310, 311 and continues through the rollers 312, 313. The rollers 312 and 313 are feed rollers and, more particularly, the roller 312 is the driver roller and has a knurled surface. The roller 313 is a friction and backing roller The roller 313 is vertically movable by means hereinafter described. Thus, by vertical movement of the roller 313 away from the foil 337, feeding of the foil 337 will cease.

Referring particularly to FIG. 20, drive unit 315 is mounted by appropriate means on the machine. The output shaft of drive unit 315 is the shaft 314 shown in FIG. 25. The drive unit 315 is comprised of a rack and gear assembly. The gear is secured to the shaft 314 shown in FIG. 21. The rack is driven from the main drive shaft by appropriate linkage. Also, two clutches are provided in the drive unit 315. The first clutch allows the wheel 312 shown in FIG. 21 to be driven in a clockwise direction when the rack is moved in one direction. The second clutch allows the rack to move in the opposite direction while holding the wheel 312. In operation, the rack continuously reciprocates.

Mounted above the drive unit 315 is an air actuated cylinder 316. When the cylinder 316 is actuated, it drives the roller 313 downwardly so as to bring the roller 313 in contact with the foil 337, i.e. the air cylinder 316 provides means for disabling the tape feed. The drive unit 315 is operated during movement of the turret 42.

Figure 21:
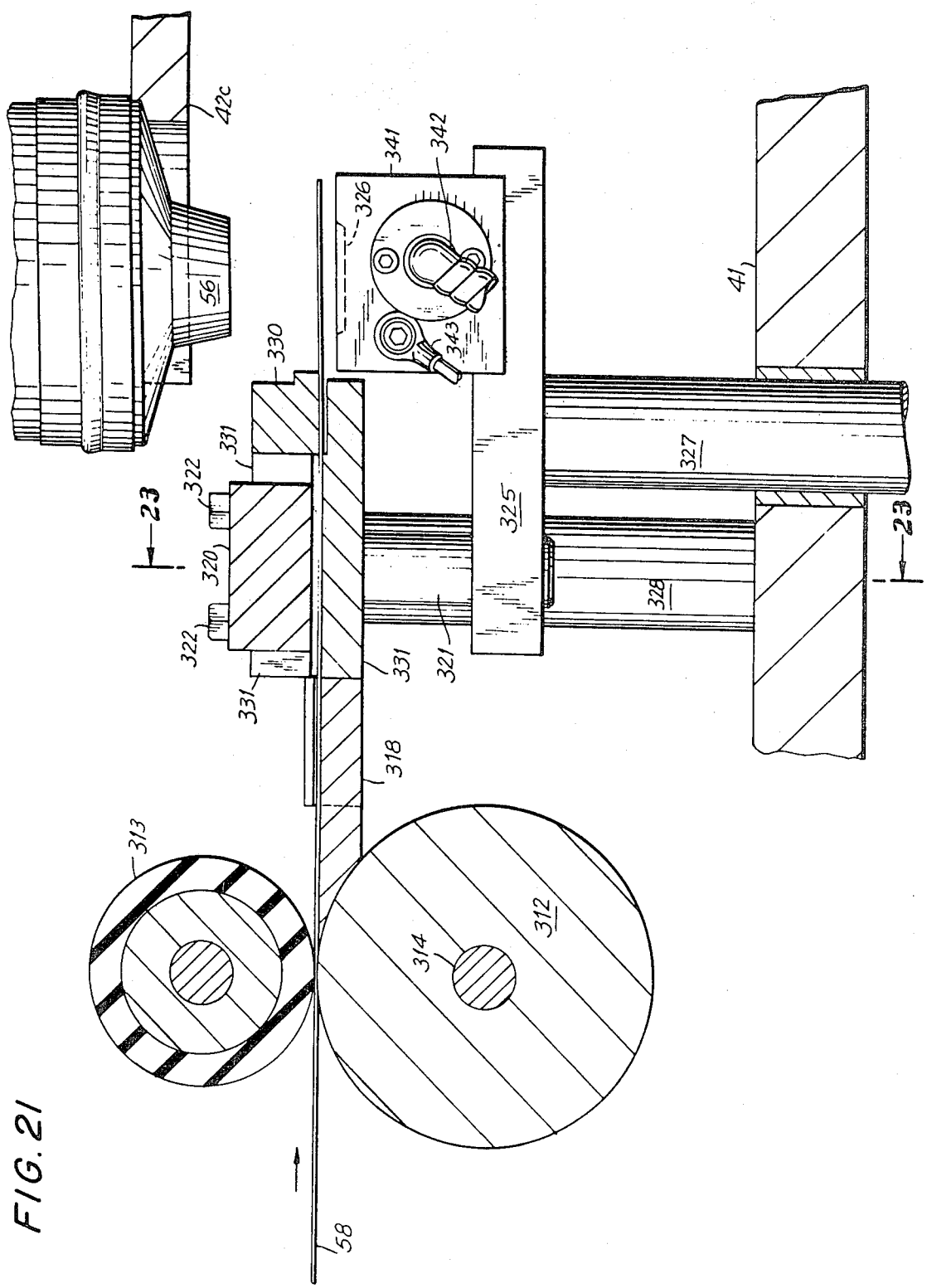
FIG. 21 is a side view, partially in section, taken along the section lines 21—21 of FIG. 20.
Figure 23:
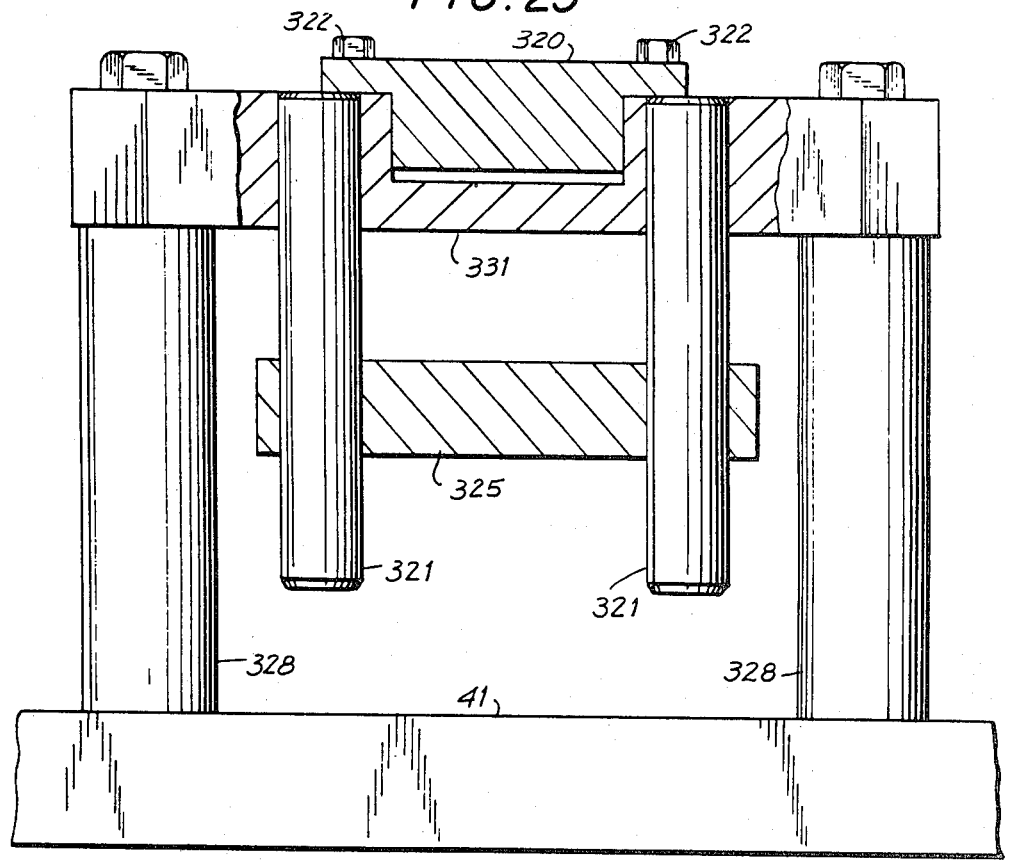
FIG. 23 is a view, partially in section, of a part of the apparatus shown in FIG. 20.

As shown in FIG. 23, a support plate 331 is bolted to the upper surface 41 of the machine and is maintained in spaced relation with respect to the surface 41 of the machine by spacer sleeve 328. As shown in FIGS. 20, 21 and 23, a cover plate 320 is secured to the support plate 331 by machine bolts 322. As best seen in FIG. 23, the center portion of the support plate 331 has been removed and a portion of the cover plate 320 extends downwardly into the removed portion of the support plate 331, thereby defining a slot 331 through which the foil 58 passes. Guide rods 321 are fixedly received in the support plate 331 and extend downwardly therefrom. Plate 325 is slidably mounted on the guide rods 321. As shown in FIG. 21, a vertically movable rod 327 is secured to the plate 325. Thus, as rod 327 is moved up and down, the plate 325 vertically reciprocates. The reciprocating rod 327 is connected by an appropriate crank mechanism, not shown, to the main drive shaft 54 so as to provide the desired intermittent vertical motion upon rotation of the main drive shaft.

Mounted on one end of the plate 325 is a block 341 having an electrical heater mounted therein. The electrical connections 342, 343 provide appropriate electrical power to the heater which heats the block 325.

Figure 22:
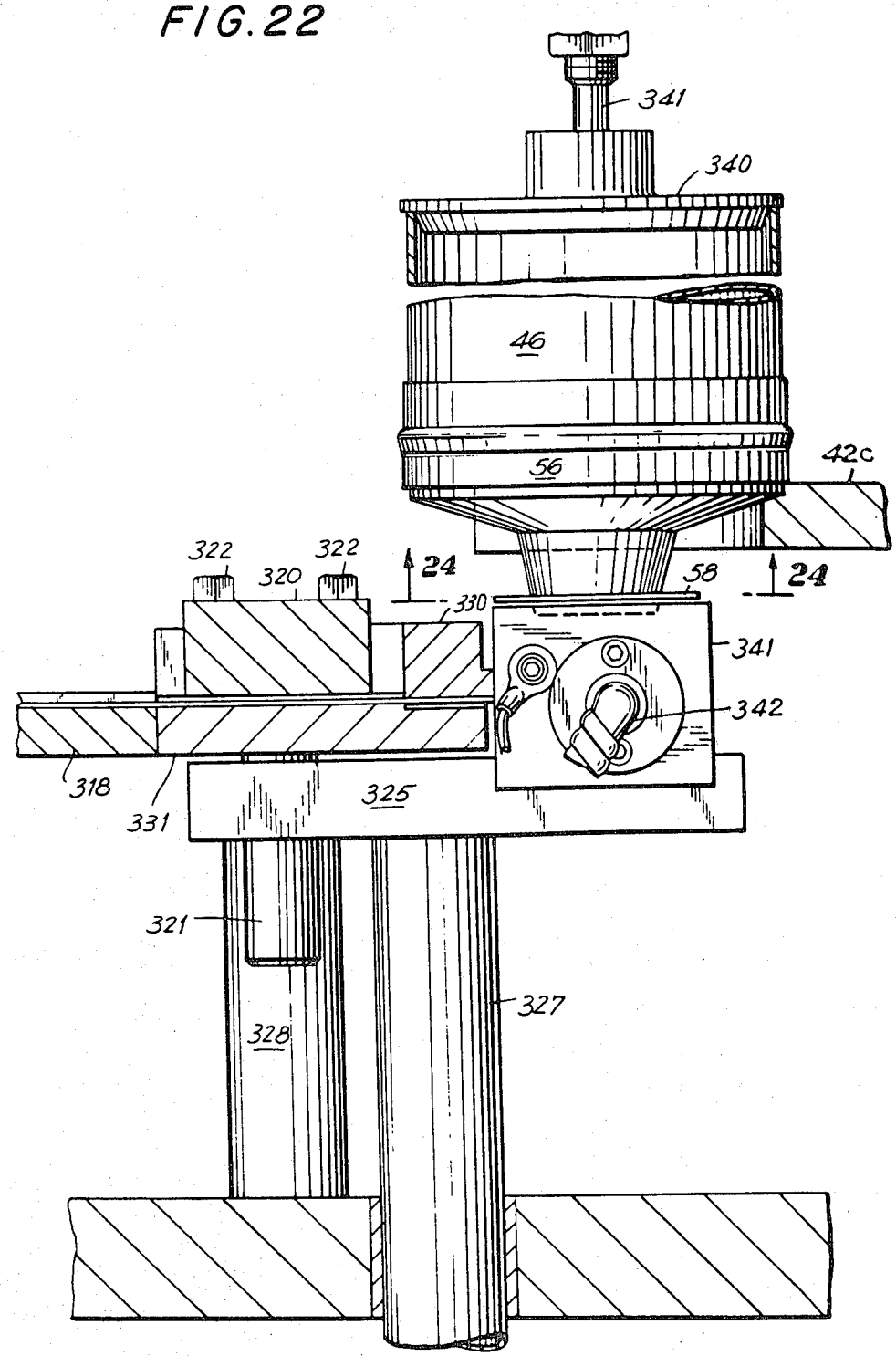
FIG. 22 is a side view, partially in section, of a part of the apparatus shown in FIG. 20.

A sheering block 330 is secured to the support plate 331 to provide the configuration shown in FIGS. 21 and 22. Also, as may be seen in FIGS. 21 and 22, the block 341 is disposed beneath the turret and, more particularly, directly beneath the open end of a nozzle positioned in station 300.

A plate 318, shown in FIG. 21, is secured to the support plate 331 and functions as a pan to support the foil 58 when it leaves the rollers 312, 313.

In operation, the nozzle sealing section 300 functions in the following manner. When the turret of the machine commences to rotate so as to move a dispenser tube 46 from the taping station 200 to the nozzle sealing section 300, switch 63 shown at station 200 in FIG. 2 closes. In response to the closure of this switch, the cylinder 316 shown in FIG. 20 is actuated whereby the wheel 313 shown in FIG. 21 is driven downwardly to form a nip with the wheel 312. Thereby, when the wheel 312 rotates, foil 58 is fed. Also, if a tube is not detected leaving the station 200, the wheel 313 is not moved downwardly and feeding does not occur. A predetermined length of foil is fed by rotation of the wheel 312 when the rack reciprocates in one direction. After a tube has moved from station 200 and foil has been fed, the cylinder 316 shown in FIG. 20 is reverse actuated by opening of the switch 63. Thus, foil is not fed if a signal is not received indicating that a tube has left station 200. FIG. 21 shows the position of the foil 58 after feed has stopped.

After a tube 46 and nozzle 56 have been positioned in station 300 and the foil has been fed to the position shown in FIG. 21, the shaft 327 is moved upwardly as a result of continuing rotation of the main drive shaft.

Referring to FIGS. 21 and 22, as the shaft 327 moves upwardly, the portion of the foil 58 which extends beyond the shearing block 330 is sheared when the upper left-hand corner of the block 341 passes the shearing block 330. Thereafter, the shaft 327 continues in its upward movement, whereby the sheared off portion of the foil 58 is moved upwardly toward the nozzle 56. Simultaneously, a circular backing plate 340 is moved downwardly. The backing plate 340 is positioned above a tube located in the station 300 and moves downwardly in response to the actuation of an air cylinder (not shown) which is secured on top of the horizontally extending arm 343 shown in FIG. 20. The other end of the arm 343 is connected to the stanchion 344 which extends downwardly to the upper surface 41 of the machine. Thus, as shown in FIG. 22, the backing plate 340 moves downwardly into the tube 46 and the block 341 moves upwardly whereby the cutoff portion of the foil 58 is pressed against the open end of the nozzle 56. The nozzle 56 is preferably made of a thermoplastic material, for example polyethelene. The foil is provided with a heat activated adhesive material on its top surface. During upward movement of the block 341, after the shearing action has occurred, the heated block 341 activates the adhesive material on the top surface of the foil 58. Thereby, when the cutoff portion of the foil 58 is pressed against the open end of the nozzle 56, the foil 58 adheres thereto. To insure that the foil is adhered to the periphery of the nozzle, a pocket 326 is formed in the block 341.

Figure 24:
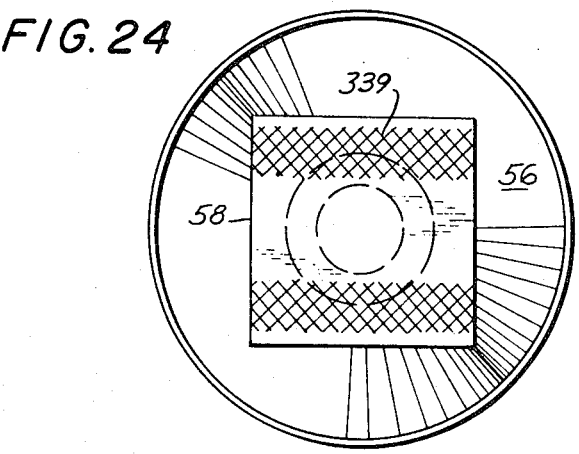
FIG. 24 is a view taken along the lines 24—24 of FIG. 22.

After the portion of the foil 58 is secured to the open end of the nozzle 56, the shaft 327 is moved downwardly and the backing plate 340 shown in FIG. 22 is moved upwardly. At the end of the downward movement of the shaft 327, the next portion of the foil is ready to be fed and the cycle is repeated. FIG. 24 shows a portion of the foil after it has been knurled as shown at 339.

FILLING STATION 400

At station 400 the tube is filled with the desired material. In general, any conventional automatic filling apparatus may be employed which is mechanically compatible with the instant machine. Thus, a filling apparatus is required which is so arranged that the discharge nozzle of the apparatus may be positioned over the open end of a tube which carries a sealed nozzle. The filling apparatus must be automatically operable in response to a signal indicating the presence of a tube at the station. Additionally, the apparatus must have the capability to fill the tube with a time period which is slightly less than the dwell time between indexing of the turret.

With respect to the actuation of the filling apparatus, the instant apparatus is provided with a switch 69 at station 400 (FIG. 2). Closure of the switch 69 indicates the presence of a tube at station 400 and actuates the filling apparatus. As is the case with conventional filling systems of this type, once a signal has been received which actuates the system, the filling process will be automatically stopped when the prescribed amount of material has been discharged.

Plunger Applying Station 500

The function of this station is to insert a plug or plunger 60 into a tube which has been filled at the filling station. As previously noted, when a dispenser tube produced by this apparatus is used, the tube will be placed in a gun having a trigger-like handle. After the foil has been removed from the end of the nozzle, movement of the trigger handle will advance a plunger 60 member which will press against the plunger 60 within the tube. As the plunger 60 within the tube moves forward, it will force the material within the tube to be dispensed through the nozzle 56.

Figure 26:
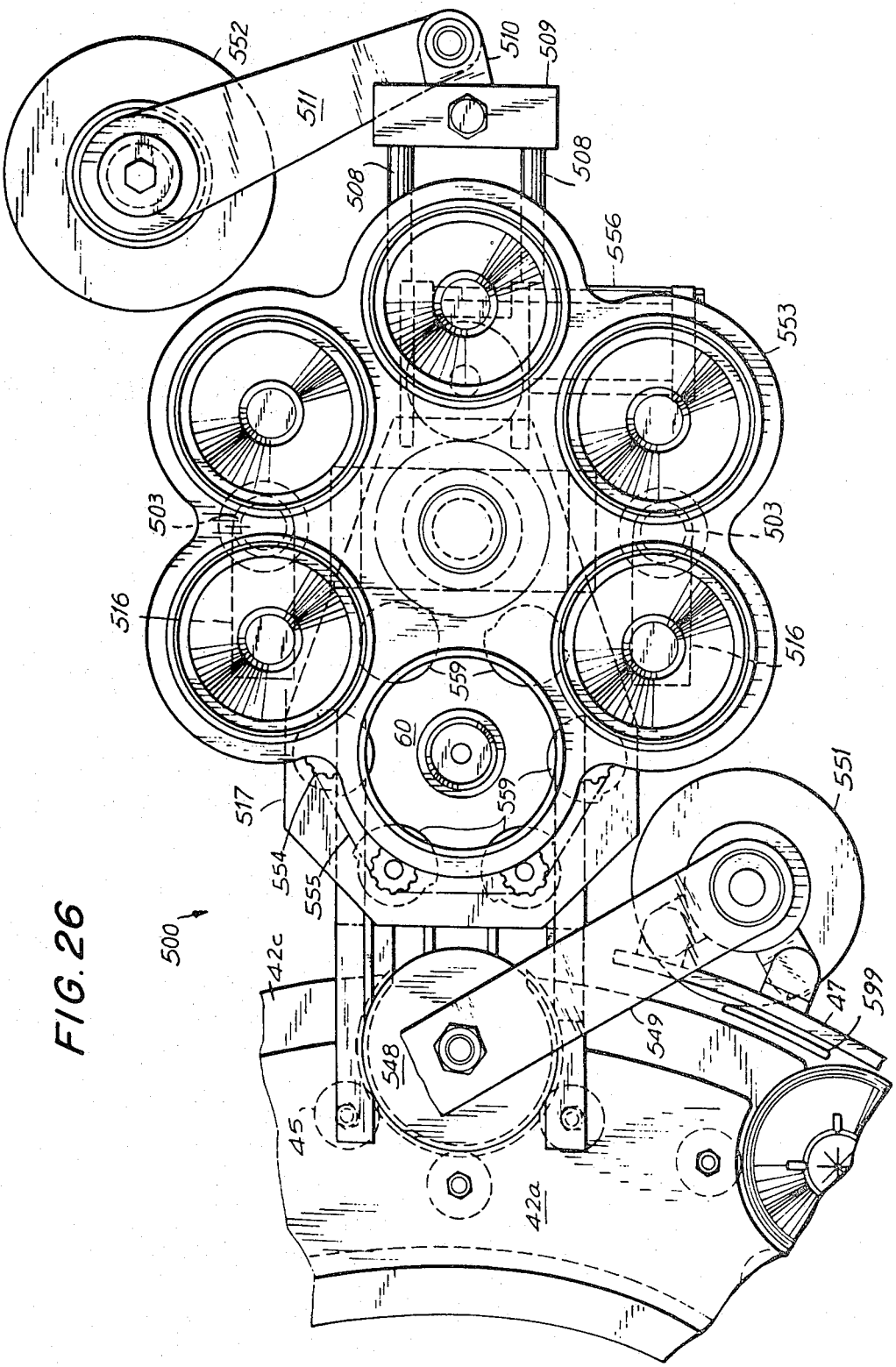
FIG. 26 is a top view of the fifth operating station shown in FIG. 2.

FIGS. 26 through 31 show various views of the plunger applying station 500 and component parts thereof. The plunger station 500 includes a plunger storage and feeding subassembly which is essentially identical in construction to the nozzle storage and feeding assembly previously described with respect to station 100. Referring to FIG. 26, there is shown a top view of the plunger station 500 in which the the plunger storage and feeding mechanism may be seen. Thus, this mechanism includes a support plate 517. Mounted on the support plate 517 are sprocket wheels 514 around which chain 555 is trained. Also shown is air motor 556 which rotates a storage magazine 553. Also shown in FIG. 26 are portions of cams 559 which perform the same dispensing function as the dispensing cams shown in connection with nozzle station 100.

Mounted above the plate 517 is the rotatable storage magazine 553 which includes a plurality of upstanding cylindrical tubes into which plungers may be loaded. Since the operation of the plunger storage and feed subassembly is the same as the construction and operation of the nozzle storage and feed assembly of station 100, no further description thereof will be presented, other than to note that the plunger feeder cams 559, like the cams 121 in station 100, have upper and lower lobes and the upper lobes on the cams 559 are preferably oriented so that they contact the line defined by the contact between the two lowermost plungers and thereby the upper cams physically separate the lowermost plunger from the adjacent plunger.

Figure 27:
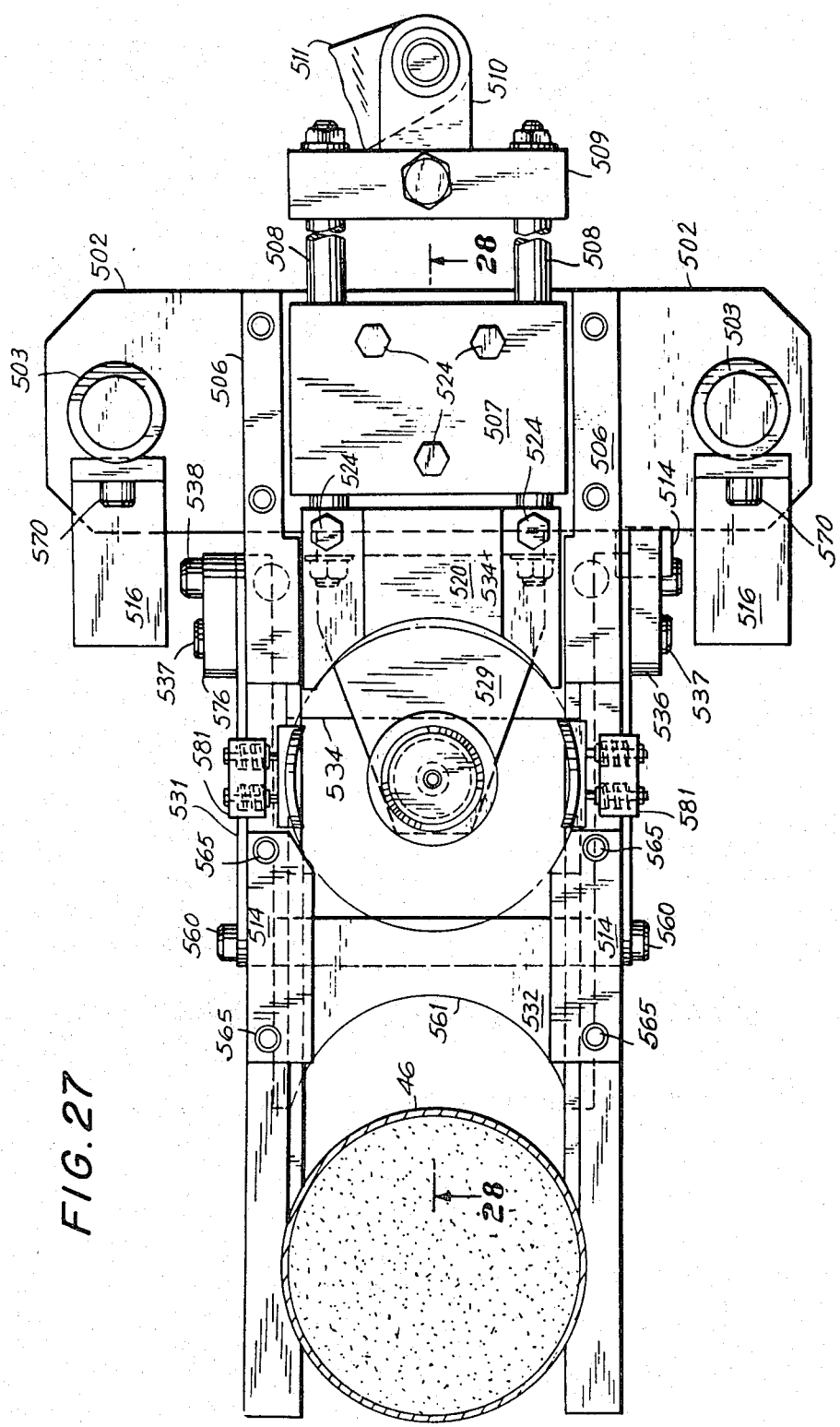
FIG. 27 is a top view of a portion of the apparatus shown in FIG. 26.

FIG. 27 is a plan view of the plunger station 500 with the plunger storage and feed subassembly removed.

Figure 28:
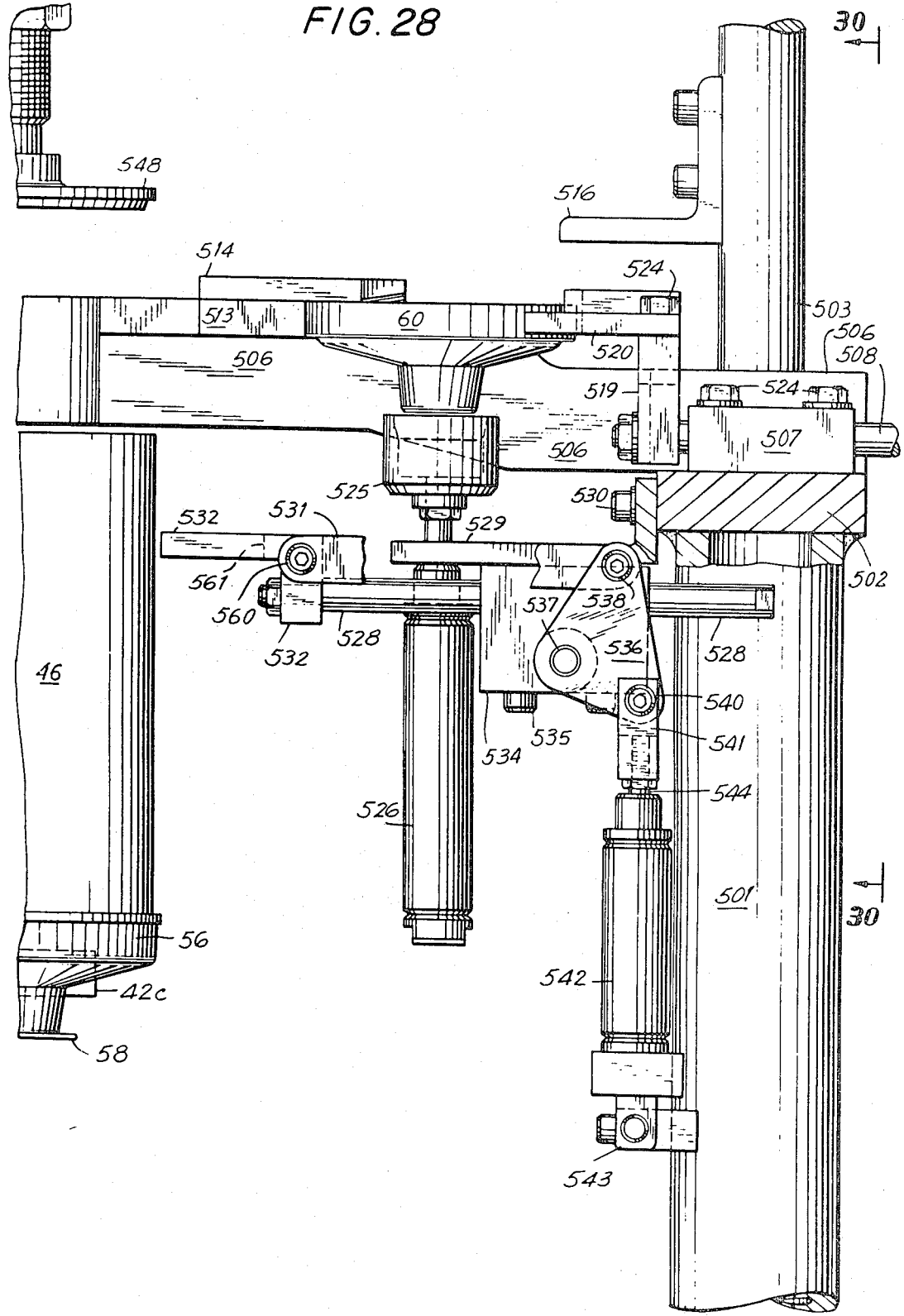
FIG. 28 is a sectional view taken along the section lines 28—28 of FIG. 27.
Figure 29:
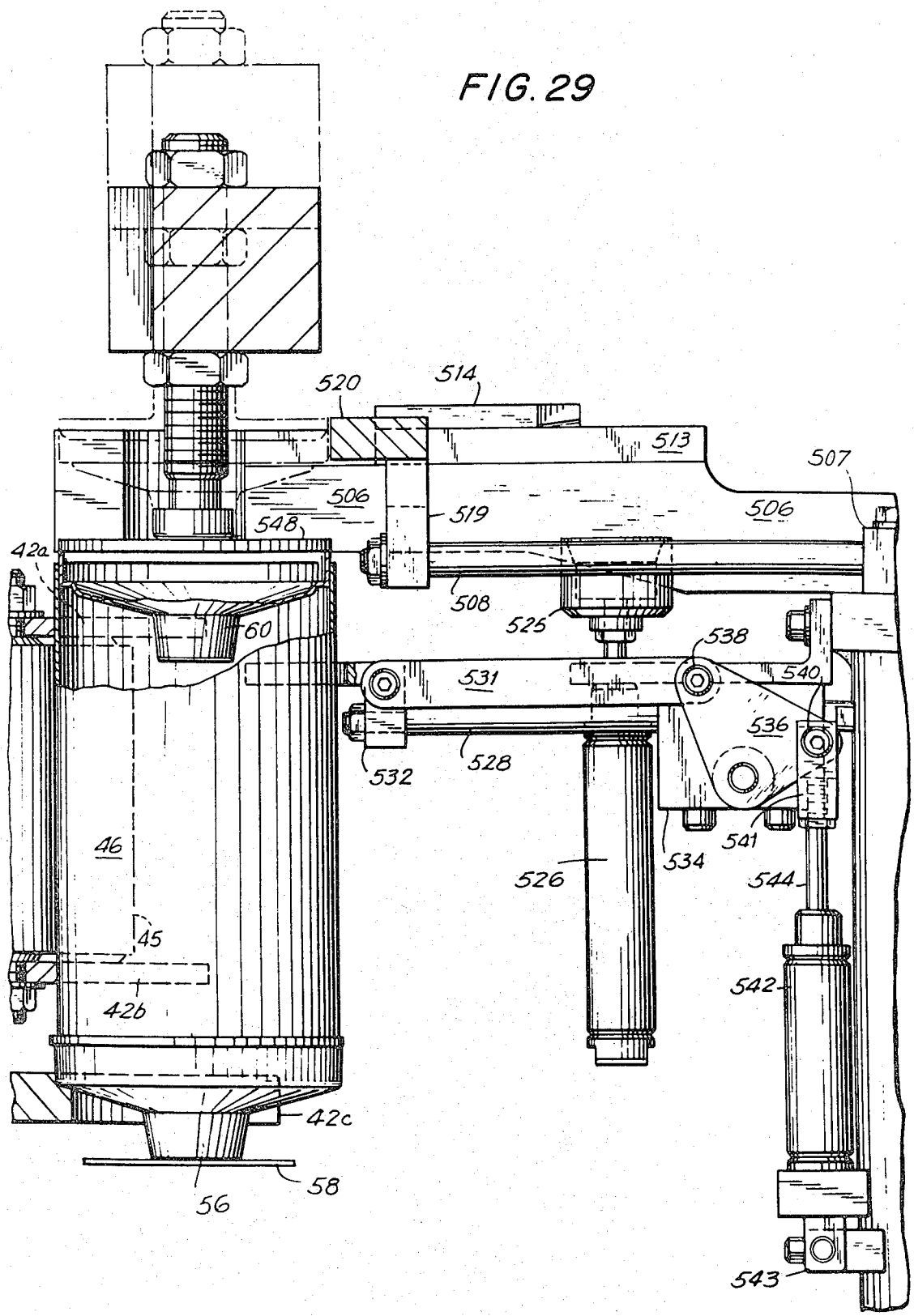
FIG. 29 is a view of the apparatus shown in FIG. 28 with the component parts thereof in a different position.
Figure 30:
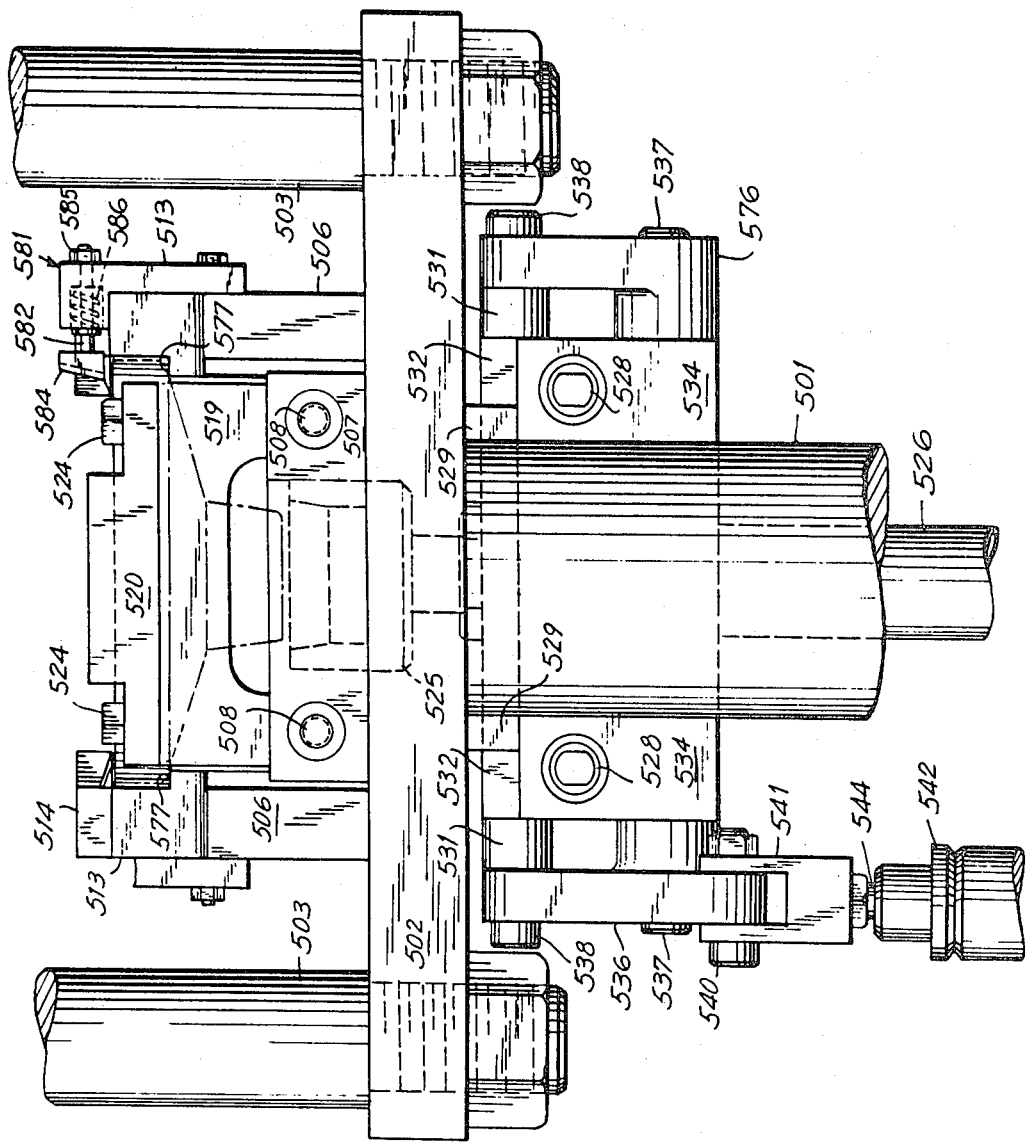
FIG. 30 is a view taken along the lines 30—30 of FIG. 28.

Referring to FIGS. 27, 28, 30 and 31, a stanchion 501 is secured to the top surfaces 41 of the machine and extends upwardly therefrom. At the upper end of the stanchion 501, a mounting plate 502 is secured to the stanchion 501 by, for example, welding. As seen in FIG. 30, a pair of mounting rods 503 are secured to opposite ends of the mounting plate 502 and extend upwardly therefrom. Secured to each of the mounting rods 503 is a bracket 516, one of which is shown in FIGS. 28 and 31. (For clarity, a portion of the left-hand side of the plate 502, including one of the rods 503, has been cut away in FIG. 31.) The mounting plate 517 for the plunger storage and feed assembly is secured to the brackets 516 as seen in FIG. 26. The plate 517 and the plunger storage and feed assembly have not been shown in FIGS. 27-31 for clarity.

Referring to FIGS. 27 and 31, guide block 507 is secured by machine bolts 524 to the top of mounting plate 502. Guide block 507 is provided with a pair of apertures through which guide rods 508 are slidably received. The outer ends of the guide rods 508 are received in connecting block 509. Connecting block 509 is connected by a link 510 and a crank arm 511 to a vertical shaft 512 which is received in bearing 552 which is secured to the upper surface 41 of the machine. The shaft 512 extends down through the surface 41 of the machine and is connected by appropriate mechanical linkage to the main drive shaft whereby, upon rotation of the drive shaft, the arm 511 will oscillate back and forth through a limited rotational movement to move the block 509 and the guide rods 508.

As shown in FIG. 28, the other ends of the guide rods 508 are received in mounting block 519. Plunger pushing block 520 is secured to the top of mounting block 519 by machine bolts 524. A bracket 529 is secured by machine bolts 530 to the inner vertical surface of mounting plate 502. A double acting cylinder 526 is fixedly secured to the bracket 529. Secured to the piston which extends from the cylinder 526 is a vacuum cup 525, the vacuum connection for which has not been shown in the accompanying drawings for clarity.

A mounting block 534 is secured to the under surface of the bracket 529 by machine bolts 535. A pair of apertures are provided in the mounting block 534 and guide rods 528 are slidably received therein. As seen in FIG. 28, the end of the guide rods 528 are secured to the tooling member 532. As seen in FIG. 27, the tooling member 532 has a circular frontal surface 561, the radius of which corresponds to the radius of a tube 46. At opposite sides of the tooling member 532, a respective link 531 is connected to the tooling member 532 by pin 560. As seen in FIG. 28, the link 531 shown therein is pinned at its other end, by pin 538, to crank arm 536. Crank arm 536 is pinned at 537 to mounting block 534. Additionally, a link 541 is also pinned at 540 to the crank arm 536. The link 541 is connected to piston 544 which extends from the double acting cylinder 542. The cylinder 542 is fixedly connected, at its lower end, by mounting member 543 to the stanchion 501.

Referring to FIGS. 27 and 30, a crank arm 576 is provided on the other side of mounting block 534. The crank arm 576 is pinned at 537a to the mounting block 534 and is also pinned at 538a to another link 531a.

Referring to FIGS. 27, 28 and 31, a pair of pedestal blocks 506 and 506a are secured to the mounting plate 502 and extend inwardly toward the machine turret. Ledges 577 and 577a are formed in of the pedestal blocks 506 as seen in FIG. 30. Blocks 514 and 514a are secured to the pedestal block 506 by machine bolts 565. The blocks 514 and 514a extend toward each other, as may best be seen in FIGS. 27 and 31, whereby a channel is formed between the ledges 577 and 577a and the overhangs of the blocks 514 and 514a. The channel thus formed is used as a guide channel during movement of a plunger 60.

As shown in FIG. 27, two plunger retaining assemblies 581 and 581a are provided and each is mounted on a respective one of the blocks 506 and 506a. For clarity, only one of the plunger retaining assemblies 581 is shown in FIGS. 30 and 31. As shown in FIG. 30, the plunger retaining assembly 581 includes receiving blocks 513 and 513a, secured to adjacent pedestal blocks 506 and 506a. Each block 513 is provided with two apertures in which guide rods 582 are received. A plunger retaining block 584 is secured to the pair of rods 582 and nuts 585 are mounted on the other end of rods 582. The apertures in the blocks 513 and 513a are counter-bored to receive springs 586. Thus, the plunger retaining blocks 584 are slidably mounted on blocks 513 and 513a and are spring biased outwardly away from the blocks 513 and 513a.

As best seen in FIGS. 27 and 31, the inner surfaces of the plunger retaining blocks 584, which are above a tube positioned in the station 500, are provided with concave surfaces and are dimensioned so that a plunger positioned between the surfaces will be retained by a slight interference fit.

In operation, station 500 functions in the following manner. Initially, the turret 42 is rotated so as to position a filled tube 46 in the plunger station 500. When a tube 46 has been thus positioned in the station 500, a signal is generated by a cam-operated microswitch associated with the main drive shaft 54 of the machine. The output of this switch is connected in series with the output of the switch contact 65 shown in FIG. 2, switch 65 being the switch which detects the presence of a tube in the station 500. When both of these switches are closed, a circuit is completed which actuates the motor which drives the plunger feeding cams 559 and thereby a plunger 60 is fed by the plunger feed mechanism. As previously stated, the feeding of the plunger 60 occurs in the same manner as occurred for the feeding of nozzle in station 100.

As a plunger 60 is being fed, another signal is generated from another microswitch associated with the main drive shaft and this signal actuates double-acting cylinder 526 so as to raise the vacuum cup 525, shown in FIG. 28, upwardly and to actuate the vacuum line associated therewith. In this manner, as the plunger 60 is fed, it is pulled into the vacuum cup 525, and, thereafter, the cylinder 526 is reverse actuated by opening the switch driven from the main drive shaft and vacuum cup 525 is moved downwardly. During its downward movement, the vacuum cup 525 pulls a plunger past the plunger retaining blocks 584 and the blocks 584 move outwardly to allow the plunger to pass. Thereafter, the plunger is deposited on the ledge 577 of the pedestal blocks 506 and the vacuum is broken. As soon as the plunger passes by the blocks 584, they move toward each other and thereby trap the plunger. In this manner it is assured that the plunger is captivated and retained when it hits the ledge 577. Thereafter, another cam-operated switch associated with the main drive shaft is closed and thus actuates the cylinder 542. When cylinder 542 is thus actuated, piston 544 is driven upwardly which rotates the crank arm 536 in a counterclockwise direction as shown in FIG. 28. Thereby, through links 531 and 531a, the tooling member 532 is driven toward the tube 46 and engages the tube 46 to insure that it is in a rounded condition. As may be seen in FIG. 26, the sides of the tube abut the rollers 45 and the rollers 45 act as backing members to support a tube when it is engaged by the tooling 532. Substantially simultaneously with the actuation of the cylinder 542, the shaft 512 as shown in FIG. 31 is rotated through its limited arc of travel. Shaft 512 is connected directly to the main drive shaft by appropriate linkage. When the shaft 512 rotates, the plunger pusher assembly 520 commences to move forward. As seen in FIG. 28, a plunger 60 has been positioned in front of the plunger pusher 520. Upon forward movement of the plunger pusher 520, the plunger 60 will slide along the ledge surfaces 577 and through the channel formed by the ledge surfaces 577 and the overhanging portions of the blocks 514. Movement of the plunger pusher 520 continues until the plunger 60 has been positioned within the concave surfaces at the end of the pedestal blocks 506.

As shown in FIGS. 26, 28, 29 and 31, a plunger positioning plate 548 is connected to a horizontally extending arm 549. The arm 549 is fixedly secured to a vertically movable shaft 550 which extends downwardly through the mounting plate 551. The mounting plate 551 is secured to the upper surface 41 of the machine. The other end of the vertically extending shaft 550 is connected, by appropriate linkage, to the main drive shaft, whereby the shaft 550 is moved along a vertical axis in response to rotation of the main drive shaft. Thus, when a plunger 60 has been positioned, the shaft 550 moves downwardly, thereby driving the plunger positioning plate 548 downwardly and pushing the plunger 60 into the tube 46.

FIG. 29 shows the position of various components of the plunger station during the period of time when a plunger is being inserted into a tube 46. Thus, referring to FIG. 29, it will be seen that the tooling member 532 has been moved to its extended position so as to insure the roundness of the tube 46. Similarly, the plunger pusher 520 is in its extended position and the plunger positioning plate 548 has moved downwardly so as to position a plunger 60 within the tube 46. Upon insertion of the plunger 60 into a tube 46, the plunger positioning plate 548 is withdrawn in response to continued rotation of the main drive shaft 54. Similarly, further rotation of the main drive shaft will cause reverse movement of the shaft 512 shown in FIG. 31, whereby the plunger pusher plate 520 is withdrawn. Similarly, continued rotation of the main drive shaft will terminate the signal which actuated cylinder 542. Thus, cylinder 542 is reverse actuated so as to move its piston 544 downwardly, thereby retracting the tooling member 532. Upon retraction of the tooling 532 and the plunger pusher member 520, the station is again ready to repeat the cycle.

The plunger 60 is fully inserted when its top edge is coincident with the edge of the tube 46. Preferably, the plunger positioning plate 548 does not fully insert the plunger into the tube. Instead, as shown in FIG. 29, a small portion of the plunger skirt extends above the top edge of the tube. It has been found that high speed operation of the machine is facilitated by this approach, i.e. at high speeds, full insertion of the plunger may deform the tube because there is insufficient time for the trapped air to escape.

To complete the insertion of the plunger 60, an extension 1549 is provided on the arm 549, shown in FIG. 31, and a second plunger positioning plate 648 is provided. The plate 648 is secured to rod 649. The rod 649 is slidably and rotatably received in bearing block 650 which is secured to a mounting plate 651 provided at the next station 600. A pulley 652 is mounted on the rod 649 and a compression spring 653 is provided intermediate the pulley and the block 650. A belt 658 is trained around the pulley 652 and the other end of the belt is trained around another pulley mounted on the tape applying wheel drive shaft at station 600. The end of the rod 609 is provided with a ball 655 and the extension 1549 of the arm 549 is provided with a downwardly extending member 657 having a concave fixture 659 on the end thereof which engages the ball 655.

In operation, a tube with a partially inserted plunger is indexed out of station 500 and into station 600. Just prior to the application of tape at station 600, the shaft 550, shown in FIG. 31, moves the arm 549 downwardly and, thereby, the second plunger positioning plate 648 fully inserts the plunger. The final insertion of the plunger, at the station 600, occurs approximately simultaneously with the application of the tape at station 600. Since a tube in station 600 is rotated, the positioning plate 648 is also rotated by the means described above. Additionally, the periphery of the plate 648 is preferably provided with a frictional material or some other material which provides a high coefficient of friction with the plastic plunger.

Plunger Taping Station 600

After a plunger has been inserted into a tube at the plunger station 500, the tube is indexed to the plunger taping station 600. The function of the plunger taping station is to apply tape to the tube and, in the event that the plunger has not been fully inserted to perform the final insertion of the plunger taping station. At a later station, the tape applied at the taping station 600 is folded over and secured to the plunger. The purpose of securing the plunger to the tube, e.g. by taping, is to insure that the plunger does not come out of the tube during shipping. When a filled tube is ultimately used, the plunger must be unsecured from the tube so that it functions during the dispensing process. To facilitate removal of the tape from the plunger and the tube, the plunger taping station 600 not only applies tape to the tube but, additionally, means are provided at the station for reverse folding a terminal portion of a cut length of tape so as to form a pull tab.

With certain exceptions, the arrangement and construction of the plunger taping station 600 is the same as the construction and arrangement of the nozzle taping station 200. Thus, referring to FIG. 32, tape 61 is supplied to the station 600 from the tape roll 61a shown in FIG. 2. The tape 61 is comprised of two layers, i.e. an adhesively coated tape 61a which will be applied to the tube and a protective covering 61b. As seen in FIG. 32, the tape 61 is trained around a roller 604 which is mounted on the plate 603. The plate 603 is secured to the upper surface 41 of the machine by the upstanding rod 602. The tape 61 moves in the direction indicated by the arrows in FIG. 32 and thus proceeds around the stripping bar 606, at which location the protective covering 61b is stripped from the adhesively coated tape 61a. The protective covering 61b exits from the stripper bar 606, is trained around the roller 605 and exits from the machine by take-up rollers not shown.

The adhesively coated tape 61a is trained around the knurled feed roll 607 and, thereafter, is disposed around the tape applying roll 610. It may be noted that component parts of the taping station 600 are designated by reference numbers which employ the same last two digits as corresponding parts in the nozzle taping station 200. Thus, in the nozzle taping station 200, the tape applying wheel was number 210 whereas, in the plunger taping station 600, the tape apply wheel is number 610.

The tape applying wheel 610 embodies the same construction as the tape applying wheel 210 shown in FIGS. 16 and 17, but with two significant differences. First, as shown in FIGS. 16 and 17, the tape applying roll 610 (here 210) is provided with an aperture 663 which has been drilled through the center of the shoulder bolt 217. The aperture 663 extends inward for a distance less than the extent of the radial apertures 214. At the termination of its inward extent, the aperture 663 extends upwardly and communicates with the upper surface of the tape applying wheel 610 at 667. Referring again to FIG. 32, the tape applying wheel 610 is covered by a manifold plate 629 having a plate 632 secured thereto. The manifold plate is maintained in contact with the tape applying wheel 610 by a vacuum formed in an annulus (not shown) but which is the same as the annulus 230 provided in the manifold plate 229 (FIG. 19). The manifold plate 629 is held against rotation by the bolt 670 shown in FIG. 32 secured to the frame of the machine.

A cavity is formed in the vacuum plate 629 and is approximately one inch in length and is located in the manifold plate at the position indicated only in phantom at 669 in FIG. 32. The cavity is disposed at a radial distance from the center line of the manifold plate 629 so that the aperture 667 shown in FIG. 16 will pass under the cavity 669 and communicate with the cavity when the tape applying wheel 610 rotates. For reasons hereinafter explained, a positive pressure is maintained in this cavity by an air line not shown.

As previously indicated, there are two differences between the construction of the tape applying wheel 610 and the tape applying wheel 210. The first difference is the radially extending aperture 663, described above. The second difference relates to the provision of the vacuum slot 697 shown in FIG. 17, which is present in the wheel 610 but not the wheel 210. As shown in FIG. 17, the vacuum slot 697 is a single, vertical slot, rather than the "H" shaped slots which are adjacent thereto. The single vertical slot 679 communicates with the vacuum annulus in the manifold plate 629. The reason for providing the aperture 663 and the additional slot 697 will hereinafter be explained.

With continued reference to FIG. 32, it will be seen that a housing 601 is secured to the surface 41 of the machine. Extending upwardly through the housing 601 is the drive shaft for the tape applying wheel 610. This drive shaft, not shown, is geared to the machine drive shaft 54 and continuously rotates. A shaft 608 extends upwardly through the housing 601 and secured to the shaft 608 is the tape feeding roll 607. The shaft 608 is connected, by a clutch, to the drive shaft for the tape applying wheel 610.

Shaft 637 extends upwardly through the housing 601 and secured thereto is the drive roll 638. The shaft 637 is geared to the drive shaft for the tape applying roll 610 and, thus the shaft 637 is continuously driven and drives the drive roll 638. Trained around the drive roll 638 is a belt 639. The path of the belt 639 is shown in the plan view of FIG. 2 wherein it will be seen that the belt 639 is trained around an idler roll 640 and the rollers 636 and 636a. The rollers 636 and 636a are positioned on the machine such that the outer surface of the belt 639 will bear against a tube 46 positioned in station 600. As previously stated, the drive roll 638 is continuously rotating and, thereby, the belt 639 is continuously moving in the direction shown. Thus, the belt 639 rotates a tube positioned in the station 600 and preferably the tube is rotated so that its surface speed is slightly greater than the surface speed of the tape applying wheel 610.

A cutting knife 641 is rotatably mounted on a shaft (not shown) which extends downwardly through the housing 601 and is geared directly to the drive shaft for the tape applying wheel 610. Thus, the knife 641 continuously rotates in synchronism with the tape applying wheel 610. Mounted on the end of the cutting wheel shaft is a cam 642, the surface which is tracked by the cam follower 644. The cam follower actuates switch 643, in response to rotation of the cam 642. The output of the switch 643 is connected to the vacuum cup 525 (FIG. 28) in the plunger applying station 500 in the same manner that the output of the switch 243 in station 200 was connected to the vacuum cup 190 in the nozzle applying station 100, i.e. the switch 643 interrupts the vacuum in synchronism with the rotation of the main drive shaft and operation of the station 500.

In FIG. 32, there are shown two significant structural differences between the plunger taping station 600 as opposed to the nozzle taping station 200. Thus, the plunger taping station 600 includes the upwardly extending air pipe 672. Mounted at the end of the air pipe 672 is a nozzle 673 which points generally in the direction of the rotation of the tape applying wheel 610. The upwardly extending air pipe is positioned just downstream of the point at which the tape 61a would be cut by the cutting knife 641.

Figure 33:
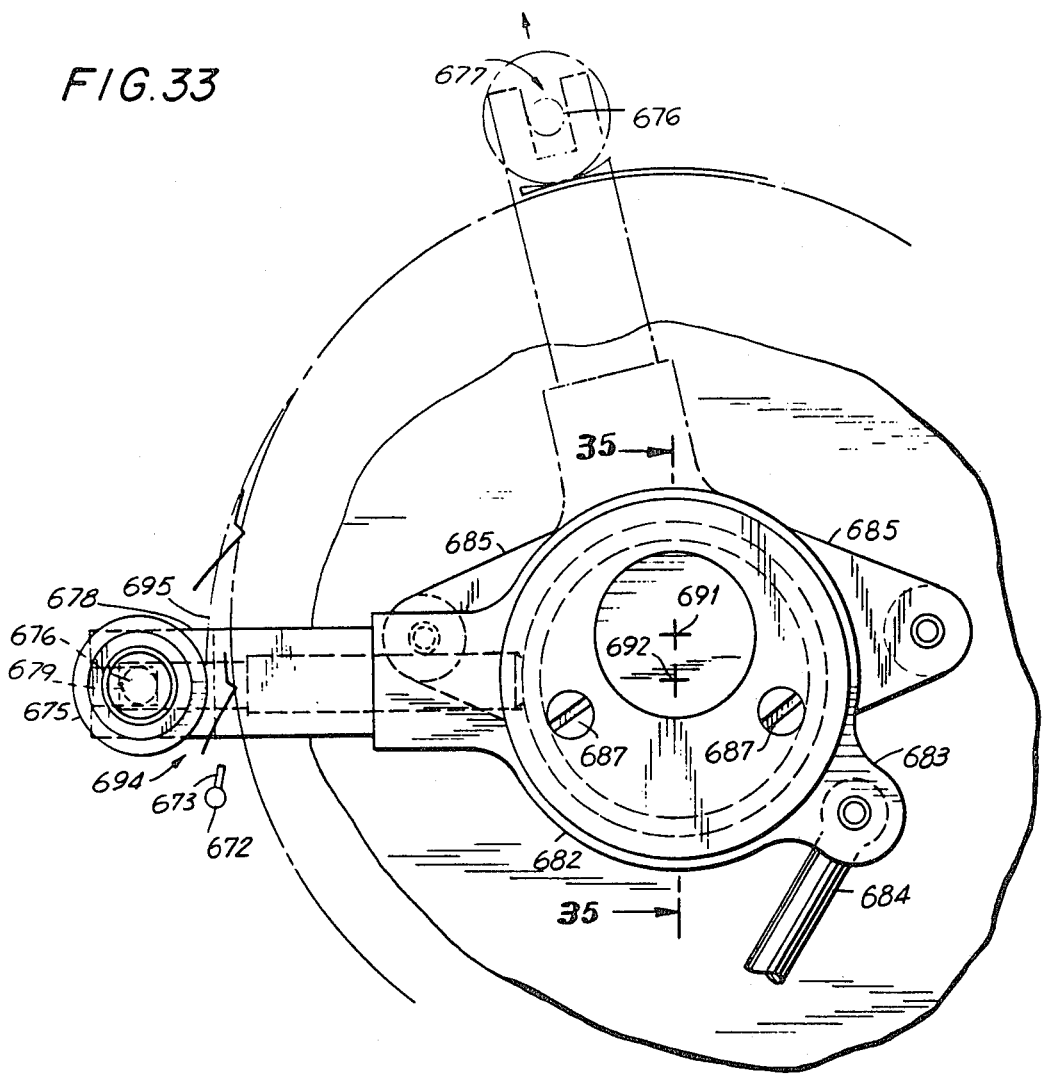
FIG. 33 is a top view of a component part of the apparatus shown in FIG. 32.
Figure 34:
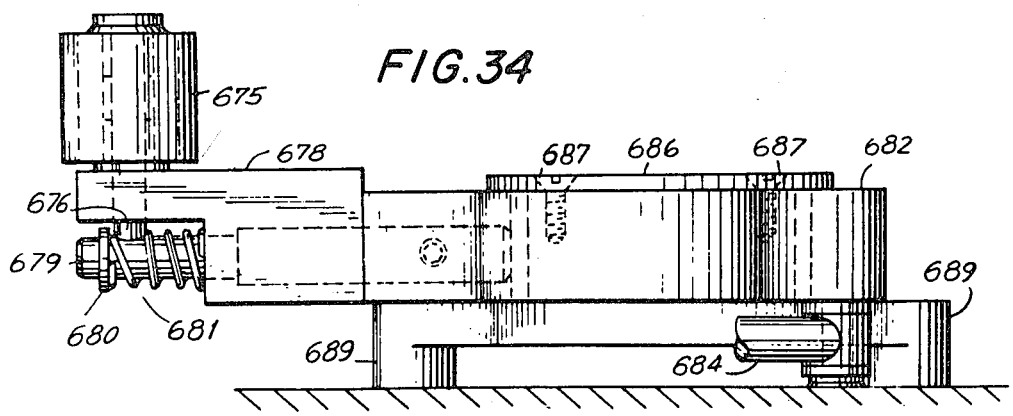
FIG. 34 is a side view of the apparatus shown in FIG. 33.

The second structural element which is present in the plunger taping station 600, and absent from the nozzle taping station 200, is the swinging roller 675. FIGS. 33 and 34 are views of the roller 675 and the assembly to which it is connected.

Referring to FIGS. 33 and 34, it will be seen that the roller is rotatably mounted on a vertically extending shaft 676. The shaft 676 is shown in phantom in FIG. 33, wherein it may be seen that the shaft 676 passes through a slot 677 formed in the end of the arm 678.

As seen in FIG. 34, a rod 679 is slidably mounted in the arm 678. The shaft 676 is fixedly connected to the rod 679. Additionally, a flange 680 is secured to the rod 679 and a spring 681 is secured to the flange 680 and the vertical face of the arm 678. The spring 681 is in tension, whereby the rod 679 is biased inwardly and, thereby, the rotatably mounted roller 675 is biased inwardly or to the right as shown in FIG. 34.

As seen in FIGS. 33 and 34, the arm 678 is fixedly secured to the sleeve 682. Extending radially outwardly from the sleeve 682 is a crank arm 683. An actuating rod 684 is pinned to the crank arm 683.

The sleeve 682, as shown in FIG. 35, is positioned around a bushing 684 and the bushing is positioned around the pedestal block 685. The pedestal block 685 includes a shaft receiving aperture 686 through which is received the drive shaft (not shown) for the tape applying wheel 610. A cap 686 overlies the sleeve 682 and the bushing 684 and is connected to the pedestal block 685 by the bolts 687 shown at FIGS. 33 and 34. As shown in FIGS. 33 and 34, the pedestal block 685 has an outwardly extending flange 685f at the bottom thereof which terminates at legs 689 which are secured to the housing 601.

As may be seen in FIG. 33, the sleeve 682, and therefore the roller 675, rotate about the center 692. The center 692 is displaced with respect to the center 691 of the drive shaft for the tape applying wheel. Thus, when the sleeve 682 is rotated in response to movement of the actuating rod 684, the roller 675 will move in an arcuate path indicated at 695 with respect to the tape applying wheel 610 and will intercept the tape applying wheel 610 as shown in the phantom representation in FIG. 33. Additionally, it will be remembered that the roller 675 is slidably mounted on the arm 678 and is spring biased inwardly. Thus, as the sleeve 682 rotates, the roller 675 will move into contact with the tape applying wheel 610 and further movement of the arm 678 will displace the roller 675 radially outwardly. The periphery of the roller 675 is a rubber material. The actuating arm 684 is connected by appropriate linkage to the main drive shaft of the machine to act in timed relation with rotation with the tape applying roll 610.

Having described the component parts of the plunger taping station 600, the operation of this station will now be described. Referring to FIG. 32, the tape applying wheel 610, the cutoff knife 641 and the belt drive wheel 638 are continuously rotating. Also, the cutoff knife 641 is mounted on its drive shaft so as to be aligned with a tape cutoff portion on the tape applying wheel 610 in the same manner that the tape applying wheel and the cutoff wheel at the station 200 were aligned. Rotation of the tape applying wheel 610 will bring the tape pickup portion of the wheel 610, which is the same as the tape pickup portion 221 of the wheel 210, into a position adjacent to the leading, cutoff edge of the tape and, thereupon, the tape feed clutch for the tape feed roll 607 is engaged and tape feed commences. Thereupon, the tape 61a is fed and rotates with the periphery of the tape applying wheel 610 with the adhesive coating on the tape facing outwardly. Upon continued rotation of the wheel 610, the tape cutoff portion on the wheel 610, which is the same as the tape cutoff portion 216 of the wheel 210, will rotate into position and the tape will be cut off. Considering the trailing edge of the cut off portion of the tape, upon continued rotation of the tape applying wheel 610, the trailing edge will be positioned just beyond the air nozzle 673. At this time, the aperture 663 in the tape applying wheel will be positioned below the positive pressure chamber 669 in the manifold 610. As a result, a blast of air is discharged from the aperture 663 and blows the terminal portion of the tape outwardly. The outward movement of the tape is promoted by two other factors. First, as previously noted with respect to FIG. 17, the vacuum cutout configuration just to the left of the aperture 663, is only a single, vertical slot 697. As a result, the tape is pulled into this slot, which action promotes both the outward movement of the terminal edge of the tape and creasing of the tape. Secondly, air discharging from the nozzle 673 also pushes the terminal edge of the tape outwardly. The discharge of air from the aperture 663 and the nozzle 673 is controlled by a second cam which, for clarity, is not shown in FIG. 32 but is mounted on top of and secured to the cam 642. A second switch mounted on top of the switch 643 is actuated by the aforementioned second cam and closure of this second switch controls the positive pressure air supply to the aperture 663 and nozzle 673. Thus, as shown in FIG. 33 at 694, the terminal portion 61t of the tape 61a extends outwardly away from the tape applying wheel 610. Upon continued rotation of the tape applying wheel 610, the terminal portion 61t of the tape 61a is maintained in position because an intermediate part 61i of the tape is pulled into the vertical vacuum slot 697 formed in the periphery of the tape applying wheel.

Again referring to FIG. 33, upon continued rotation of the tape applying wheel 610, the outwardly extending terminal portion 61t of the tape 61a passes the roller 675. Immediately after this occurs, the actuating arm 684 is actuated, thereby rotating sleeve 682 and causing the roller 675 to move along its arcuate path, the path of the inner surface of the roller being shown in FIG. 33 at 695. Specifically, as will be seen at 695 in FIG. 33, the roller 675, which is moved by the actuating arm 684 at a speed greater than the surface speed of the tape applying roll 610, overruns the tape applying roll 610 and folds the outwardly extending terminal portion of the tape back upon the adjacent portion of the tape. As will be seen in FIG. 33, continued movement of the arm 678 causes the roller 675 to move outwardly, whereby the roller is pressed against the tape and a pull tab is formed in the tape.

The tape 61a is applied to the continuously rotating tube in the same fashion that the tape was applied at station 200. However, it will be evident that the tape applied at the station 600 is provided with a terminal pull tab between the parts 61t and 61i to facilitate removal of the tape.

The tape 61a is applied to the plunger end of the tube and extends upwardly beyond the top edge of the tube, i.e. the tape is wrapped around and adhesively secured to the tube and extends upwardly beyond the edge of the tube as shown in FIG. 1.

As previously indicated, the plunger is preferably only partially inserted into the tube at the station 500, e.g. approximately 50% of the skirt 60s of the plunger 60 extends beyond the edge of the tube. The remainder of the plunger insertion is effected at station 600 by the plunger insertion plate 648 shown in FIGS. 31 and 32, the operation of which has previously been described. In FIG. 32 there is shown the bearing plate 650, through which the shaft 649 extends. The bearing plate 650 is secured to the support member 651, which is secured by support members 699 to the machine frame.

As was the case with the nozzle taping station 200, operation of the tape feed wheel 607 occurs in response to the closure of two switches. The first switch is a cam-operated switch which is driven from the main drive shaft and closes when the tape pickup portion of the tape applying wheel 610 is adjacent to the cut end of the tape. This switch opens when the tape is cut by the cutoff knife. The second switch is switch 65 shown in FIG. 2. Switch 65 is in series with the aforementioned first switch and closes when a tube leaves the plunger station 500. Thus, tape feed at station 600 is disabled if a tube is not supplied to the station. Switches which are only temporarily closed, e.g., the switches shown in FIG. 2, are connected to latching relays. To reset these relays, a cam-operated switch driven from the main drive shaft is employed.

Tape Foldover Station 700

When a tube is indexed into the tape foldover station 700, the plunger 60 is fully positioned within the top of the tube, i.e. the upper edge of the plunger is substantially coincident with the upper edge of the tube. Additionally, the tape 61 which was applied to the tube at the tape applying station 600 extends above the top edge of the tube. The function of the tape foldover station 700 is to fold the tape 61 over the top of the tube 46 and press the tape against the inner surface of the skirt 60s of the plunger 60.

Figure 36:
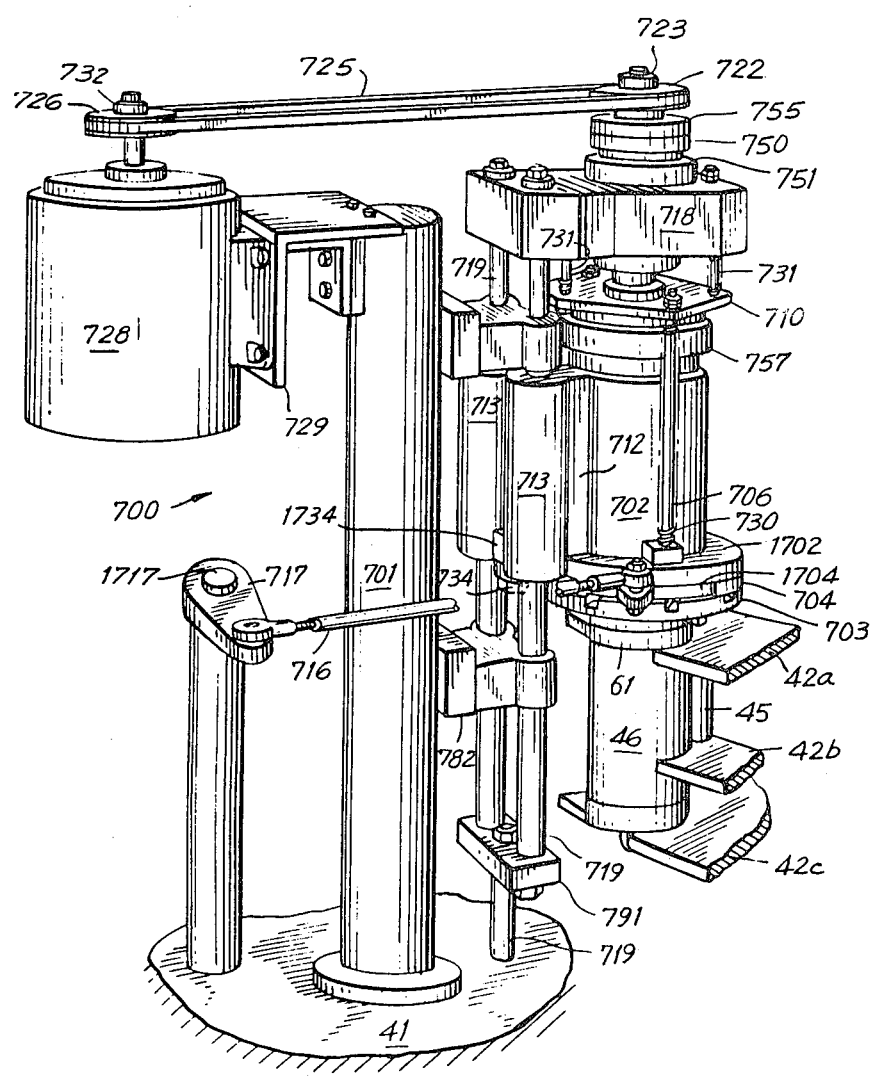
FIG. 36 is a perspective view of the seventh operating station shown in FIG. 2.
Figure 37:
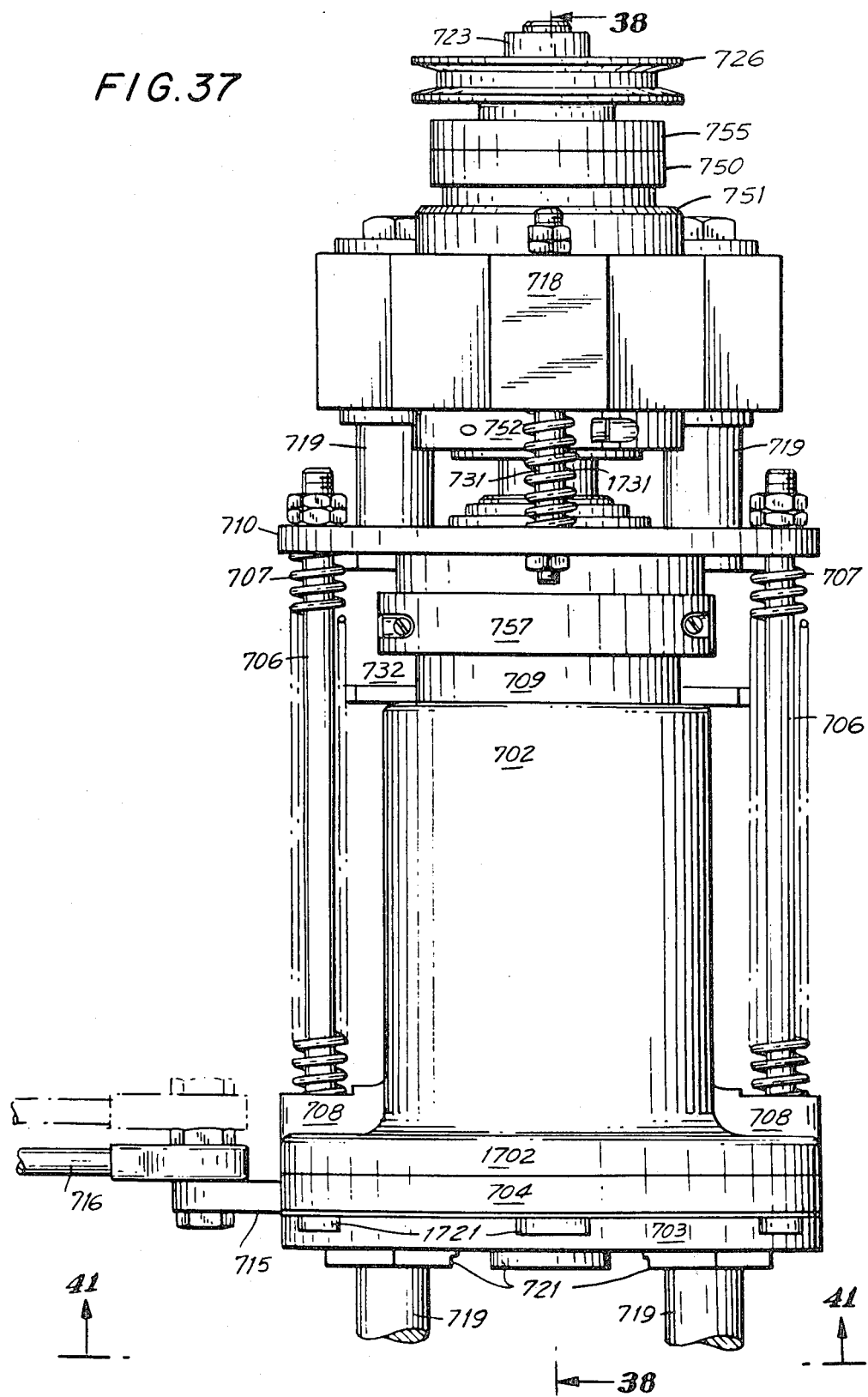
FIG. 37 is a front view of a part of the apparatus shown in FIG. 36.

FIG. 36 is a perspective view of the tape foldover station 700 and FIG. 37 is a view of the tape foldover apparatus as seen when looking radially outward from the center of the turret toward the tape foldover station 700. Referring to FIG. 36, a stanchion 701 is secured to the upper surface 41 of the machine. Secured to the top of the stanchion 701 is a bracket 729 and attached to the bracket 729 is an electric motor 728 having a pulley 726 mounted on its drive shaft and held in position by nut 723. A belt 725 is trained around the pulley 726. During operation of the machine, the motor 728 is continuously running.

Secured to the stanchion 701 is an upper bearing block 732 and a lower bearing block 782. Guide rods 719 and 719a are slidably received in the bearing blocks 732 and 782. The lower end of the guide rods 719 are connected by the tie block 791. Actuating rod 720 is secured to the tie block 791 and the actuating rod 720 extends downwardly through the surface 41 of the machine and is mechanically linked, by appropriate linkage not shown, to the main drive shaft of the machine so that the actuating rod 720 reciprocates in timed relation with the rotation of the turret 42.

The upper ends of the guide rods 719 and 719a are secured to mounting block 718. Thus, as the actuating rod 720 reciprocates vertically, the mounting block 718 also vertically reciprocates. As seen in FIGS. 36 and 37, a pair of guide bolts 731 and 731a extend through the mounting block 718 and conventional nuts are threaded on the upper ends thereof. The lower ends of the guide bolts 731 and 731a extend through a plate 710 and a nut is supplied at the lower end of each of the guide bolts 731 and 731a. Additionally, compression springs 1731 and 1731a are mounted about the guide bolts 731 and 731a and, thereby, the plate 710 is spring mounted with respect to the guide block 718.

A housing 702 is slidably mounted beneath the plate 710. More specifically, the housing 702 includes a pair of vertically disposed webs 712 only one of which is shown, each of which connects to a sleeve 713, 713a. The guide rods 719 extend through the sleeves 713 and 713a. Additionally, the housing 702 includes an outwardly extending horizontal flange portion 1702. Formed in the flange portion 1702 are bearing surfaces 708. As best seen in FIG. 37, a circular plate 704 is mounted below the flange 1702. Guide bolts 706 and 706a are provided and extend upwardly through the plate 710 and downwardly through the flange 1702 and the circular plate 704. Appropriate nuts are provided at the ends of the guide bolts 706 and 706a and compression springs 707 and 707a are mounted about each of the guide bolts. Thus, it will be seen that the housing 702 is connected so as to be movable vertically relative to the plate 710 and is spring loaded downwardly and thus yieldable upwardly with respect to the plate 710, that the plate 710 is yieldable upwardly with respect to the block 718 and that these components 702, 710 and 718 and their related assemblies are movable vertically by movement of the guide rods 719 and 719a and the actuating rod 720.

Figure 38:
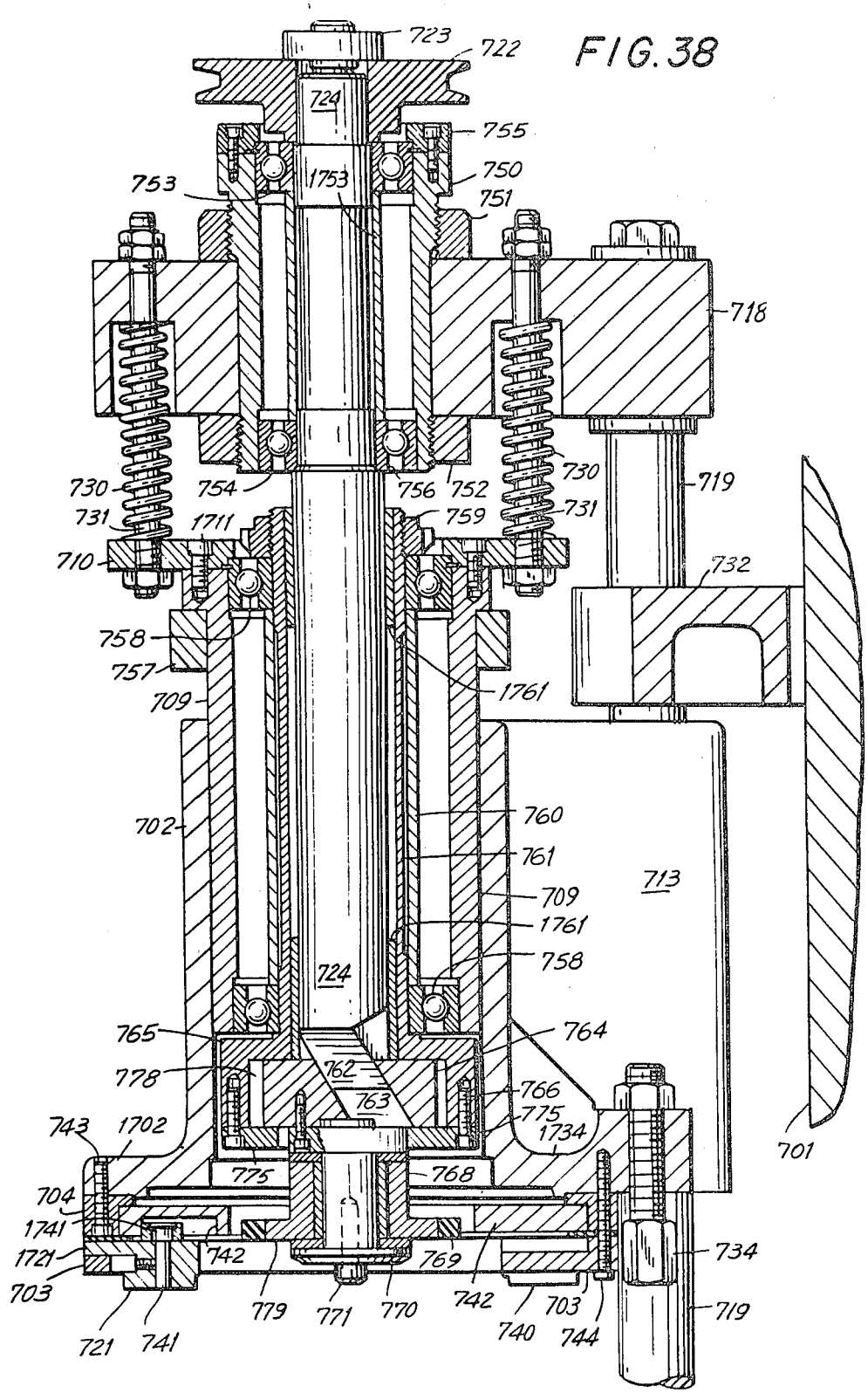
FIG. 38 is a sectional view taken along the section lines 38—38 of FIG. 37.
Figure 41:
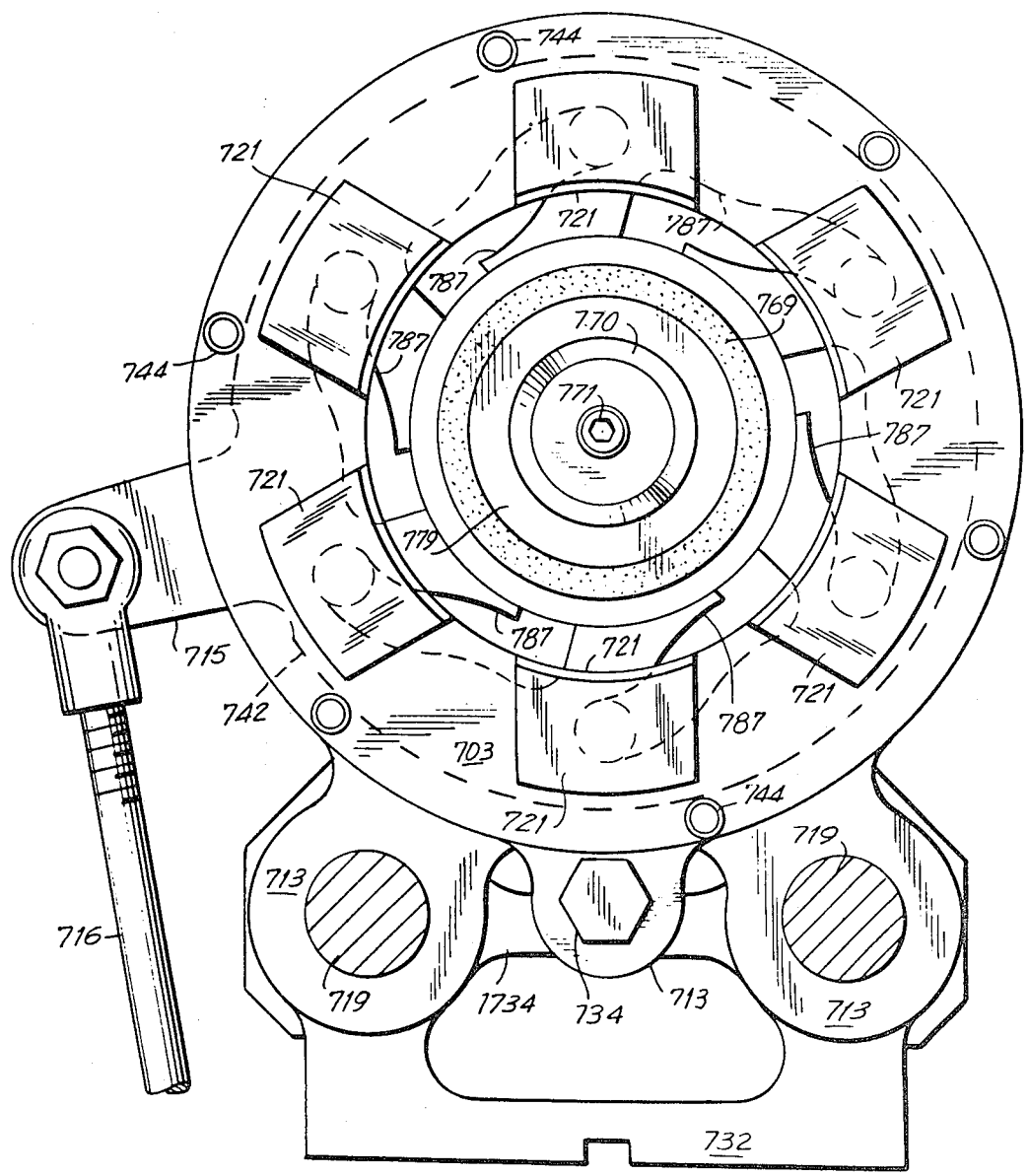
FIG. 41 is a bottom view taken along the lines 41—41 of FIG. 37.

In FIGS. 36, 38 and 41, it may be noted that a web 1734 connects the lower ends of the sleeves 713 and a bolt 734 having a downwardly extending hex nut head 734a is threaded in the web 1734 and secured in place by a lock nut 734b positioned on the top thereof. The hex position of the nut head 734a determines the extent of the downward movement of the housing 702 with respect to the machine surface 41. Thus, as the housing 702 moves downwardly, the hex nut head 734a will make contact with the upper surface of the lower bearing block 782 and, upon such contact, downward movement of the housing 702 will be stopped.

Referring to FIG. 38, the mounting block 718 is shown in cross section. Extending through the mounting block 718 and rotatably mounted therein is a shaft 724. A pulley 722 is secured to the end of the shaft by nut 732. As seen in FIG. 36, the belt 725 is trained about the pulley 722 and, as a result, operation of the motor 728 will cause rotation of the shaft 724 shown in FIG. 38.

With continued reference to FIG. 38, it will be seen that roller bearings 753 and 754 are provided and the inner race of these bearings are in contact with the shaft 724. A sleeve 750 is provided and extends through the mounting block 718 and provides support for the outer race of the bearings 753 and 754. Additionally, the upper bearing 753 is restrained from vertical movement with respect to shaft 724 because it is positioned between a bushing 1753 below it and the pulley 722 and a cap member 755 above it. The lower bearing 754 is restrained from vertical movement with respect to shaft 724 because it is sandwiched between the bushing 1753 above it and a bevel portion 756 of the shaft 724 below it.

As seen in FIG. 38, the upper and lower ends of the sleeve 750 are threaded and collars 751 and 752 are positioned therearound. The collars 751 and 752 restrain the sleeve 750 against vertical movement relative to the block 718. Hence the shaft 724, though rotatable relative to the block 718, is vertically restrained relative to it.

As seen in FIG. 38, the plate 710 is spring mounted relative to the block 718 and the shaft 724 extends downwardly through and is rotatably and vertically slidably received in the assembly which is secured to the plate 710. This assembly includes the housing 702. Received within the housing 702 so as to be slidable vertically relative to it is a sleeve 709 which is fixedly secured to the plate 710 by the shoulder bolts 1711. Positioned around the sleeve 709 so as to be immovable relative to it is a collar 757. Disposed between the shaft 724 and the sleeve 709 are roller bearings 758 and 758a. The roller bearings 758 and 758a are vertically secured with respect to the sleeve 709, a sleeve 760 and an inner housing 761 because they are sandwiched between the sleeve 760 and recesses in the sleeve 709 on one side of each bearing and a threaded collar 759 on the upper end of the housing 761 and recesses in the plate 710, and a recess in the lower end of the housing 761 on the other side of each bearing. The inner housing 761 extends downwardly and surrounds the lower portion of the shaft 724. The inner housing 761 flares outwardly at its lower end to form receiving block 765. The housing 761, 765 is rotatable but not vertically slidable with respect to the sleeve 760. As may be seen in FIG. 38, bushings 1761 and 2761a fixed in the inner housing 761 allow the shaft 724 to slide vertically relative to the housing 761, 765 while rotating with it.

At the lower end of the assembly shown in FIG. 38, a slide block 764 is slidably mounted for lateral movement within the receiving block 765. The slide block 764 is secured against vertical movement with respect to the receiving block 765 by the retaining plate 775. A wheel 779 is rotatably mounted on a shaft 768 and held to it by a shoulder bolt 771 and a washer 770. The periphery of the wheel 779 is provided with a rubber covering 769. The shaft 768 is affixed to a slide block 764.

Figure 39:
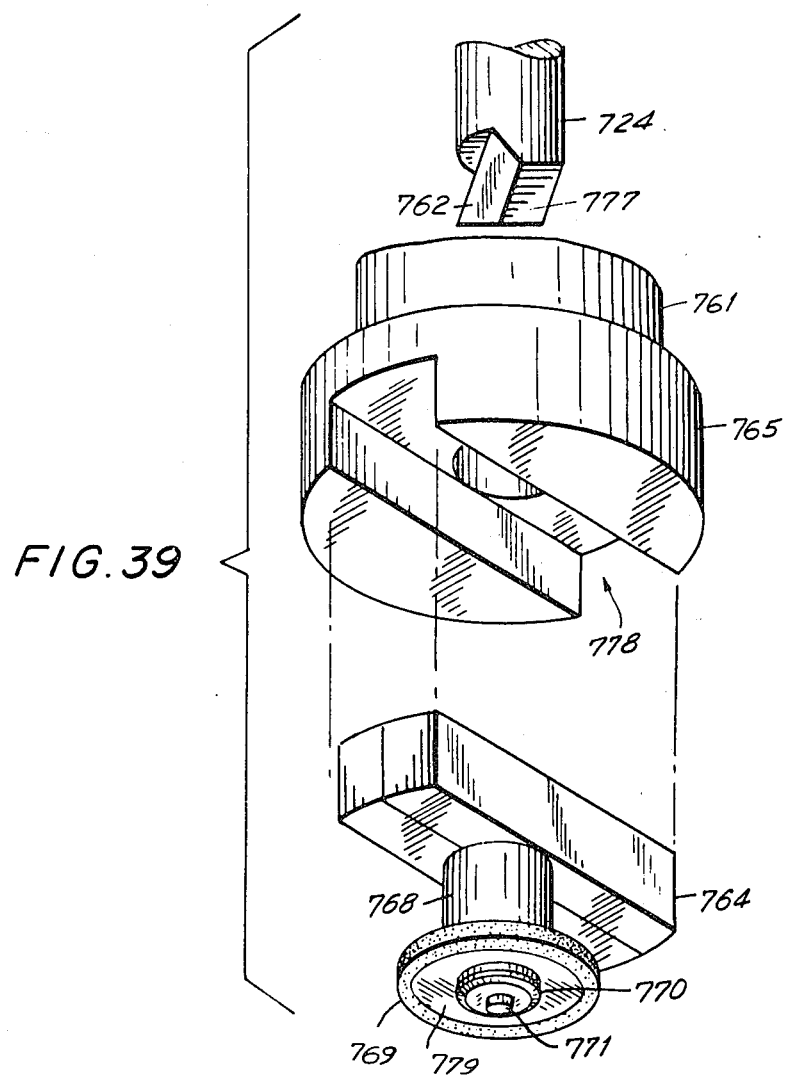
FIG. 39 is a fragmentary exploded view of certain components of the apparatus shown in FIG. 36.
Figure 40:
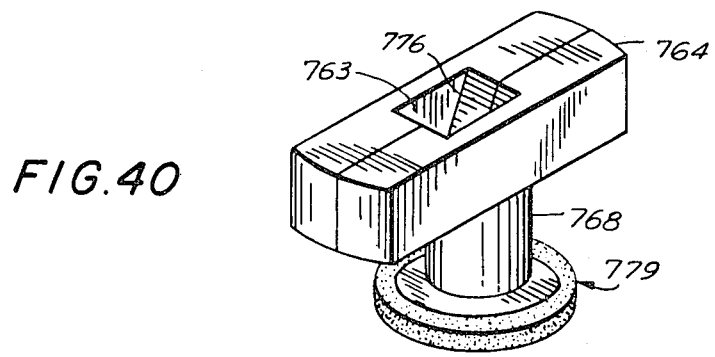
FIG. 40 is a perspective view of one component of the apparatus shown in FIG. 36.

The configuration of the receiving block 765 and the slide block 764 is best seen in FIGS. 39 and 40. As seen in FIG. 40, the slide block 764 has a rectangular configuration and a rectangular aperture 763 is provided in the top thereof and the aperture 763 is defined by parallel, inclined surfaces which include the surface 776. As best seen in FIG. 39, the slide block 764 is received in the cutout portion 778 of the receiving block 765 whereby the slide block 764 may move laterally within the receiving block 765. Thus, as suggested by the exploded view of FIG. 39, the slide block 764 is slidably mounted in the receiving block 765 and the shaft 724 extends downwardly through the housing 761 and is received in the aperture 763 of the receiving block 765. Thus, as previously noted, in operation the shaft 724 is continuously rotating and, therefore, the receiving block 765 continuously rotates along with the slide block 764 while the wheel 779 is free to rotate relative to the slide block 764 and shaft 724. Additionally, referring to FIGS. 38 and 39, it may now be noted that downward vertical movement of the shaft 724 with respect to the inner housing 761 will cause the downwardly extending portion 762 of the shaft 724 to push into the block 764. Stated otherwise, when the housing 761 is restrained from vertical movement and the shaft 724 is moved downwardly, the protuberance 762 on the shaft 724 will be pushed into the slide block 764 and the face 777 of the protuberance 762 shown in FIG. 39 will bear against the face 776 of the slide block 764 and, thereby, the slide block 764 will be laterally displaced. (With the configuration of the apparatus shown in FIG. 38, such lateral displacement will be to the left.) As a result, upon lateral displacement of the slide block 764, the shaft 768 will also be laterally displaced.

As seen in FIGS. 37 and 38, an annular cap heretofore called a circular plate 704 is secured to the flared housing 1702 by shoulder bolts 743. Additionally, an annular plate 703 is secured to the annular cap 704 by the shoulder bolts 744.

As seen in FIGS. 38 and 41, a second annular plate 742 is mounted within the annular cap 704 and between the flared housing 1702 and the annular plate 703. As best seen in FIG. 38, the outer diameter of the second annular plate 742 substantially corresponds to the inner diameter of the annular cap 704, whereby the second annular plate 742 is rotatably mounted within the annular cap 704. To secure such rotation, the second annular plate 742, as shown in FIG. 41, is provided with an outwardly extending arm 715 which is pinned to the actuating arm 716. As seen in FIG. 36, a peripheral portion 1704 of the annular cap 704 has been removed as shown at 1704. The actuating arm 715 extends through the opening 1704.

Returning to FIG. 41, it will be seen that the second annular plate 742 includes six cam tracks 787. Referring to FIGS. 38 and 41, six fingers 721 are slidably mounted for radial movement on top of the annular plate 703.

As best seen in FIG. 38, the finger 721 shows and includes a ledge portion 1721 which rests on the annular plate 703 and which extends radially outwardly, i.e. portions of the top of the annular plate 703 are relieved to receive the ledge portions 1721 of the fingers 721. In FIG. 37, the ledge portions 1721 are shown as they extend through the relieved portions of the annular plate 703.

As best seen in FIG. 38, each of the fingers 721 is pinned at 741 to a cam follower 1741. As shown in FIG. 41, each of the cam followers is received in a respective cam track 787. Thus, when the arm 715 shown in FIG. 41 is rotated, the second annular plate 742 rotates and, thereby, the cam tracks 787 are moved. In response to rotation of the second annular plate 742, the fingers 721 move radially inward and outward by virtue of the cam followers 1741 being positioned within the cam tracks 787. Thus, it will be seen that a diaphragm assembly is provided at the lower end of the assembly shown in FIG. 38 and the diaphragm assembly is comprised of the radially movable fingers 721 which move radially in response to rotation of the second annular plate 742.

As shown in FIG. 36, the actuating arm 716 is connected to a crank arm 717 and the crank arm is connected to a shaft 1717, which extends downwardly through the upper surface 41 of the machine. The other end of the shaft 1717 is connected, by appropriate linkage not shown, to the main drive shaft of the machine and moves in timed relation with rotation of the turret and vertical movement of the actuating shaft 720.

Figure 42:
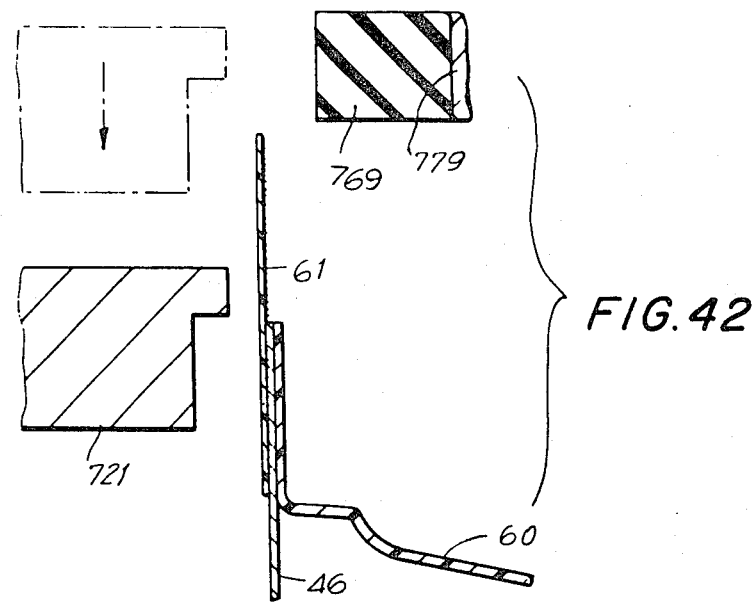
FIGS. 42-44 are fragmentary views illustrating the operation of the apparatus shown in FIG. 36.
Figure 43:
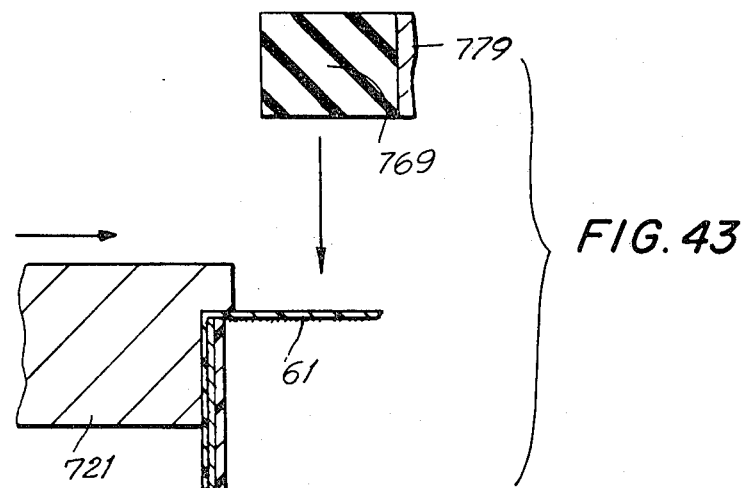
Figure 44:
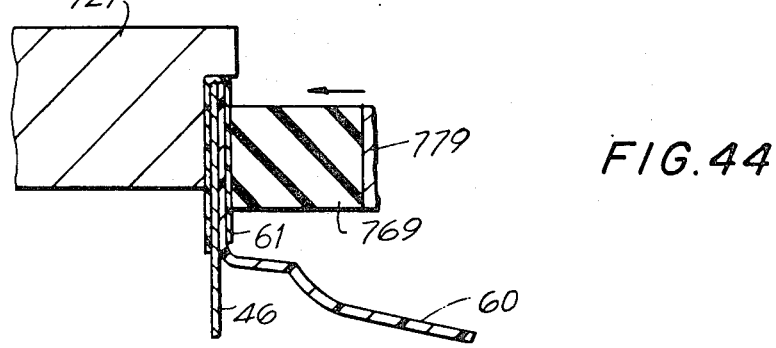

An initial understanding of the operation of the tape foldover station 700 may be obtained by considering FIGS. 42-44. Considering first FIG. 42, there is shown a fragmentary sectional view of a container 46 as it would appear when initially positioned within the station 700. Thus, the container 46 includes the plunger 60 which is fully positioned in the top thereof so that the upper end of the plunger is substantially coincident with the upper edge of the tube 46. Additionally, as seen in FIG. 42, the plunger tape 61 is mounted on the tube and extends upwardly beyond the upper edge of the tube 46. The phantom representation shown in FIG. 42 represents the initial position of one of the fingers 721 when a tube 46 is initially positioned in the station 700. After positioning of the tube 46 in the station 700, the tape foldover mechanism shown in FIG. 38 undergoes a first downward movement whereby the fingers 721 are positioned vertically with respect to the tube 46. The position of the fingers 721 in FIG. 42 is representative of the position of the fingers after the first downward movement of the foldover mechanism. At the end of the first stage of downward movement of the tape foldover apparatus, the actuating arm 715 shown in FIG. 39 is rotated, whereby each of the fingers 721 is moved radially inward, i.e., to the right as seen in FIGS. 42 and 43. As shown in FIG. 43, the result of this radially inward movement is to bend the tape 61 inwardly onto a position at a right angle with respect to the wall of the tube 46. After the fingers have been moved radially inward as shown in FIG. 43, the apparatus shown in FIG. 38 undergoes a second downward movement which positions the taping wheel 769 in the vertical position shown in FIG. 44. Thereafter, a third downward movement occurs within the apparatus shown in FIG. 38 and, thereby, the tape applying wheel 769 is laterally displaced as suggested by the horizontal arrow and into the horizontal position indicated in FIG. 44 and, thereby, the tape 61 is pressed against the inner surface of the skirt of the plunger 56. While in its laterally displaced position, the wheel 769 rotates around its center while moving orbitally with respect to the center of the shaft 724 and within the skirt of the plunger 56 because the wheel 779 is then eccentrically positioned with respect to the shaft 724. Thereby, the rubber periphery 769 of the wheel 779 presses the tape against the inner surface of the skirt of the plunger 56. Thereby, the plunger 56 is taped to the tube 46.

After the taping action has occurred, the three aforementioned steps of vertical movements are repeated in reverse order. Thus, the taping wheel 779 is returned to a position concentric with the shaft 724, i.e. the wheel 779 is laterally moved back to a position in line with the center line of the shaft 724. Thereafter, the wheel 779 is moved up vertically and, thereafter, the fingers 721 are moved radially outwardly and, finally, the wheel 769 and the fingers 721 are moved vertically upwardly. Thereafter, the tube 46 may be indexed out of the station 700.

The above described sequence of movement occurs in the following manner. Referring to FIGS. 36 and 38, after a tube has been positioned within the station 700, the actuating rod 720 is moved downwardly, thereby driving the mounting block 718 downwardly. Referring to FIGS. 37 and 38, it will be seen that downward motion of the mounting block 718 will exert a downward force on the plate 710, which force is applied to the plate 710 through the springs 1731 and 1731a. As the plate 710 moves downwardly, a downward force is transmitted through the springs 707 and 707a to the flared portion 1702 of the housing 702. Thus initial downward movement of the block 718 causes downward movement of the housing 702. The entire assembly continues its downward movement until the end of the bolt 734, shown in FIG. 36, contacts the top of the bearing block 782. When this occurs, further downward movement of the housing 702 is prevented and this represents the end of the first stage of downward movement. The fingers 721 have now been vertically positioned with respect to the tube 46 and the shaft 1717 is rotated through an arc, thereby moving the fingers 721 radially inward.

Referring to FIG. 38, it will be seen that when downward movement of the housing 702 is restrained, further downward movement of the mounting block 718 will cause the sleeve 709 to slide downwardly within the housing 702. This second stage of downward movement will continue until the collar 757 comes in contact with the top of the housing 702. When this occurs, further downward movement of the sleeve 709 is restrained and this represents the end of the second stage of downward movement. During this second stage of downward movement, the wheel 779 is moved down into the plunger.

When the housing 702 and the sleeve 709 are restrained from further downward movement, continued downward movement of the block 718 will cause downward movement of the shaft 724. That is to say, when downward movement of the sleeve 709 is restrained, such restraint will also stop any further downward movement of the inner housing 761. When the inner housing 761 is secured against further downward movement and the shaft 724 continues to move downwardly, the protuberance 762 on the shaft 724 will move into the slide block 764 and, thereby, the slide block 764 is laterally displaced. Such lateral displacement causes corresponding lateral displacement of the wheel 779, which gives rise to the lateral movement suggested by the horizontal arrow shown in FIG. 44.

Again, after the tape 61 has been secured to the plunger 60, the block 718 is moved upwardly by corresponding upward movement of the actuating shaft 719. Referring to FIG. 38, upon upward movement of the block 718, the slide block 764 returns to the position shown in FIG. 38. Thereafter, continued upward movement of the block 718 will allow the sleeve 709 to move upwardly with respect to the housing 702. Thereafter, continued upward movement of the block 718 will raise the housing 702. As stated above, the diaphragm assembly shown in FIG. 41 is actuated preferably at approximately the end of the first stage of downward movement and is reverse actuated as the wheel 769 is laterally displaced to its original position. It should also be noted that fingers 721 act as backing members for the wheel 769.

DISCHARGE STATION 800

Figure 45:
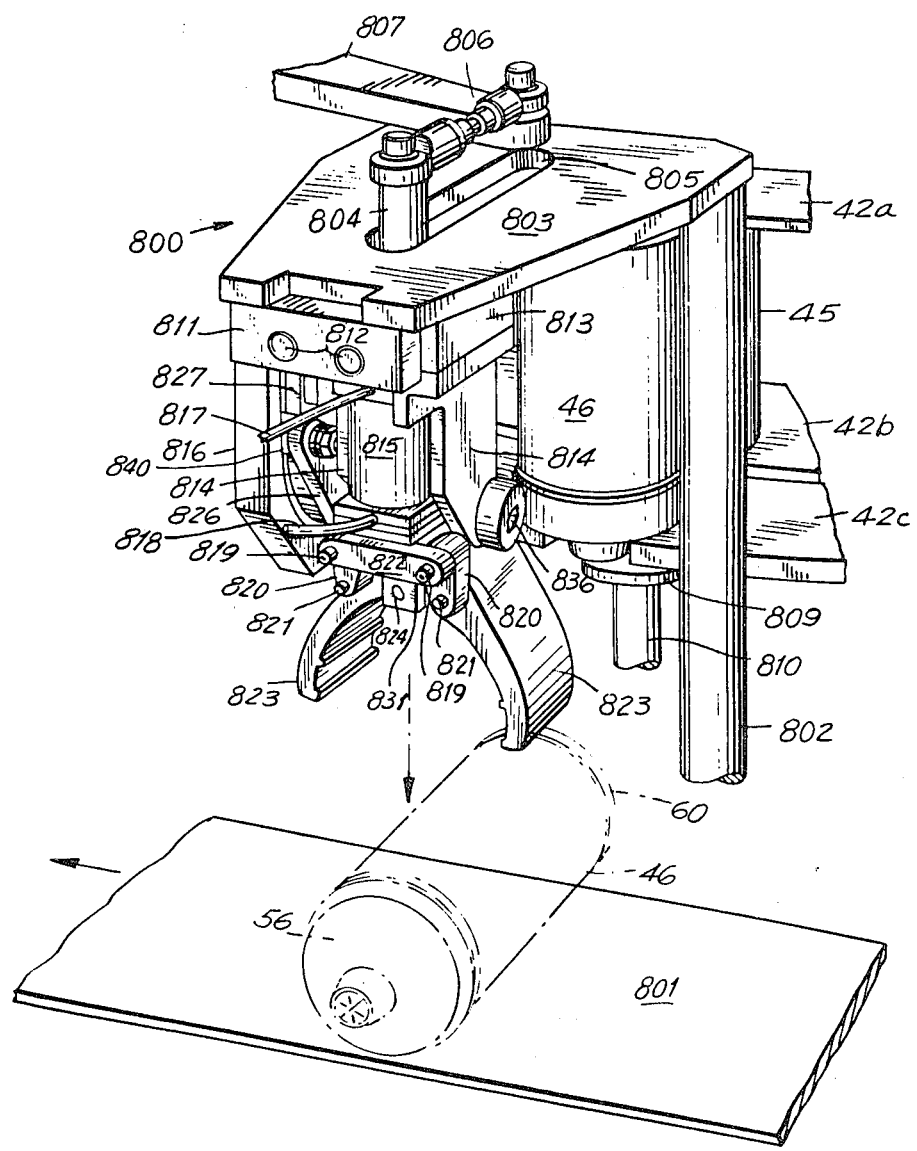
FIG. 45 is a perspective of the eighth station shown in FIG. 2.

The discharge station 800 functions as an article transfer apparatus and is employed to extract a filled dispenser tube from the machine. FIG. 45 shows a perspective view of my preferred form of discharge station which is employed in a preferred embodiment of my invention.

Figure 46:
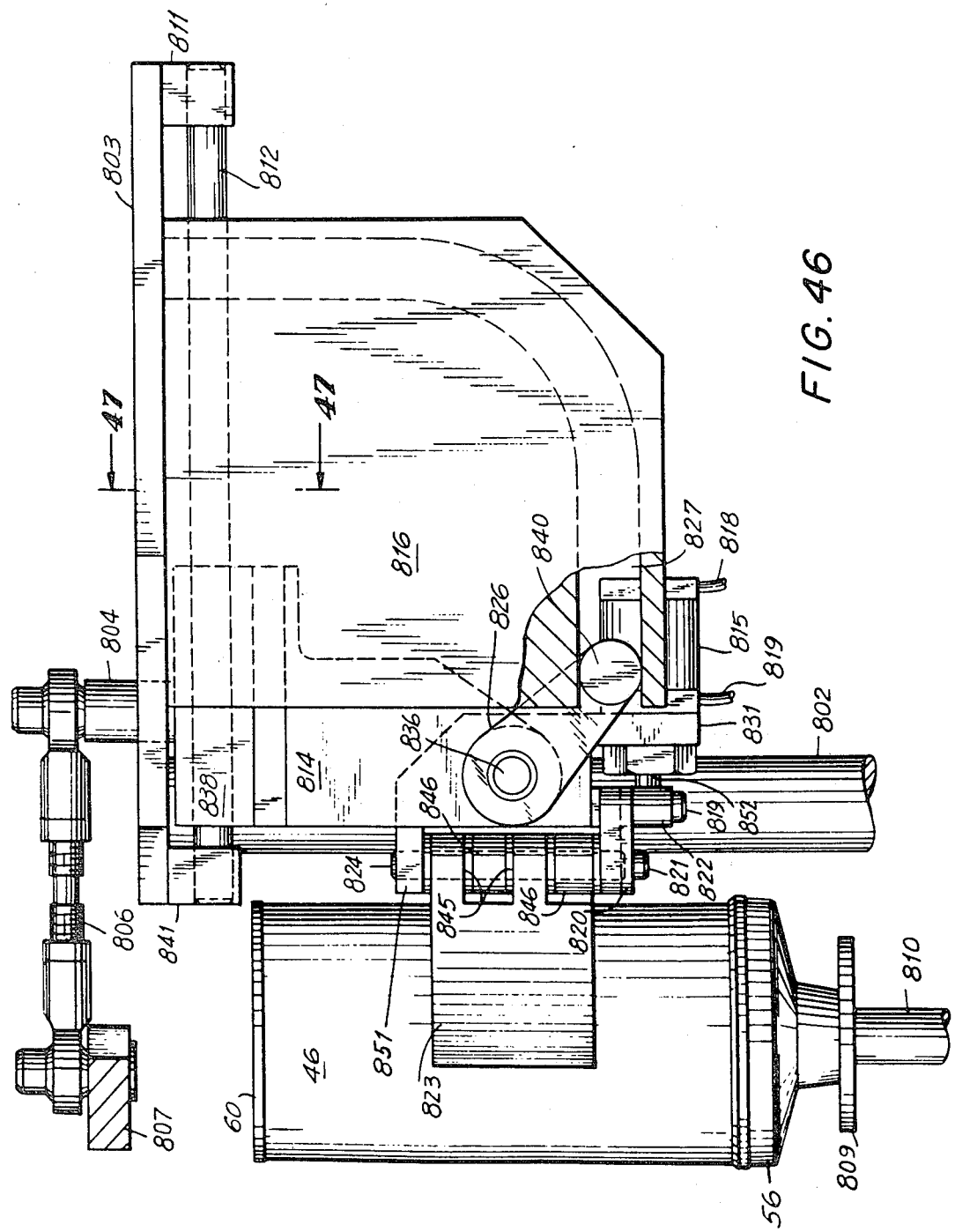
FIG. 46 is a side view of the apparatus shown in FIG. 45
Figure 47:
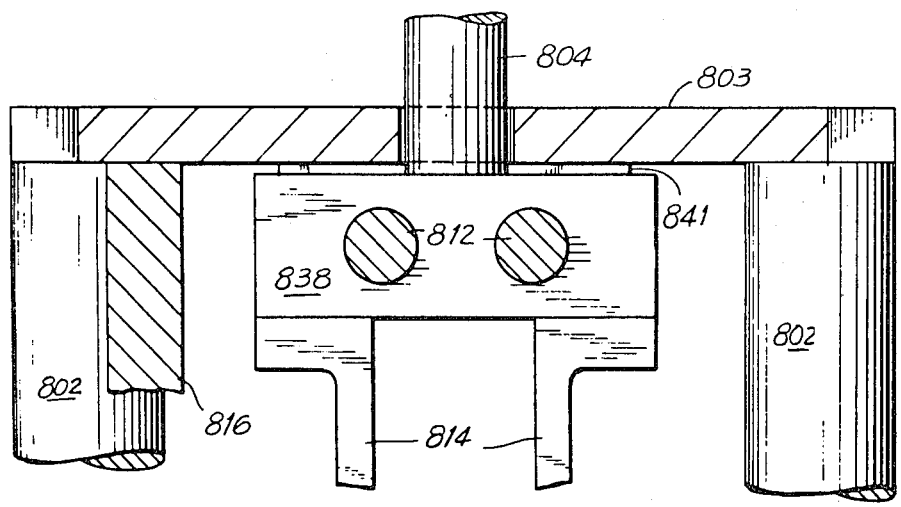
FIG. 47 is a view taken along the lines 47—47 of FIG. 46

Referring to FIG. 45, two stanchions 802 are secured to the upper surface 41 of the machine, only one of the stanchions being visible in FIG. 45. As shown in FIGS. 45 and 47, a plate 803 is secured to the upper end of each stanchion 802. The plate 803 extends radially outward from the turret of the machine and a slot 805 is provided in the center of the plate 803. As shown in FIG. 2, a shaft 808 extends upwardly through the surface 41 of the machine. Secured to the end of the shaft 808, as shown in FIGS. 2 and 46, is an arm 807. The shaft 808 is connected by appropriate linkage to the main drive shaft of the machine whereby the shaft 808 rotates through a limited arc in timed relation with the operation of the machine. As shown in FIG. 45, an adjustable connecting link 806 is pinned to the end of the arm 807. The other end of the adjustable link 806 is pinned to the downwardly extending rod 804. As shown in FIG. 47, the end of the rod 804 is fixedly secured to the slide block 838. The slide block 838 is slidably mounted on guide rods 812. As may be seen in FIGS. 45 and 46, the guide rods 812 are fixedly secured to the mounting blocks 811 and 841, which, in turn, are fixedly secured to the plate 803. As may be seen in FIGS. 45, 46 and 47, a plate 816 is secured to the bottom surface of the plate 803 and extends downwardly. An arcuate cam track 827 is formed in the inner surface of the plate 816.

Figure 48:
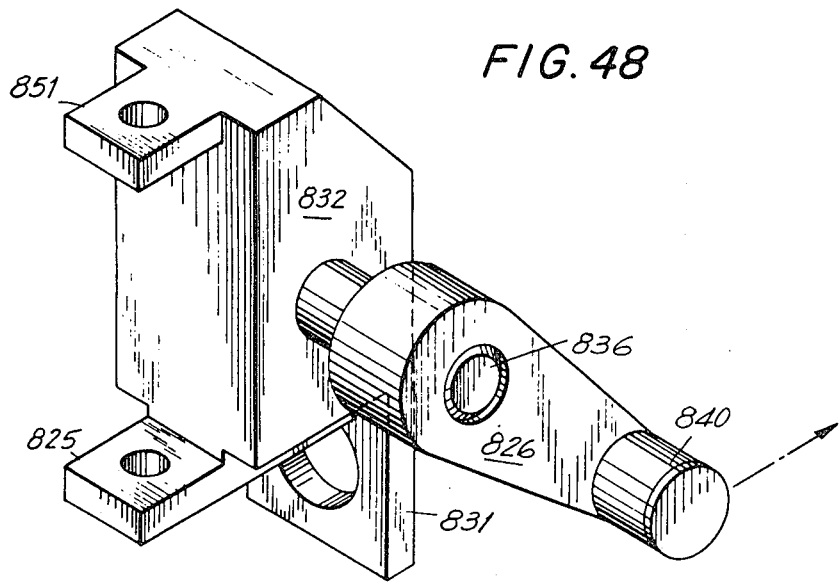
FIG. 48 is a perspective view of a component part of the apparatus shown in FIG. 45.

A pair of support plates 814 are each fixedly secured to the slide block 838 and extend downwardly. A shaft 836 extends thrugh the lower end of the support plates 814. A mounting block 832, shown isolated in FIG. 48, is positioned between the arms 814 and the shaft 836 passes through the mounting block 832 and is fixedly secured thereto. Thus, rotation of the shaft 836 results in rotation of the mounting block 832. As shown in FIG. 48, an arm 826 is fixedly secured to the shaft 836. At the other end of the arm 826 is a cam roller 840 which is secured to the arm 826. As may be seen in FIGS. 45 and 46, the roller 840 is received in the cam track 827. Thus, it will be seen that as the shaft 808 (shown in FIG. 2) oscillates through a limited arc, the block 838 will move back and forth along the guide rails 812. As the block 838 reciprocates on the guide rails 812, the roller 840 mounted on the arm 826 will follow the cam track 827 and, as a result, the mounting block 832 will be rotated through an arc of 90°. Thus, as shown in FIG. 46, the block 832 is in a vertical orientation whereas, in FIG. 45, the rod 804 has been pushed to its outermost extreme and, as a result, the block 832 (not shown in FIG. 45) has been rotated to a horizontal position.

As shown in FIGS. 45 and 46, a pair of article engaging arms 823 and 823a are provided. As may be seen in FIG. 46, each of the arms 823 is provided with hinge-forming fingers. Thus, the arm 823 shown in FIG. 46 includes hinge-forming fingers 845 and also shown in FIG. 46 are the hinge-forming fingers 846 associated with the other arm 823a. The hinge-forming fingers on the two arms are displaced so that they may be mated together as shown in FIG. 46. After the hinge-forming fingers of the two arms 823 and 823a have been mated together, they are positioned between the flange members 825 and 851 of the block 832 shown in FIG. 48. Thereafter, as shown in FIG. 46, a pin 824 is passed through the apertures in the flanges 825 and 851 and through the apertures in the fingers 845 and 846. Thereby, the arms 823 are rotatably mounted on the block 832 and may move toward or away from each other.

To secure the movement of the arms 823, a link 820 is pinned to the shoulder of each of the arms 823, as at 821. A connecting link 822 is provided and the opposite ends of the connecting link are pinned to a respective one of the links 820, as at 819. As may be seen in FIG. 46, the link 822 is fixedly connected to the piston 852 which extends from the double acting cylinder 815. The lines 817 and 818 provide signals to the cylinder 815. The cylinder 815 is fixedly secured to the downwardly extending portion 831 of the block 832 shown in FIG. 48. Thus, when the cylinder 815 is actuated, the piston 852 shown in FIG. 46 will drive forward and, thereby, the arms 823 move toward each other to engage an article positioned therebetween. Conversely, when the cylinder 815 is reverse actuated, the piston 852 is withdrawn and, thereby, the arms 823 move apart to release an article which had previously been grasped, as shown in FIG. 45. Referring further to FIG. 45, it will be seen that a tube lifting plate 809 is provided and is positioned immediately below the portion 42C of the turret. The lifting plate 809 is secured to a vertically movable shaft 810 which extends downwardly through the surface 41 of the machine and is connected by appropriate linkage to the main drive shaft of the machine whereby the shaft 810 may be reciprocated vertically in timed relation with rotation of the main drive shaft.

The operation of the discharge station 800 will now be described. After the turret 42 has been indexed so as to position a filled tube 46 in the discharge station 800, the rotatable shaft 808 shown in FIG. 2 is rotated through its limited arc whereby the discharge assembly is moved from the position shown in FIG. 45 to the position shown in FIG. 46. Thereafter, the rod 810 is moved upwardly, whereby the filled tube 46 is lifted upwardly by the lifting plate 809. During this upward movement of the tube 46, the arms 823 are in their open position and substantially surrounding the tube 46. At the end of the upward movement of the tube 46, the cylinder 815 is actuated whereby the arms 823 engage the lifted tube 46. The signal to actuate the cylinder 815 is provided by a cam operated switch driven from the main drive shaft. After the tube 46 has been engaged by the arms 823, the shaft 810 is moved downwardly. Thereafter, the shaft 808 shown in FIG. 2 again moves through its limited arc of travel, whereby the slide block 838 and the arms 814 are moved radially outward along the guide rods 812. During this outward movement, the roller 840 follows the cam track 827, whereby the block 832 is rotated through a 90° arc and, thus, the tube 46 engaged between the arms 823 is also rotated through a 90° arc. At the end of the outward movement of the rod 804, a signal is provided from the aforementioned cam operated switch whereby the cylinder 815 is reverse actuated, thereby releasing the tube 46 from the arms 823. In a preferred embodiment of my invention, the tube 46, when it is released by the arms 823, is deposited on a conveyor 801. A heating bar 860, shown in FIG. 2, may be provided above the conveyor 801 whereby one or both of the tapes on the tube 46 may be heat shrunk.

Although a preferred embodiment of my invention has hereinbefore been described, it will be appreciated that variations of my invention will be perceived by those skilled in the art, which variations are nevertheless within the scope of my invention as defined by the claims appended hereto.

I claim:

1. An apparatus for sequentially separating and discharging a substantially rimless article having a substantially cylindrically walled portion from a stack of said articles, the apparatus comprising:

(a) a sleeve for containing a stack of said articles;

(b) a plurality of rotatively mounted article retaining and feeding elements positioned about the discharge end of the sleeve, said elements comprising a plurality of cylindrical cams, each having its major axis substantially parallel to and displaced from the major axis of the article stack, each cam having two axially displaced partially angularly overlapping, discontinuous cam lobes of different radial projection, said lobes comprising a first lobe for engaging the substantially cylindrically walled portion of the article in the stack next to the article to be separated, and a second lobe for engaging the article to be separated;

(c) means for rotating each of the retaining and feeding cams so that the article to be discharged may be sequentially separated from the stack;

(d) a vacuum article receiving cup movably mounted for attracting and receiving the separated article; and (e) means for moving the article receiving cup between a plurality of positions.

2. The apparatus of claim 1 wherein the first and second cam lobes are radial projections extending continuously over an angular segment of the cam perimeter and discontinuously over the remainder of the cam perimeter, the first and second lobes being of different radial projection, the radial projection of the first lobe being less than the radial projection of the second lobe, the first lobe being vertically displaced from the second lobe relative to the cam mounting, the cams being disposed relative to the stack and the article to be discharged such that when the plurality of cams are at rest, the second lobes engage the article to be separated, supporting and retaining the article to be separated and the stack and such that when the cams are rotated, the first lobes engage the stack by engaging and deforming the substantially cylindrically walled portion of the article next to the article to be separated from the stack interrupting coupling between the stack and the article to be separated permitting said article to separate from the stack as the second lobes disengage said article and such that, responsive to continued rotation of said cams, the second lobes re-engage the stack and the first lobes disengage the stack.

3. The apparatus of claim 1 wherein the vacuum receiving cup is cylindrical, having an upper contour to engage the bottom contour of the article to be separated, the cup being located in axial alignment with the article stack and below the article retaining and feeding elements, and wherein means are provided coupling a controllable source of vacuum to the cup for intermittently supplying vacuum to the cup.

4. The apparatus in claim 3 wherein the receiving cup moving means includes means for vertically moving the cup between at least a first, lowermost position below the stack and the article to be separated and a second, uppermost position adjacent the stack and the article to be separated, the cup moving means, the retaining and feeding element rotating means, and the vacuum source being synchronized such that when the cup is moved vertically from the first, lowermost position to the second, uppermost position, the separating element moving means has rotated the separating element so as to separate an article from the stack and the vacuum source has supplied vacuum to the receiving cup to draw the separated article into positive engagement with the cup.

5. The apparatus in claim 4 wherein the receiving cup is movable to a third position in axial alignment with the stack and intermediate the first, lowermost and second, uppermost positions from which intermediate position the cup containing the article may be horizontally translated to a fourth position horizontally displaced from the stack axis where the article may be discharged from the apparatus.

6. The apparatus in claim 5 wherein the receiving cup moving means includes a shuttle block slidably mounted on a frame for moving the cup horizontally between the third position and the fourth position, and means for horizontally translating the shuttle block and cup between the third position and the fourth position, the receiving cup moving means and vacuum source being synchronized such that when the cup moving means has translated the cup with the article to the fourth position, the vacuum supplied to the cup is interrupted so that the article may be discharged.

7. An apparatus for sequentially separating and discharging a substantially rimless article having a substantially cylindrically walled portion from a nested stack of said articles, the apparatus comprising:
   (a) a sleeve for containing a stack of said articles;
   (b) a plurality of rotatively mounted article feeding and retaining members positioned around the discharge end of said sleeve, said members comprising a plurality of cylindrical means, each having its major axis substantially parallel to and displaced from the major axis of said article stack, and each said cam having two axially displaced partially angularly overlapping, discontinuous cam lobes of different radial projection, said lobes comprising a first lobe for engaging the substantially cylindrically walled portion of the article in said stack next to the article to be discharged, and a second lobe for engaging the article to be discharged; and
   (c) means for rotating each of said article feeding and retaining cams so that the article to be discharged may be sequentially separated from said stack and discharged.

8. The apparatus of claim 7 wherein said first and second lobes are radial projections extending continuously over an angular segment of said cam perimeter and discontinuously over the remainder of said cam perimeter, the radial projection of said first lobe being less than the radial projection of said second lobe, said first lobe being vertically displaced from said second lobe relative to said cam mounting and angularly positioned on said cam perimeter such that the radial projection of said first lobe overlaps portions of the radial projection of said second lobe on either side of the discontinuity of said second lobe, said cams being disposed relative to said stack and the article to be discharged therefrom such that when said cams are at rest said second lobes engage the article to be discharged to support said article and stack, such that when said cams are rotated said first lobes engage and support said stack by engaging and deforming the substantially cylindrically walled portion of the article in said stack next to the article to be discharged so that coupling between said stack and the article to be discharged is interrupted, permitting the article to be discharged to fall away from said stack as said second lobes disengage the article to be discharged, and such that said second lobes reengage said stack and said first lobes disengage said stack responsive to continued rotation of said cams.

9. The apparatus of claim 8 including:
   (a) a plurality of shafts, each of said cams being mounted on a respective one of said shafts;
   (b) a plurality of sprockets, each of said sprockets being mounted on a respective one of said shafts;
   (c) a drive motor having an output shaft;
   (d) a drive sprocket mounted on said output shaft; and
   (e) chain means trained around said sprockets and said drive sprockets so that activation of said drive motor causes rotation of each of said cams whereby said articles are sequentially discharged from said stack.

10. The apparatus of claim 7 including storage means for storing stacks of said articles and means for filling said sleeve with stacks of articles from said storage means.

11. The apparatus of claim 10 wherein said sleeve is vertically disposed and said storage and filling means comprise a plurality of vertically disposed article stack storage cylinders disposed above said sleeve and means for sequentially positioning said cylinders in registry with said sleeve so that the stack of articles stored in the cylinder in registry with said sleeve is deposited therein.

* * * * *

UNITED STATES PATENT AND TRADEMARK OFFICE
CERTIFICATE OF CORRECTION

PATENT NO. : 4,341,325

DATED : July 27, 1982

INVENTOR(S) : Loren L. Lowdermilk

It is certified that error appears in the above—identified patent and that said Letters Patent is hereby corrected as shown below:

Col. 9, line 63, change "as" to -- has -- .

Col. 10, line 47, insert after "11" the following -- , -- .

Col. 13, line 18, change "with", first occurrence, to -- which -- ; line 55, change "214", second occurrence, to -- 213 -- .

Col. 15, line 60, change "cuttinng" to -- cutting -- .

Col. 16, line 33, change "FIG," to -- FIG. --.

Col. 17, line 56, insert after "roller" the following -- . --.

Col. 20, line 14, delete "the", (second occurrence).

Col. 23, line 26, insert after "tooling" the following -- member --.

UNITED STATES PATENT AND TRADEMARK OFFICE
CERTIFICATE OF CORRECTION

PATENT NO. : 4,341,325

DATED : July 27, 1982

INVENTOR(S) : Loren L. Lowdermilk

It is certified that error appears in the above-identified patent and that said Letters Patent is hereby corrected as shown below:

Col. 30, lines 46 through 49, change "The periphery of the wheel 779 is provided with a rubber covering 769. The shaft 768 is affixed to a slide block 764." to -- The shaft 768 is affixed to a slide block 764. The periphery of the wheel 779 is provided with a rubber covering 769. --.

Col. 37, line 26, change "means" to -- cams --.

Signed and Sealed this

Fourteenth Day of June 1983

[SEAL]

Attest:

DONALD J. QUIGG

Attesting Officer

Acting Commissioner of Patents and Trademarks